(12) United States Patent
Chin et al.

(10) Patent No.: US 12,497,408 B2
(45) Date of Patent: Dec. 16, 2025

(54) TETRACYCLIC COMPOUNDS AND METHODS FOR THE TREATMENT OF ZIKA VIRUS INFECTION

(71) Applicant: Gilead Sciences, Inc., Foster City, CA (US)

(72) Inventors: Elbert Chin, San Mateo, CA (US); John O. Link, San Francisco, CA (US); Ezra Roberts, San Francisco, CA (US); James G. Taylor, Burlingame, CA (US); Zheng-Yu Yang, Palo Alto, CA (US)

(73) Assignee: Gilead Sciences, Inc., Foster City, CA (US)

(*) Notice: Subject to any disclaimer, the term of this patent is extended or adjusted under 35 U.S.C. 154(b) by 0 days.

(21) Appl. No.: 17/748,470

(22) Filed: May 19, 2022

(65) Prior Publication Data

US 2022/0402931 A1    Dec. 22, 2022

Related U.S. Application Data

(60) Provisional application No. 63/191,634, filed on May 21, 2021.

(51) Int. Cl.
C07D 493/06    (2006.01)

(52) U.S. Cl.
CPC .................. C07D 493/06 (2013.01)

(58) Field of Classification Search
CPC .................................................. C07D 493/06
See application file for complete search history.

(56) References Cited

U.S. PATENT DOCUMENTS

| | | |
|---|---|---|
| 7,704,992 B2 | 4/2010 | Bachand et al. |
| 8,088,368 B2 | 1/2012 | Guo et al. |
| 8,273,341 B2 | 9/2012 | Guo et al. |
| 8,362,068 B2 | 1/2013 | Dousson et al. |
| 8,546,402 B2 | 10/2013 | Sokoloff et al. |
| 8,575,118 B2 | 11/2013 | Guo et al. |
| 8,669,234 B2 | 3/2014 | Guo et al. |
| 8,815,858 B2 | 8/2014 | Bjornson et al. |
| 8,822,430 B2 | 9/2014 | Bacon et al. |
| 8,841,278 B2 | 9/2014 | Bacon et al. |
| 8,841,340 B2 | 9/2014 | Hashash et al. |
| 9,511,056 B2 | 12/2016 | Bacon et al. |
| 9,981,955 B2 | 5/2018 | Bacon et al. |
| 2009/0068140 A1 | 3/2009 | Bachand et al. |
| 2009/0202478 A1 | 8/2009 | Bachand et al. |
| 2009/0202483 A1 | 8/2009 | Bachand et al. |
| 2010/0080772 A1 | 4/2010 | Belema et al. |
| 2010/0160335 A1 | 6/2010 | Kohno et al. |
| 2010/0249068 A1 | 9/2010 | Beigelman et al. |
| 2010/0249190 A1 | 9/2010 | Lopez et al. |
| 2010/0316607 A1 | 12/2010 | Or et al. |
| 2011/0077280 A1 | 3/2011 | Bender et al. |
| 2011/0092415 A1 | 4/2011 | DeGoey et al. |
| 2011/0137633 A1 | 6/2011 | Hutchins et al. |
| 2011/0142798 A1 | 6/2011 | Qiu et al. |
| 2011/0150827 A1 | 6/2011 | Dousson et al. |
| 2011/0306541 A1 | 12/2011 | Delaney, IV et al. |
| 2013/0156732 A1 | 6/2013 | Bacon et al. |
| 2013/0164260 A1 | 6/2013 | Bacon et al. |
| 2013/0243726 A1 | 9/2013 | Ray et al. |
| 2013/0273005 A1 | 10/2013 | Delaney et al. |
| 2013/0324496 A1 | 12/2013 | Scott et al. |
| 2014/0018313 A1* | 1/2014 | Bacon .................. C07D 403/14 514/394 |
| 2014/0045783 A1 | 2/2014 | Du et al. |
| 2014/0309187 A1 | 10/2014 | Hashash et al. |
| 2015/0141353 A1 | 5/2015 | Delaney, IV et al. |
| 2021/0052621 A1 | 2/2021 | Rana |
| 2022/0411434 A1 | 12/2022 | Chin et al. |
| 2024/0116944 A1 | 4/2024 | Davis et al. |

FOREIGN PATENT DOCUMENTS

| | | |
|---|---|---|
| JP | 2018-76280 A | 5/2018 |
| WO | WO-2006/133326 A1 | 12/2006 |
| WO | WO-2008/021927 A2 | 2/2008 |
| WO | WO-2008/021928 A2 | 2/2008 |
| WO | WO-2008/021936 A2 | 2/2008 |

(Continued)

OTHER PUBLICATIONS

Appel et al., "Mutational Analysis of Hepatitis C Virus Nonstructural Protein 5A Potential Role of Differential Phosphorylation in RNA Replication and Identification of a Genetically Flexible Domain", Journal of Virology, 79(5), 3187-3194 (2005).
Belema et al., Caplus An 2010:175961.
Borawski et al., "Class III Phosphatidylinositol 4-Kinase Alpha and Beta Are Novel Host Factor Regulators of Hepatitis C Virus Replication", Journal of Virology, 83(19) 10058-10074 (2009).
Das et al., Caplus An 2011:1236910.
Elazar et al., "Amphipathic Helix-Dependent Localization of NS5A Mediates Hepatitis C Virus RNA Replication", Journal of Virology, 77(10), 6055-6061 (2003).
Evans et al., "Phosphorylation of hepatitis C virus nonstructural protein 5A modulates its protein interactions and viral RNA replication", PNAS, 101(35), 13038-13043 (2004).

(Continued)

*Primary Examiner* — Susanna Moore

(57) ABSTRACT

Provided herein are compounds and methods for the treatment or prevention of Zika virus infection. For example, a compound of the formula(I):

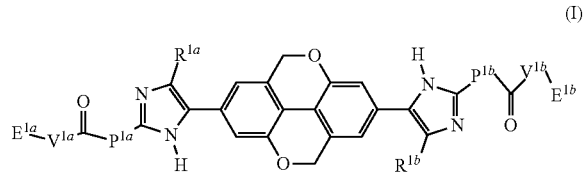

Wherein the variable substituents are described herein.

1 Claim, No Drawings

(56) References Cited

FOREIGN PATENT DOCUMENTS

| | | |
|---|---|---|
| WO | WO-2008/144380 A1 | 11/2008 |
| WO | WO-2009/020825 A1 | 2/2009 |
| WO | WO-2009/020828 A1 | 2/2009 |
| WO | WO-2009/102318 A1 | 8/2009 |
| WO | WO-2009/102325 A1 | 8/2009 |
| WO | WO-2009/102568 A1 | 8/2009 |
| WO | WO-2009/102633 A1 | 8/2009 |
| WO | WO-2010/004343 A1 | 1/2010 |
| WO | WO-2010/017401 A1 | 2/2010 |
| WO | WO-2010/062821 A1 | 6/2010 |
| WO | WO-2010/065668 A1 | 6/2010 |
| WO | WO-2010/065674 A1 | 6/2010 |
| WO | WO-2010/065681 A1 | 6/2010 |
| WO | WO-2010/091413 A1 | 8/2010 |
| WO | WO-2010/094977 A1 | 8/2010 |
| WO | WO-2010/096302 A1 | 8/2010 |
| WO | WO-2010/096462 A1 | 8/2010 |
| WO | WO-2010/096777 A1 | 8/2010 |
| WO | WO-2010/099527 A1 | 9/2010 |
| WO | WO-2010/111483 A1 | 9/2010 |
| WO | WO-2010/111534 A1 | 9/2010 |
| WO | WO-2010/111673 A1 | 9/2010 |
| WO | WO-2010/117635 A1 | 10/2010 |
| WO | WO-2010/117977 A1 | 10/2010 |
| WO | WO-2010/120621 A1 | 10/2010 |
| WO | WO-2010/120935 A1 | 10/2010 |
| WO | WO-2010/122162 A1 | 10/2010 |
| WO | WO-2010/132538 A1 | 11/2010 |
| WO | WO-2010/132601 A1 | 11/2010 |
| WO | WO-2010/138368 A1 | 12/2010 |
| WO | WO-2010/138488 A1 | 12/2010 |
| WO | WO-2010/138790 A1 | 12/2010 |
| WO | WO-2010/138791 A1 | 12/2010 |
| WO | WO-2010/144646 A2 | 12/2010 |
| WO | WO-2010/148006 A1 | 12/2010 |
| WO | WO-2011/004276 A1 | 1/2011 |
| WO | WO-2011/009084 A2 | 1/2011 |
| WO | WO-2011/015657 A1 | 2/2011 |
| WO | WO-2011/015658 A1 | 2/2011 |
| WO | WO-2011/026920 A1 | 3/2011 |
| WO | WO-2011/028596 A1 | 3/2011 |
| WO | WO-2011/031904 A1 | 3/2011 |
| WO | WO-2011/031934 A1 | 3/2011 |
| WO | WO-2011/046811 A1 | 4/2011 |
| WO | WO-2011/050146 A1 | 4/2011 |
| WO | WO-2011/054834 A1 | 5/2011 |
| WO | WO-2011/059850 A1 | 5/2011 |
| WO | WO-2011/059887 A1 | 5/2011 |
| WO | WO-2011/060000 A1 | 5/2011 |
| WO | WO-2011/066241 A1 | 6/2011 |
| WO | WO-2011/075439 A1 | 6/2011 |
| WO | WO-2011/075607 A1 | 6/2011 |
| WO | WO-2011/075615 A1 | 6/2011 |
| WO | WO-2011/079327 A1 | 6/2011 |
| WO | WO-2011/082077 A1 | 7/2011 |
| WO | WO-2011/087740 A1 | 7/2011 |
| WO | WO-2011/091446 A1 | 7/2011 |
| WO | WO-2011/112429 A1 | 9/2011 |
| WO | WO-2011/146401 A1 | 11/2011 |
| WO | WO-2012/027712 A2 | 3/2012 |
| WO | WO-2012/041014 A1 | 4/2012 |
| WO | WO-2012/048421 A1 | 4/2012 |
| WO | WO-2012068234 A2 * | 5/2012 ............ A61P 31/18 |
| WO | WO-2012/087976 A2 | 6/2012 |
| WO | WO-2013/075029 A1 | 5/2013 |
| WO | WO-2013/173488 A1 | 11/2013 |
| WO | WO-2014/100500 A1 | 6/2014 |
| WO | WO-2015/191526 A2 | 12/2015 |
| WO | WO-2017/184670 A2 | 10/2017 |
| WO | WO-2018/017426 A1 | 1/2018 |
| WO | WO-2018/170513 A1 | 9/2018 |
| WO | WO-2020/210428 A1 | 10/2020 |

OTHER PUBLICATIONS

Freundt et al., "Interfering with interferons: Hepatitis C virus counters innate immunity", PNAS, 102(49), 17539-17540 (2005).
Gao et al., "Chemical genetics strategy identifies an HCV NS5A inhibitor with a potent clinical effect", Nature, 465(6), 96-102 (2010).
Gao et al., "New BMS HCV NS5A Inhibitor: From Screen Hit to Clinic", http://www.natap.org/2008/HCV/101408_01.htm, 1-9 (2010).
Gastaminza et al., "Antiviral Stilbene 1,2 Diamines Prevent Initiation of Hepatitis C Virus RNA Replication at the Outset of Infection", Journal of Virology, 85(11), 5513-5523 (2011).
Han et al. (2018) "Investigational drugs for the treatment of Zika virus infection: a preclinical and clinical update", Export Opinion on Investigational Drugs 27(12): 951-962.
HCV—prevention, 2014, http://www.webmd.com/hepatitis/understanding-hepatitis-c-prevention.
HepatitisC, http://en.wikipedia.org/wiki/Hepatitis_C, 2012.
Huang et al., "Phosphorylation of hepatitis C virus NS5A nonstructural protein: A new paradigm for phosphorylation-dependent viral RNA replication?", Virology, 364, 1-9, (2007).
Hughes et al., "Domain III of NS5A contributes to both RNA replication and assembly of hepatitis C virus particles", Journal of General Virology, 90, 1329-1334 (2009).
Jones et al., "In-cell click labelling of small molecules to determine subcellular localisation", J. Chem. Biol., 4, 49-53 (2011).
Kanda et al., "Inhibition of Intrahepatic Gamma Interferon Production by Hepatitis C Virus Nonstructural Protein 5A in Transgenic Mice", Journal of Virology, 83(17), 8463-8469 (2009).
Katze et al, "Ser2194 Is a highly Conserved Major Phosphorylation Site of the Hepatitis C Virus Nonstructural Protein NS5A", Virology, 278, 501-513 (2000).
Kaul et al., "Essential Role of Cyclophilin A for Hepatitis C Virus Replication and Virus Production and Possible Link to Polyprotein Cleavage Kinetics", PLoSPathogens, 5(8), 1-18 (2009).
Krieger et al., "Enhancement of Hepatitis C Virus RNA Replication by Cell Culture-Adaptive Mutations", Journal of Virology, 75(10), 4614-4624 (2001).
Kriegs et al., The Hepatitis C Virus Non-Structural NS5A Protein Impairs Both the Innate and Adaptive Hepatic Immune Response in Vivo, The Journal of Biological Chemistry, 284, 28343-28351 (2009).
Lee et al., "The hepatitis C virus NS5A inhibitor (BMS-790052) alters the subcellular localization of the non-structural viral protein", Virology, 414, 10-18, (2011).
Lemm et al., "Discovery of Potent Hepatitis C Virus NS5A Inhibitors with Dimeric Structures", AAC Accepts, 1-30 (2011).
Lemm et al., "Identification of Hepatitis C Virus NS5A Inhibitors", Journal of Virology, 84(1), 482-491 (2010).
Link et al. (2019) "Discovey of velpatasvir (GS-5816): A potent pan-genotypic HCV NS5A inhibitor in the single-tablet regimens Vosevi and Epclusa", Bioorganic & Medicial Chemistry Letters 29(16): 2415-2427.
Liver Cancer, 2011, http://www.biomedcentral.com/1471-2458/9/34.
Livercancer2, 2011, http://www.mayoclinic.com/health/liver-cancer/DS00399/DSECTI0N=causes.
Lohmann et al., "Mutations in Hepatitis C Virus RNAs Conferring Cell Culture Adaptation", Journal of Virology, 75(3), 1437-1449 (2001).
MacDonald et al., "Hepatitis C virus NS5A: tales of a promiscuous protein", Journal of General Virology, 85, 2485-2502 (2004).
McCormick et al., "Tagging of NS5A expressed from a functional hepatitis C virus replicon", Journal of General Virology, 87, 635-640 (2006).
Miyanari et al., "Hepatits C Virus Non-structural Proteins in the Probable Membranous Compartment Function in Viral Genome Replication", The Journal of Biological Chemistry, 278(50), 50301-50308 (2003).
Moradpour et al., "Replication of hepatitis C virus", Nature Reviews Microbiology, 5, 453-463 (2007).
Pietschmann et al., "Characterization of Cell Lines Carrying Self-Replicating Hepatitis C Virus RNAs", Journal of Virology, 75(3), 1252-1264 (2001).

(56) References Cited

OTHER PUBLICATIONS

Reed et al., "The NS5A Proteins of Viruses from Three Genera of the Family Flaviviridae Are Phosphorylated by Associated Serine/Threonine Kinases", Journal of Virology, 75(3), 1252-1264 (2001).
Reynolds et al., "Thermodynamics of Ligand Binding and Efficiency", ACS Medicinal Chemistry Letters, 2(6):433-437 (2011).
Romine et al., "Inhibitors of HCV NS5A: From Iminothiazolidinones to Symmetrical Stilbenes", ACS Medicinal Chemistry Letters, A-F (2010).
Scheel, et al., "Recombinant HCV Variants with NS5A from Genotypes 1-7 Have Different Sensitivities to an NS5A Inhibitor but Not interferon-a", Gastroenterology, (2011 ), 140(3), 1032-1042.
Schmitz et al., "NS5A—From Obscurity to New Target for HCV Therapy", Recent Patents on Anti-Infective Drug Discovery, 3, 77-92 (2008).
Shimakami et al., "Hepatitis C: Recent Successes and Continuing Challenges in the Development of Improved Treatment Modalities", Curr Opin Pharmacol., 9(5), 537-544 (2009).
Tellinghuisen et al., "Regulation of Hepatitis C Virion Production via Phosphorylation of the NS5A Protein", PLoSPathogens, 4(3), 1-17 (2008).
Tellinghuisen et al., "Structure of the Zinc-Binding Domain of an Essential Replicase Component of Hepatitis C Virus Reveals a Novel Fold", Nature, 435(7040), 374-379 (2005).
Tellinghuisen et al., "The NS5A Protein of Hepatitis C Virus Is a Zinc Metalloprotein", Journal of Biological Chemistry, 279(47), 48576-48587 (2004).
Vitale et al., "2-Arylbenzimidazoles as Antiviral and Antiproliferative Agents-Part 1", Medicinal Chemistry, 4, pp. 605-615 (2008).
Zou et al. (2020) "Structure-activity relationship of flavonoid bifunctional inhibitors against Zika virus infection", Biochemical Pharmacology 177: 1-9.
Intl. Search Report—Written Opinion dated Jul. 27, 2022 for Intl. Appl. No. PCT/US2022/030040, 18 pages.
Bullard-Feibelman, K. et al. (2017) "The FDA-approved drug sofosbuvir inhibits Zika virus infection", Antiviral Research 137:134-140.
Elfiky, A. (2016) "Zika Viral Polymerase Inhibition Using Anti-HCV Drugs Both in Market and Under Clinical Trials", Journal of Medical Virology 88(12):2044-2051.
Lee, G. et al. (2019) "Clinical drug development for dementia with Lewy bodies: past and present", Expert Opinion on Investigational Drugs 28(11):951-965.
Examination Report dated Oct. 17, 2024 for Australian Appl. No. 2022277904.
Intl. Preliminary Report on Patentability dated Nov. 21, 2023 for Intl. Appl. No. PCT/US2022/030040.
Office Action dated Jan. 14, 2025 for Japanese Appl. No. 2023-571878.
Office Action dated Jun. 18, 2025 for Chinese Appl. No. 2022800358781.

\* cited by examiner

TETRACYCLIC COMPOUNDS AND METHODS FOR THE TREATMENT OF ZIKA VIRUS INFECTION

CROSS-REFERENCE TO RELATED APPLICATIONS

This patent application claims the benefit under 35 U.S.C. § 119(e) of U.S. Provisional Patent Application No. 63/191,634, filed May 21, 2021. The foregoing application is incorporated herein by reference in its entirety.

BACKGROUND OF THE INVENTION

Zika virus is a mosquito-transmitted, single stranded, positive sense RNA flavivirus that has emerged from relative obscurity to cause an epidemic of great public health concern. Outbreaks of Zika virus disease have been recorded in Africa, the Americas, Asia and the Pacific. The introduction of Zika virus into the Western Hemisphere is believed to have occurred in 2014-2015 in Haiti and Brazil and spread rapidly to 33 or more countries. Historically, symptomatic Zika virus infection of humans was described as a self-limiting mild febrile illness associated with rash, arthralgia, and conjunctivitis. However, recent Zika virus infection has also been associated with neurological complications, including Guillain-Barré syndrome and meningoencephalitis. Of significant concern, Zika virus infection is now strongly linked to microcephaly and intrauterine growth retardation in the fetuses of women infected with the virus while pregnant. Zika infection in pregnancy also may result in pregnancy complications such as fetal loss, stillbirth, and preterm birth.

There is currently no vaccine to prevent Zika virus disease. Therefore, there is a need for therapeutic or prophylactic interventions to treat or prevent Zika virus disease, particularly in women of childbearing age.

SUMMARY OF THE INVENTION

Provided herein are compounds and methods for the treatment or prevention of Zika virus infection.

For example, a compound of the formula(I):

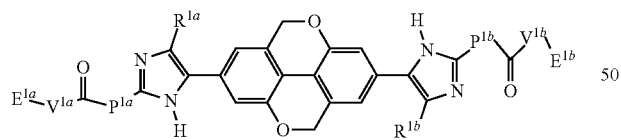

(I)

wherein:
$R^{1a}$ and $R^{1b}$ a are each independently halo, $C_{1-6}$ alkyl, or cycloalkyl;
$P^{1a}$ is selected from the group consisting of:

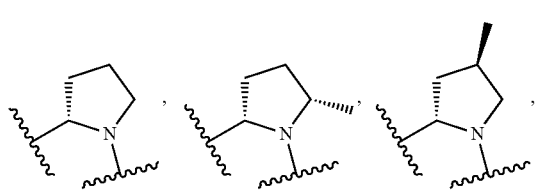

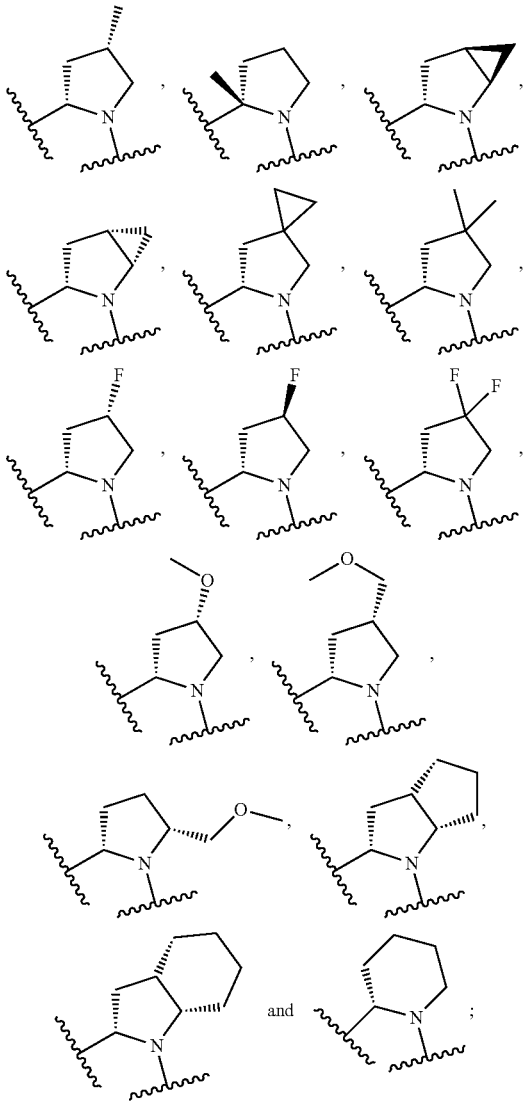

$P^{1b}$ is selected from the group consisting of:

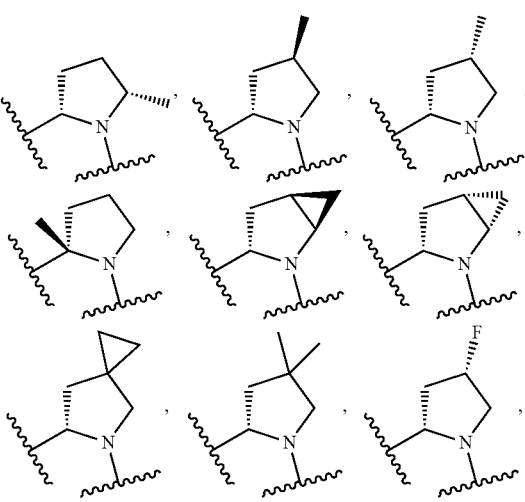

3
-continued

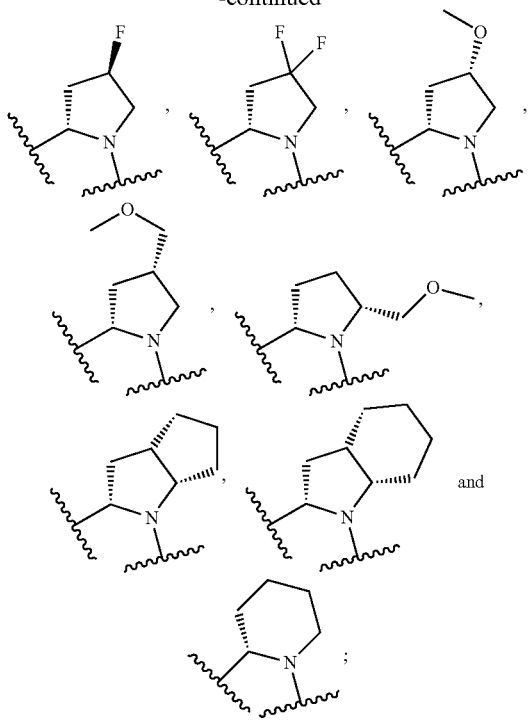

$V^{1a}$ and $V^{1b}$ are each independently selected from the group consisting of:

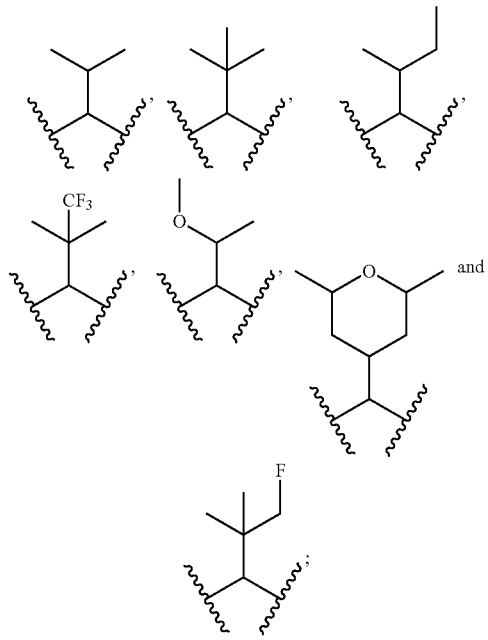

$E^{1a}$ and $E^{1b}$ are each independently —N(H)(C$_{1-6}$ alkoxycarbonyl), N(H)(C$_{3-12}$ cycloalkylcarbonyl), N(H)(C$_{1-6}$ alkylcarbonyl), or —N(H)(C$_{3-12}$ cycloalkoxycarbonyl); or a stereoisomer, pharmaceutically acceptable salt or solvate thereof.

In another embodiment, the subject is a human.

In another embodiment, the subject is a female subject of childbearing age.

4

In another embodiment, the subject is a pregnant female.

In another embodiment, the compound is admixed with a pharmaceutically acceptable excipient in a pharmaceutical composition.

In another embodiment, there is provided a method of preventing a Zika virus infection, comprising administering to a subject in need thereof a compound of formula (Ia):

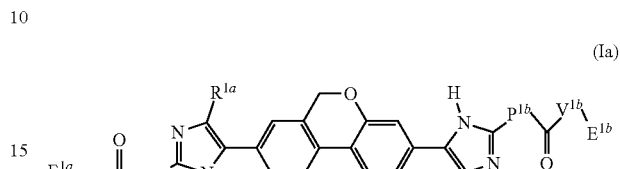

(Ia)

wherein:

$R^{1a}$ and $R^{1b}$ are each independently halo, C$_{1-10}$ alkyl, C$_{3-12}$ cycloalkyl, or cyano;

$P^{1a}$ and $P^{1b}$ are each independently selected from:

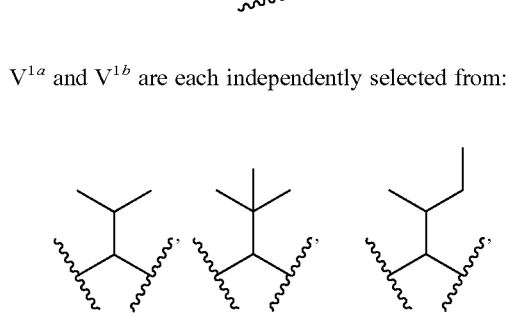

$V^{1a}$ and $V^{1b}$ are each independently selected from:

-continued

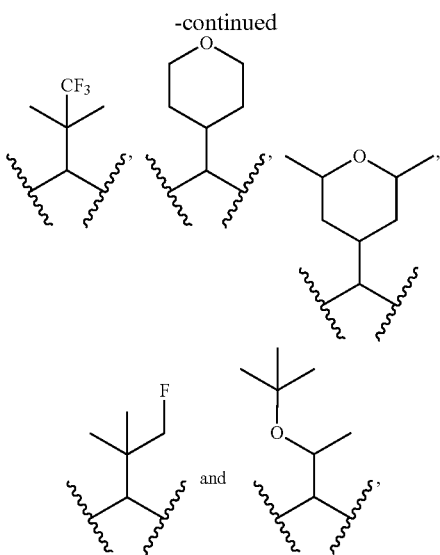

$E^{1a}$ and $E^{1b}$ are each independently —N(H)(C$_{1-6}$ alkoxycarbonyl), N(H)(cycloalkylcarbonyl), N(H)(alkylcarbonyl), or —N(H)(cycloalkoxycarbonyl);

provided that when $P^{1a}$ is

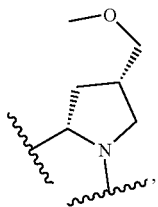

$V^{1a}$ and $V^{1b}$ are both

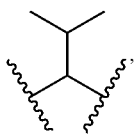

then $R^1$ is halo, $C_{1-6}$ alkyl, $C_{4-7}$ cycloalkyl, or cyano; or a pharmaceutically acceptable salt, stereoisomer, or solvate thereof.

In another embodiment, the subject is a human.

In another embodiment, the subject is a female subject of childbearing age.

In another embodiment, the subject is a pregnant female.

In another embodiment, the compound is admixed with a pharmaceutically acceptable excipient in a pharmaceutical composition. Other and further embodiments will occur to those skilled in the art, and minor modifications are intended to be encompassed by the appended claims.

DETAILED DESCRIPTION OF THE INVENTION

Definitions

"Alkyl" is a linear or branched saturated monovalent hydrocarbon. For example, an alkyl group can have 1 to 6 carbon (i.e., $C_{1-6}$ alkyl) or 1 to 4 carbon atoms (i.e., $C_{1-4}$ alkyl). Examples of alkyl groups include, but are not limited to, methyl (Me, —CH$_3$), ethyl (Et, —CH$_2$CH$_3$), 1-propyl (n-Pr, n-propyl, —CH$_2$CH$_2$CH$_3$), 2-propyl (i-Pr, i-propyl, —CH(CH$_3$)$_2$), 1-butyl (n-Bu, n-butyl, —CH$_2$CH$_2$CH$_2$CH$_3$), 2-methyl-1-propyl (i-Bu, i-butyl, —CH$_2$CH(CH$_3$)$_2$), 2-butyl (s-Bu, s-butyl, —CH(CH$_3$)CH$_2$CH$_3$), 2-methyl-2-propyl (t-Bu, t-butyl, —C(CH$_3$)$_3$), 1-pentyl (n-pentyl, —CH$_2$CH$_2$CH$_2$CH$_2$CH$_3$), 2-pentyl (—CH(CH$_3$)CH$_2$CH$_2$CH$_3$), 3-pentyl (—CH(CH$_2$CH$_3$)$_2$), 2-methyl-2-butyl (—C(CH$_3$)$_2$CH$_2$CH$_3$), 3-methyl-2-butyl (—CH(CH$_3$)CH(CH$_3$)$_2$), 3-methyl-1-butyl (—CH$_2$CH$_2$CH(CH$_3$)$_2$), 2-methyl-1-butyl (—CH$_2$CH(CH$_3$)CH$_2$CH$_3$), 1-hexyl (—CH$_2$CH$_2$CH$_2$CH$_2$CH$_2$CH$_3$), 2-hexyl (—CH(CH$_3$)CH$_2$CH$_2$CH$_2$CH$_3$), 3-hexyl (—CH(CH$_2$CH$_3$)(CH$_2$CH$_2$CH$_3$)), 2-methyl-2-pentyl (—C(CH$_3$)$_2$CH$_2$CH$_2$CH$_3$), 3-methyl-2-pentyl (—CH(CH$_3$)CH(CH$_3$)CH$_2$CH$_3$), 4-methyl-2-pentyl (—CH(CH$_3$)CH$_2$CH(CH$_3$)$_2$), 3-methyl-3-pentyl (—C(CH$_3$)(CH$_2$CH$_3$)$_2$), 2-methyl-3-pentyl (—CH(CH$_2$CH$_3$)CH(CH$_3$)$_2$), 2,3-dimethyl-2-butyl (—C(CH$_3$)$_2$CH(CH$_3$)$_2$), and 3,3-dimethyl-2-butyl (—CH(CH$_3$)C(CH$_3$)$_3$).

"Alkoxy" refers to an alkyl group having an oxygen atom that connects the alkyl group to the point of attachment: alkyl-O—. As for alkyl group, alkoxy groups can have any suitable number of carbon atoms, such as $C_{1-6}$. Alkoxy groups include, for example, methoxy, ethoxy, propoxy, iso-propoxy, butoxy, 2-butoxy, iso-butoxy, sec-butoxy, tert-butoxy, pentoxy, hexoxy, etc. The alkoxy groups can be further substituted with a variety of substituents described within. Alkoxy groups can be substituted or unsubstituted.

"Alkoxyalkyl" refers an alkoxy group linked to an alkyl group which is linked to the remainder of the compound such that the alkyl group is divalent. Alkoxyalkyl can have any suitable number of carbon, such as from 2 to 6 ($C_{2-6}$ alkoxyalkyl), 2 to 5 ($C_{2-5}$ alkoxyalkyl), 2 to 4 ($C_{2-4}$ alkoxyalkyl), or 2 to 3 ($C_{2-3}$ alkoxyalkyl). Alkoxy and alkyl are as defined above where the alkyl is divalent, and can include, but is not limited to, methoxymethyl (CH$_3$OCH$_2$—), methoxyethyl (CH$_3$OCH$_2$CH$_2$—) and others.

"Halo" or "halogen" as used herein refers to fluoro (—F), chloro (—Cl), bromo (—Br) and iodo (—I).

"Cycloalkyl" refers to a single saturated or partially unsaturated all carbon ring having 3 to 12 annular carbon atoms (i.e., $C_{3-12}$ cycloalkyl), for example from 3 to 12 annular atoms, for example from 3 to 10 annular atoms, or 3 to 8 annular atoms, or 3 to 6 annular atoms, or 3 to 5 annular atoms, or 3 to 4 annular atoms. The term "cycloalkyl" also includes multiple condensed, saturated and partially unsaturated all carbon ring systems (e.g., ring systems comprising 2 or 3 carbocyclic rings). The rings of a multiple condensed ring system can be connected to each other via fused, spiro and bridged bonds when allowed by valency requirements. Non-limiting examples of monocyclic cycloalkyl include cyclopropyl, cyclobutyl, cyclopentyl, 1-cyclopent-1-enyl, 1-cyclopent-2-enyl, 1-cyclopent-3-enyl, cyclohexyl, 1-cyclohex-1-enyl, 1-cyclohex-2-enyl and 1-cyclohex-3-enyl.

"Composition" as used herein is intended to encompass a product comprising the specified ingredients in the specified amounts, as well as any product, which results, directly or indirectly, from combination of the specified ingredients in the specified amounts. By "pharmaceutically acceptable" it is meant the carrier, diluent or excipient must be compatible with the other ingredients of the formulation and deleterious to the recipient thereof.

"Pharmaceutically effective amount" refers to an amount of a compound of the present disclosure in a formulation or combination thereof, that provides the desired therapeutic or pharmaceutical result.

"Pharmaceutically acceptable excipient" includes without limitation any adjuvant, carrier, excipient, glidant, sweetening agent, diluent, preservative, dye/colorant, flavor enhancer, surfactant, wetting agent, dispersing agent, suspending agent, stabilizer, isotonic agent, solvent, or emulsifier which has been approved by the United States Food and Drug Administration as being acceptable for use in humans or domestic animals.

"Treatment" or "treat" or "treating" as used herein refers to an approach for obtaining beneficial or desired results. For purposes of the present disclosure, beneficial or desired results include, but are not limited to, alleviation of a symptom and/or diminishment of the extent of a symptom and/or preventing a worsening of a symptom associated with a disease or condition. In one embodiment, "treatment" or "treating" includes one or more of the following: a) inhibiting the disease or condition (e.g., decreasing one or more symptoms resulting from the disease or condition, and/or diminishing the extent of the disease or condition); b) slowing or arresting the development of one or more symptoms associated with the disease or condition (e.g., stabilizing the disease or condition, delaying the worsening or progression of the disease or condition); and c) relieving the disease or condition, e.g., causing the regression of clinical symptoms, ameliorating the disease state, delaying the progression of the disease, increasing the quality of life, and/or prolonging survival.

"Therapeutically effective amount" or "effective amount" as used herein refers to an amount that is effective to elicit the desired biological or medical response, including the amount of a compound that, when administered to a subject for treating a disease, is sufficient to effect such treatment for the disease. The effective amount can vary depending on the compound, the disease, and its severity and the age, weight, etc., of the subject to be treated. The effective amount can include a range of amounts. As is understood in the art, an effective amount may be in one or more doses, i.e., a single dose or multiple doses may be required to achieve the desired treatment endpoint. An effective amount may be considered in the context of administering one or more therapeutic agents, and a single agent may be considered to be given in an effective amount if, in conjunction with one or more other agents, a desirable or beneficial result may be or is achieved. Suitable doses of any co-administered compounds may optionally be lowered due to the combined action (e.g., additive or synergistic effects) of the compounds.

"Administering" refers to oral administration, administration as a suppository, topical contact, parenteral, intravenous, intraperitoneal, intramuscular, intralesional, intranasal or subcutaneous administration, intrathecal administration, or the implantation of a slow-release device e.g., a mini-osmotic pump, to the subject. The administration can be carried out according to a schedule specifying frequency of administration, dose for administration, and other factors.

"Subject" refers to animals such as mammals, including, but not limited to, primates (e.g., humans), cows, sheep, goats, horses, dogs, cats, rabbits, rats, mice and the like. In certain embodiments, the subject is a human.

Provided are also pharmaceutically acceptable salts, hydrates, solvates, tautomeric forms, polymorphs, and prodrugs of the compounds described herein. "Pharmaceutically acceptable" or "physiologically acceptable" refer to compounds, salts, compositions, dosage forms and other materials which are useful in preparing a pharmaceutical composition that is suitable for veterinary or human pharmaceutical use.

The compounds of described herein may be prepared and/or formulated as pharmaceutically acceptable salts or when appropriate as a free base. Pharmaceutically acceptable salts are non-toxic salts of a free base form of a compound that possesses the desired pharmacological activity of the free base. These salts may be derived from inorganic or organic acids or bases. For example, a compound that contains a basic nitrogen may be prepared as a pharmaceutically acceptable salt by contacting the compound with an inorganic or organic acid. Non-limiting examples of pharmaceutically acceptable salts include sulfates, pyrosulfates, bisulfates, sulfites, bisulfites, phosphates, monohydrogen-phosphates, dihydrogenphosphates, metaphosphates, pyrophosphates, chlorides, bromides, iodides, acetates, propionates, decanoates, caprylates, acrylates, formates, isobutyrates, caproates, heptanoates, propiolates, oxalates, malonates, succinates, suberates, sebacates, fumarates, maleates, butyne-1,4-dioates, hexyne-1,6-dioates, benzoates, chlorobenzoates, methylbenzoates, dinitrobenzoates, hydroxybenzoates, methoxybenzoates, phthalates, sulfonates, methylsulfonates, propylsulfonates, besylates, xylenesulfonates, naphthalene-1-sulfonates, naphthalene-2-sulfonates, phenylacetates, phenylpropionates, phenylbutyrates, citrates, lactates, γ-hydroxybutyrates, glycolates, tartrates, and mandelates. Lists of other suitable pharmaceutically acceptable salts are found in Remington: The Science and Practice of Pharmacy, 21$^{st}$ Edition, Lippincott Wiliams and Wilkins, Philadelphia, Pa., 2006.

Examples of "pharmaceutically acceptable salts" of the compounds disclosed herein also include salts derived from an appropriate base, such as an alkali metal (for example, sodium, potassium), an alkaline earth metal (for example, magnesium), ammonium and $NX_4^+$ (wherein X is $C_1$-$C_4$ alkyl). Also included are base addition salts, such as sodium or potassium salts.

Provided are also compounds described herein or pharmaceutically acceptable salts, isomers, or a mixture thereof, in which from 1 to n hydrogen atoms attached to a carbon atom may be replaced by a deuterium atom or D, in which n is the number of hydrogen atoms in the molecule. As known in the art, the deuterium atom is a non-radioactive isotope of the hydrogen atom. Such compounds may increase resistance to metabolism, and thus may be useful for increasing the half-life of the compounds described herein or pharmaceutically acceptable salts, isomer, or a mixture thereof when administered to a mammal. See, e.g., Foster, "Deuterium Isotope Effects in Studies of Drug Metabolism", Trends Pharmacol. Sci., 5(12):524-527 (1984). Such compounds are synthesized by means well known in the art, for example by employing starting materials in which one or more hydrogen atoms have been replaced by deuterium.

Examples of isotopes that can be incorporated into the disclosed compounds also include isotopes of hydrogen, carbon, nitrogen, oxygen, phosphorous, fluorine, chlorine, and iodine, such as $^{2}H$, $^{3}H$, $^{11}C$, $^{13}C$, $^{14}C$, $^{13}N$, $^{15}N$, $^{15}O$, $^{17}O$, $^{18}O$, $^{31}P$, $^{32}P$, $^{35}S$, $^{18}F$, $^{36}Cl$, $^{123}I$, and $^{125}I$, respectively. Substitution with positron emitting isotopes, such as $^{11}C$, $^{18}F$, $^{15}O$ and $^{13}N$, can be useful in Positron Emission Topography (PET) studies for examining substrate receptor occupancy. Isotopically-labeled compounds of Formula (I), can generally be prepared by conventional techniques known to those skilled in the art or by processes analogous to those described in the Examples as set out below using an appropriate isotopically-labeled reagent in place of the non-labeled reagent previously employed.

The compounds of the embodiments disclosed herein, or their pharmaceutically acceptable salts may contain one or more asymmetric centers and may thus give rise to enantiomers, diastereomers, and other stereoisomeric forms that may be defined, in terms of absolute stereochemistry, as (R)- or (S)- or, as (D)- or (L)- for amino acids. The present disclosure is meant to include all such possible isomers, as well as their racemic and optically pure forms. Optically active (+) and (−), (R)- and (S)-, or (D)- and (L)-isomers may be prepared using chiral synthons or chiral reagents, or resolved using conventional techniques, for example, chromatography and fractional crystallization. Conventional techniques for the preparation/isolation of individual enantiomers include chiral synthesis from a suitable optically pure precursor or resolution of the racemate (or the racemate of a salt or derivative) using, for example, chiral high pressure liquid chromatography (HPLC). When the compounds described herein contain olefinic double bonds or other centers of geometric asymmetry, and unless specified otherwise, it is intended that the compounds include both E and Z geometric isomers. Likewise, all tautomeric forms are also intended to be included. Where compounds are represented in their chiral form, it is understood that the embodiment encompasses, but is not limited to, the specific diastereomerically or enantiomerically enriched form. Where chirality is not specified but is present, it is understood that the embodiment is directed to either the specific diastereomerically or enantiomerically enriched form; or a racemic or scalemic mixture of such compound(s). As used herein, "scalemic mixture" is a mixture of stereoisomers at a ratio other than 1:1.

"Racemates" refers to a mixture of enantiomers. The mixture can comprise equal or unequal amounts of each enantiomer.

"Stereoisomer" and "stereoisomers" refer to compounds that differ in the chirality of one or more stereocenters. Stereoisomers include enantiomers and diastereomers. The compounds may exist in stereoisomeric form if they possess one or more asymmetric centers or a double bond with asymmetric substitution and, therefore, can be produced as individual stereoisomers or as mixtures. Unless otherwise indicated, the description is intended to include individual stereoisomers as well as mixtures. The methods for the determination of stereochemistry and the separation of stereoisomers are well-known in the art (see, e.g., Chapter 4 of Advanced Organic Chemistry, 4th ed., J. March, John Wiley and Sons, New York, 1992).

"Tautomer" refers to alternate forms of a compound that differ in the position of a proton, such as enol-keto and imine-enamine tautomers, or the tautomeric forms of heteroaryl groups containing a ring atom attached to both a ring —NH— and a ring =N— such as pyrazoles, imidazoles, benzimidazoles, triazoles, and tetrazoles.

Unless defined otherwise, all technical and scientific terms used herein have the same meaning as commonly understood by one of ordinary skill in the art. A dash at the front or end of a chemical group is a matter of convenience; chemical groups may be depicted with or without one or more dashes without losing their ordinary meaning. A wavy line drawn through a line in a structure indicates a point of attachment of a group. A dashed line indicates an optional bond. Unless chemically or structurally required, no directionality is indicated or implied by the order in which a chemical group is written or the point at which it is attached to the remainder of the molecule. For instance, the group "—SO$_2$CH$_2$—" is equivalent to "—CH$_2$SO$_2$—" and both may be connected in either direction. Similarly, an "arylalkyl" group, for example, may be attached to the remainder of the molecule at either an aryl or an alkyl portion of the group. A prefix such as "C$_{u-v}$" or (C$_u$-C$_v$) indicates that the following group has from u to v carbon atoms. For example, "C$_{1-6}$ alkyl" and "C$_1$-C$_6$ alkyl" both indicate that the alkyl group has from 1 to 6 carbon atoms.

"Solvate" as used herein refers to the result of the interaction of a solvent and a compound. Solvates of salts of the compounds described herein are also provided. Hydrates of the compounds described herein are also provided.

Also falling within the scope herein are the in vivo metabolic products of the compounds described herein, to the extent such products are novel and unobvious over the prior art. Such products may result for example from the oxidation, reduction, hydrolysis, amidation, esterification and the like of the administered compound, primarily due to enzymatic processes. Accordingly, included are novel and unobvious compounds produced by a process comprising contacting a compound with a mammal for a period of time sufficient to yield a metabolic product thereof. Such products typically are identified by preparing a radiolabelled (e.g. $^{14}$C or $^3$H) compound, administering it parenterally in a detectable dose (e.g. greater than about 0.5 mg/kg) to an animal such as rat, mouse, guinea pig, monkey, or to man, allowing sufficient time for metabolism to occur (typically about about 30 seconds to about 30 hours) and isolating its conversion products from the urine, blood or other biological samples. These products are easily isolated since they are labeled (others are isolated by the use of antibodies capable of binding epitopes surviving in the metabolite). The metabolite structures are determined in conventional fashion, e.g. by MS or NMR analysis. In general, analysis of metabolites is done in the same way as conventional drug metabolism studies well-known to those skilled in the art.

Pharmaceutical Formulations

In some embodiments, the present disclosure provides a pharmaceutical formulation comprising a pharmaceutically effective amount of a compound of the present disclosure, or a pharmaceutically acceptable salt thereof, and a pharmaceutically acceptable carrier or excipient. Also provided herein is a pharmaceutical formulation comprising a pharmaceutically effective amount of a compound of Formula (I), or a pharmaceutically acceptable salt thereof, and a pharmaceutically acceptable carrier or excipient.

In some embodiments, compounds disclosed herein are formulated with conventional carriers and excipients, which can be selected in accord with ordinary practice. Tablets can contain excipients, glidants, fillers, binders and the like. Aqueous formulations can be prepared in sterile form, and can be isotonic, for instance when intended for delivery by other than oral administration. In some embodiments, formulations can optionally contain excipients such as those set forth in the "Handbook of Pharmaceutical Excipients" (1986). Excipients can include, for example, ascorbic acid and other antioxidants, chelating agents such as EDTA, carbohydrates such as dextran, hydroxyalkylcellulose, hydroxyalkylmethylcellulose, stearic acid and the like. The pH of the formulations ranges from about 3 to about 11, for example from about 7 to about 10.

In one embodiment, pharmaceutical compositions comprising a compound of the present disclosure, or a pharmaceutically acceptable salt thereof, in combination with one or more (e.g., one, two, three, four, one or two, one to three, or one to four) additional therapeutic agents, and a pharmaceutically acceptable excipient are provided.

In one embodiment, kits comprising a compound of the present disclosure, or a pharmaceutically acceptable salt thereof, in combination with one or more (e.g., one, two, three, four, one or two, one to three, or one to four) additional therapeutic agents are provided.

In some embodiments, a compound of the present disclosure, or a pharmaceutically acceptable salt thereof, is combined with one, two, three, four or more additional therapeutic agents. In some embodiments, a compound of the present disclosure, or a pharmaceutically acceptable salt thereof, is combined with two additional therapeutic agents. In other embodiments, a compound of the present disclosure, or a pharmaceutically acceptable salt thereof, is combined with three additional therapeutic agents. In further embodiments, a compound of the present disclosure, or a pharmaceutically acceptable salt thereof, is combined with four additional therapeutic agents. The one, two, three, four or more additional therapeutic agents can be different therapeutic agents selected from the same class of therapeutic agents, and/or they can be selected from different classes of therapeutic agents.

In some embodiments, when a compound of the present disclosure is combined with one or more additional therapeutic agents as described herein, the components of the composition are administered as a simultaneous or sequential regimen. When administered sequentially, the combination may be administered in two or more administrations.

In some embodiments, a compound of the present disclosure is combined with one or more additional therapeutic agents in a unitary dosage form for simultaneous administration to a patient, for example as a solid dosage form for oral administration.

In some embodiments, a compound of the present disclosure is co-administered with one or more additional therapeutic agents.

In order to prolong the effect of a compound of the present disclosure, it is often desirable to slow the absorption of a compound from subcutaneous or intramuscular injection. This may be accomplished by the use of a liquid suspension of crystalline or amorphous material with poor water solubility. The rate of absorption of the compound then depends upon its rate of dissolution that, in turn, may depend upon crystal size and crystalline form. Alternatively, delayed absorption of a parenterally administered compound form is accomplished by dissolving or suspending a compound in an oil vehicle. Injectable depot forms are made by forming microencapsule matrices of a compound in biodegradable polymers such as polylactide-polyglycolide. Depending upon the ratio of compound to polymer and the nature of the particular polymer employed, the rate of compound release can be controlled. Examples of other biodegradable polymers include poly(orthoesters) and poly(anhydrides). Depot injectable formulations are also prepared by entrapping a compound in liposomes or microemulsions that are compatible with body tissues.

Routes of Administration

One or more of the compounds of Formula (I), or a pharmaceutically acceptable salt thereof, (herein referred to as the active ingredients) are administered by any route appropriate to the condition to be treated. Suitable routes include oral, rectal, nasal, pulmonary, topical (including buccal and sublingual), vaginal and parenteral (including subcutaneous, intravenous, intramuscular, intradermal, intrathecal and epidural), and the like. It will be appreciated that the route may vary with for example the condition of the recipient. In some embodiments, compounds disclosed herein are orally bioavailable and can be dosed orally.

The compounds of the present disclosure (also referred to herein as the active ingredients), can be administered by any route appropriate to the condition to be treated. Suitable routes include oral, rectal, nasal, topical (including buccal and sublingual), transdermal, vaginal and parenteral (including subcutaneous, intramuscular, intravenous, intradermal, intrathecal and epidural), and the like. It will be appreciated that the route may vary with for example the condition of the recipient. An advantage of certain compounds disclosed herein is that they are orally bioavailable and can be dosed orally.

A compound of the present disclosure, may be administered to an individual in accordance with an effective dosing regimen for a desired period of time or duration, such as at least about one month, at least about 2 months, at least about 3 months, at least about 6 months, or at least about 12 months or longer.

The dosage or dosing frequency of a compound of the present disclosure may be adjusted over the course of the treatment, based on the judgment of the administering physician.

The compound may be administered to a subject (for example, a human) in an effective amount. In some embodiments, the compound is administered once daily.

The compound can be administered by any useful route and means, such as by oral or parenteral (e.g., intravenous) administration. Therapeutically effective amounts of the compound may include from about 0.00001 mg/kg body weight per day to about 10 mg/kg body weight per day, such as from about 0.0001 mg/kg body weight per day to about 10 mg/kg body weight per day, or such as from about 0.001 mg/kg body weight per day to about 1 mg/kg body weight per day, or such as from about 0.01 mg/kg body weight per day to about 1 mg/kg body weight per day, or such as from about 0.05 mg/kg body weight per day to about 0.5 mg/kg body weight per day, or such as from about 0.3 mg to about 30 mg per day, or such as from about 30 mg to about 300 mg per day.

A compound of the present disclosure may be combined with one or more additional therapeutic agents in any dosage amount of the compound of the present disclosure (e.g., from about 1 mg to about 1000 mg of compound). Therapeutically effective amounts may include from about 1 mg per dose to about 1000 mg per dose, such as from about 50 mg per dose to about 500 mg per dose, or such as from about 100 mg per dose to about 400 mg per dose, or such as from about 150 mg per dose to about 350 mg per dose, or such as from about 200 mg per dose to about 300 mg per dose. Other therapeutically effective amounts of the compound of the present disclosure are about 100, about 125, about 150, about 175, about 200, about 225, about 250, about 275, about 300, about 325, about 350, about 375, about 400, about 425, about 450, about 475, or about 500 mg per dose. Other therapeutically effective amounts of the compound of the present disclosure are about 100 mg per dose, or about 125, about 150, about 175, about 200, about 225, about 250, about 275, about 300, about 325, about 350, about 375, about 400, about 425, about 450, or about 500 mg per dose. A single dose can be administered hourly, daily, or weekly. For example, a single dose can be administered once about every 1 hour, about 2, about 3, about 4, about 6, about 8, about 12, about 16 or once about every 24 hours. A single dose can also be administered once about every 1 day, about 2, about 3, about 4, about 5, about 6, or once about every 7 days. A single dose can also be administered once about every 1 week, about 2, about 3, or once about every 4 weeks. In some embodiments, a single dose can be administered once about every week. A single dose can also be administered once about every month.

Other therapeutically effective amounts of the compound of the present disclosure are about 20, about 25, about 30, about 35, about 40, about 45, about 50, about 55, about 60, about 65, about 70, about 75, about 80, about 85, about 90, about 95, or about 100 mg per dose.

The frequency of dosage of the compound of the present disclosure can be determined by the needs of the individual patient and can be, for example, once per day or twice, or more times, per day. Administration of the compound continues for as long as necessary to treat the disease or condition. For example, a compound can be administered to a human having cancer for a period of from about 20 days to about 180 days or, for example, for a period of from about 20 days to about 90 days or, for example, for a period of from about 30 days to about 60 days.

Administration can be intermittent, with a period of several or more days during which a patient receives a daily dose of the compound of the present disclosure followed by a period of several or more days during which a patient does not receive a daily dose of the compound. For example, a patient can receive a dose of the compound every other day, or three times per week. Again by way of example, a patient can receive a dose of the compound each day for a period of from about 1 to about 14 days, followed by a period of about 7 to about 21 days during which the patient does not receive a dose of the compound, followed by a subsequent period (e.g., from about 1 to about 14 days) during which the patient again receives a daily dose of the compound. Alternating periods of administration of the compound, followed by non-administration of the compound, can be repeated as clinically required to treat the patient.

List of Abbreviations and Acronyms

| Abbreviation | Definition |
|---|---|
| Ac | acetate |
| Ar | argon |
| ACN, CH$_3$CN, MeCN | acetonitrile |
| Boc | tert-butoxycarbonyl |
| cat | catalyst |
| CS$_2$CO$_3$ | Cesium carbonate |
| DCM | dichloromethane |
| DIPEA | N,N-diisopropylethylamine |
| DMEM | Dulbecco's Modified Eagle Medium |
| DMSO | dimethylsulfoxide |
| DMF | dimethylformamide |
| EDTA | Ethylene diamine tetra acetic acid |

-continued

| Abbreviation | Definition |
|---|---|
| ES/MS | electrospray mass spectrometry |
| Et | ethyl |
| Et$_3$N | triethylamine |
| EtOAc | ethyl acetate |
| HATU | 1-[Bis(dimethylamino)methylene]-1H-1,2,3-triazolo[4,5-b]pyridinium 3-oxide hexafluorophosphate, Hexafluorophosphate Azabenzotriazole Tetramethyl Uronium) |
| HCl | hydrochloric acid |
| HPLC | high performance liquid chromatography |
| iPr | isopropyl |
| iPrOH | Isopropyl alcohol |
| K$_2$CO$_3$ | Potassium carbonate |
| LC | liquid chromatography |
| Me | methyl |
| MeOH | methanol |
| Moc-L-valine | (S)-2-((Methoxycarbonyl)amino)-3-methylbutanoic acid |
| m/z | mass to charge ratio |
| NBS | N-Bromosuccinimide |
| NCS | N-Chlorosuccinimide |
| NH$_4$OAc | Ammonium Acetate |
| NMP | N-methyl-2-pyrrolidone |
| NMR | Nuclear Magnetic Resonance |
| Palau'Chlor | 2-Chloro-1,3-bis(methoxycarbonyl)guanidine |
| Ph | phenyl |
| Pd(dppf)Cl$_2$ | [1,1'-Bis(diphenylphosphino)ferrocene]dichloropalladium(II) |
| Pd(OAc)$_2$ | Palladium (II) Acetate |
| Pr | propyl |
| RP | reverse phase |
| SiO$_2$ | Silicon dioxide |
| TFA | trifluoroacetic acid |
| THF | tetrahydrofuran |
| TBHP | tert-butyl hydroperoxide |
| δ | parts per million referenced to residual non-deuterated solvent peak |
| ZIKV | Zika virus |

EXAMPLES

The following examples are included to demonstrate specific embodiments of the disclosure. It should be appreciated by those of skill in the art that the techniques disclosed in the examples which follow represent techniques to function well in the practice of the disclosure, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the disclosure.

Experimental Procedures

General Schemes

Scheme 1

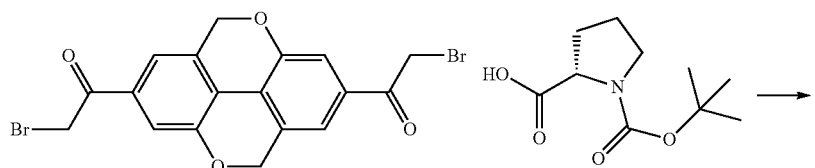

1.1

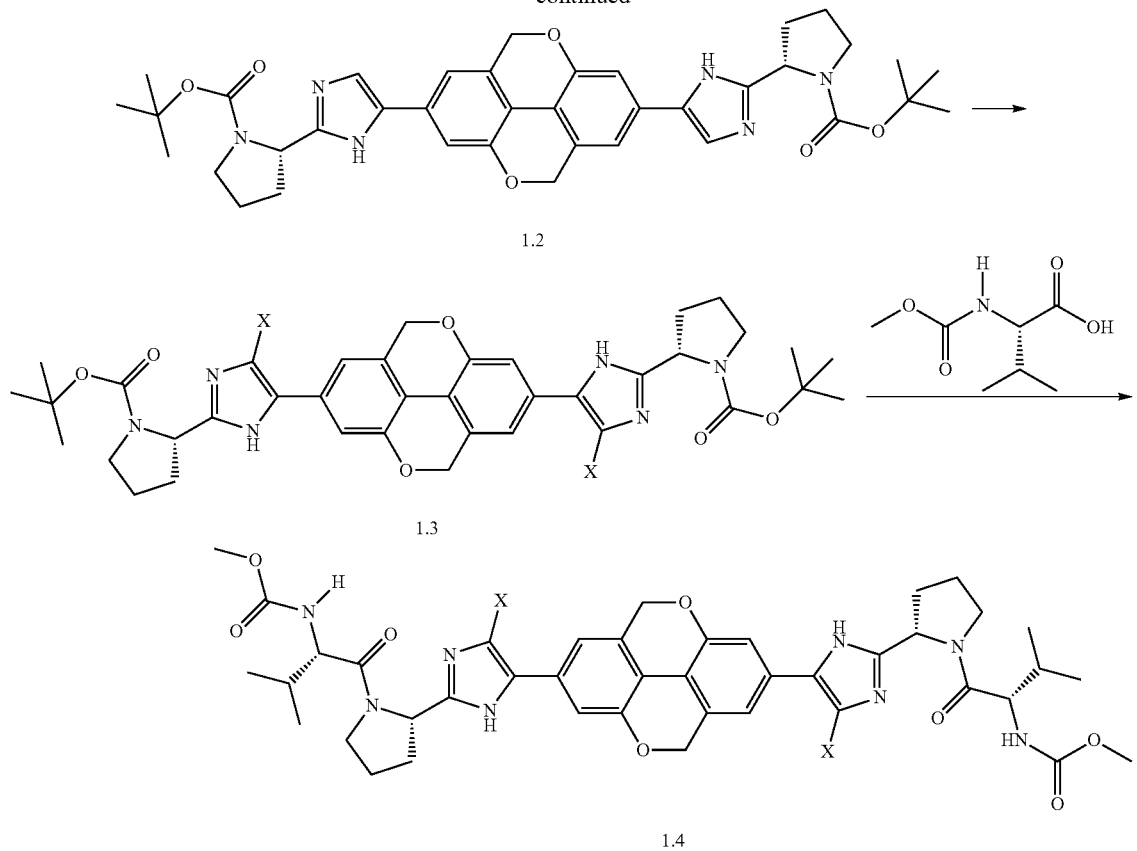

The compounds of formula 1.4 may be accessed according to the method shown in Scheme 1. Di-bromoketone 1.1 may be esterified with 2 equivalents of a suitable Boc-protected proline coupling partner, and subsequently condensed with ammonium acetate to bis-imidazole 1.2. Halogenation at the imidazole position using known halogenating reagents (e.g. NCS, NBS, etc) can form intermediate 1.3, which can be elaborated to final product after Boc-deprotection and subsequent amide coupling using suitable reagents (e.g. HATU, EDCI, etc). Alternatively, the halogenation and amide formation steps can be done in the opposite order to give final product 1.4.

Scheme 2

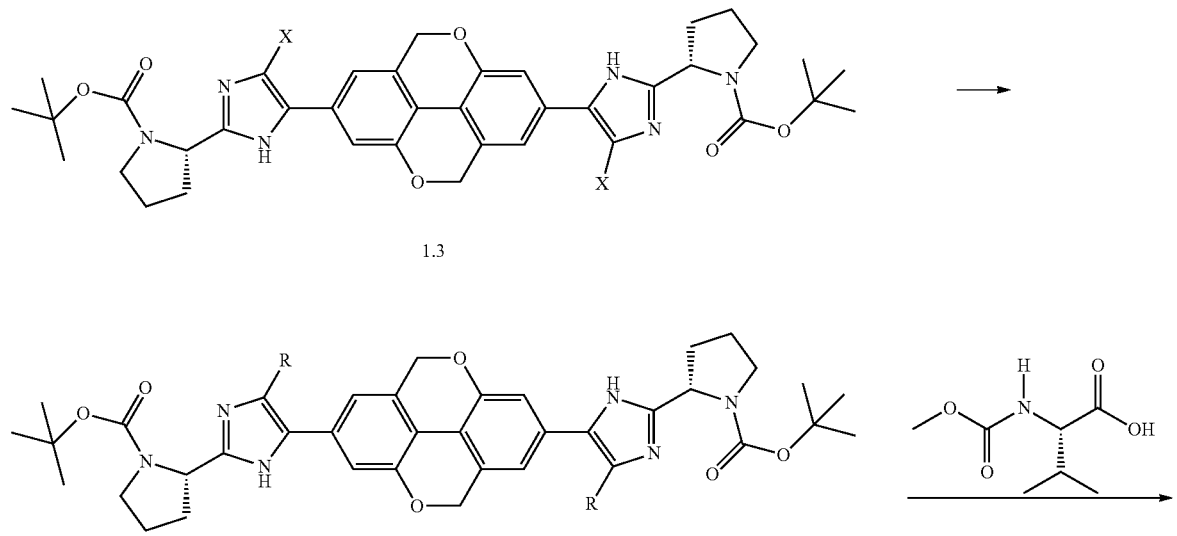

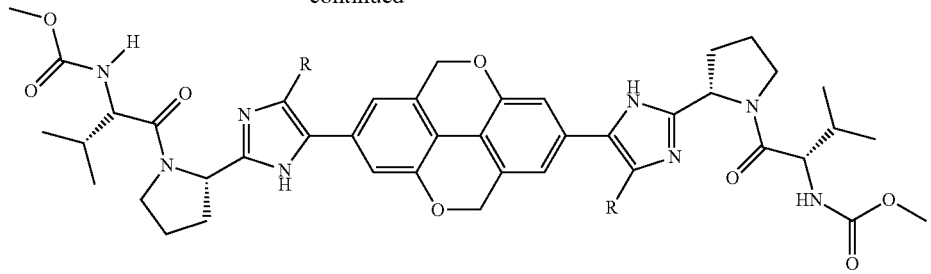

2.2

Compounds of formula 2.2 can be accessed according to the method shown in Scheme 2. Using bis-halogenated imidazole 1.3, palladium-mediated cross-coupling with an appropriate alkyl or aryl-boronic acid or boronate ester can give intermediate 2.1, which can be elaborated to final products 2.2 via Boc-deprotection and amide coupling. Alternatively, the palladium mediated cross coupling and amide coupling steps can be done in the reverse order to give final product 2.2.

Scheme 3

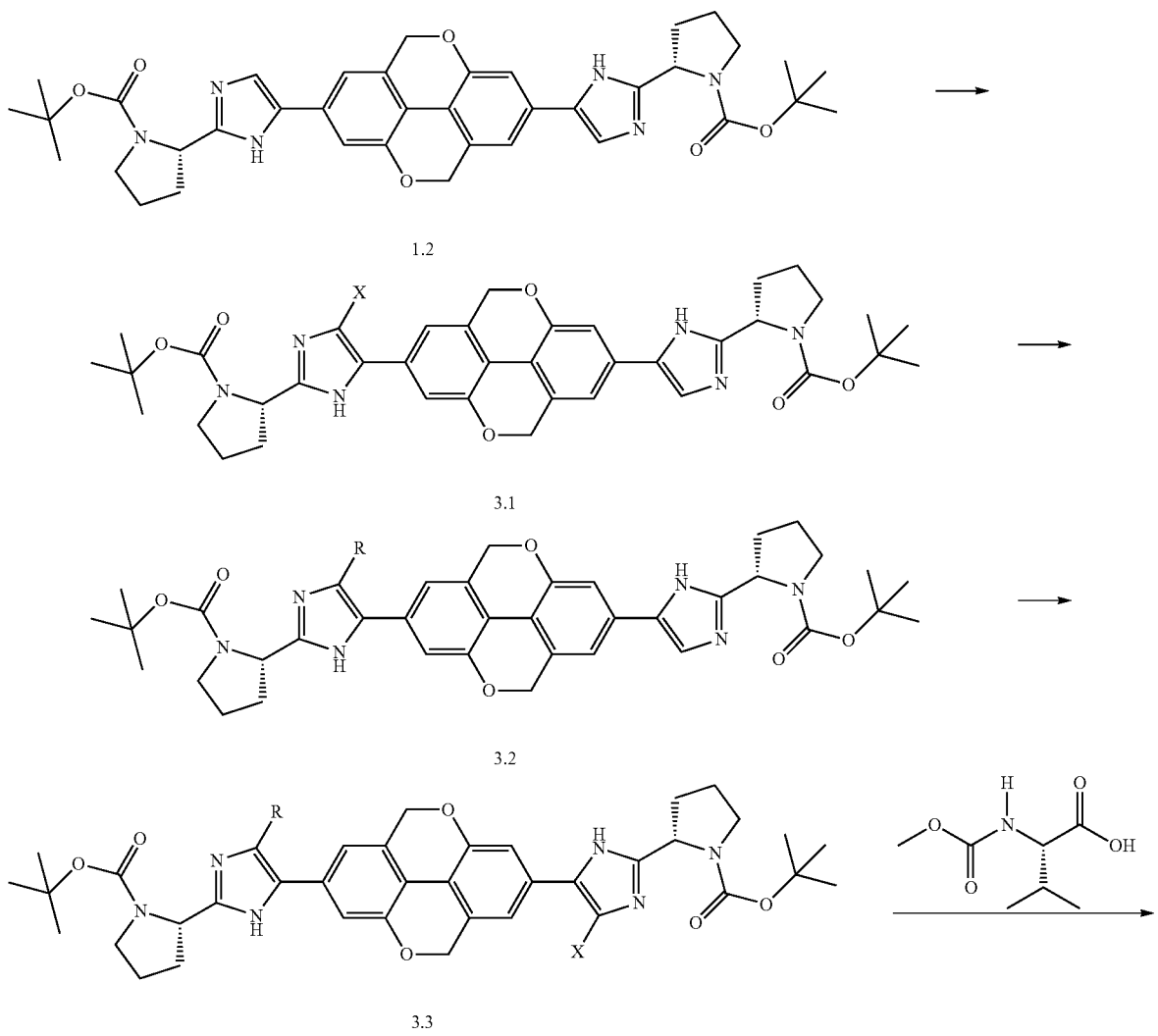

-continued

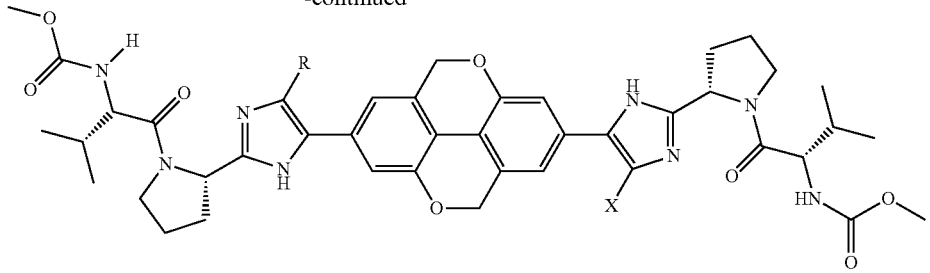

3.4

Compounds of formula 3.4 may be accessed according to the method in shown in Scheme 3. Mono-halogenation of 1.2 using 1 equivalent of the appropriate halogenating agent can form intermediate 3.1, which can be converted to intermediate 3.2 via palladium-mediated cross-coupling with an alkyl or aryl boronic acid or boronate ester. Mono-halogenation of the imidazole with suitable halogenating agent can give intermediate 3.3, which can give final product 3.4 after deprotection and amide coupling.

Scheme 4

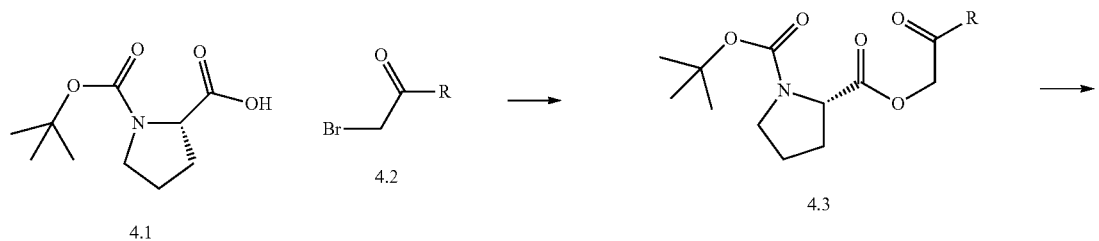

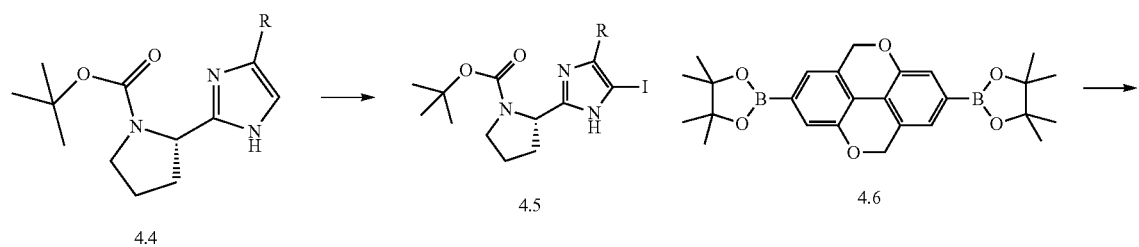

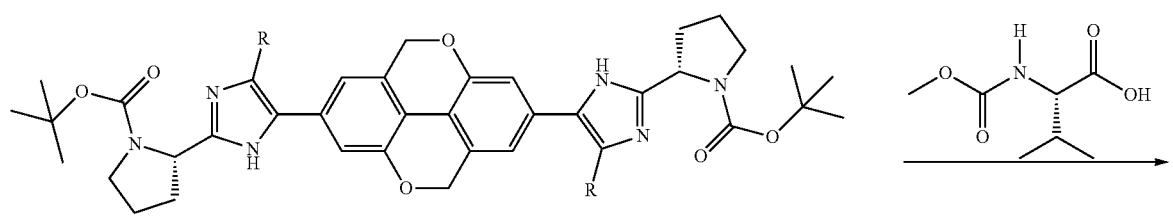

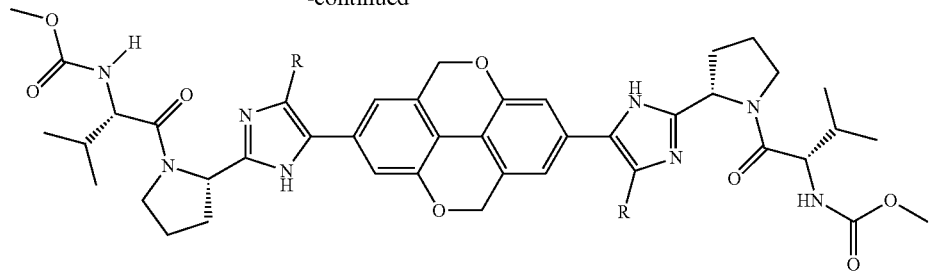

4.8

Alkyl imidazoles can also be prepared as shown in Scheme 4. Esterification of proline derivative 4.1 and an appropriate bromo-ketone 4.2 can give ester intermediate 4.3, which can be condensed to give imidazole 4.4 which could be halogenated to give 4.5. Palladium mediated cross coupling with bis-boronate ester 4.6 can give intermediate 4.7. Subsequent Boc-deprotection and amide coupling can give final product 4.8

Example Procedures and Compound Examples

Procedure 1

Di-tert-butyl 6,6'-((5,10-dihydrochromeno[5,4,3-cde]chromene-2,7-diyl)bis(1H-imidazole-5,2-diyl)) (6S,6'S)-bis(5-azaspiro[2.4]heptane-5-carboxylate)

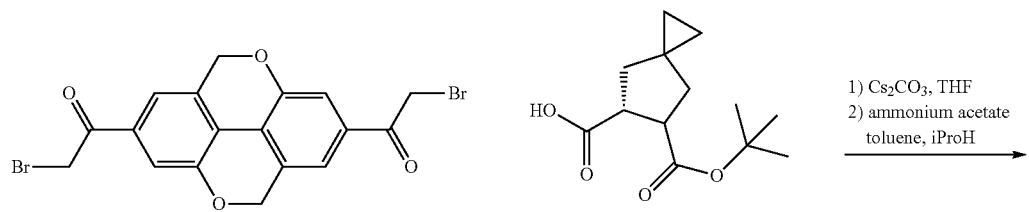

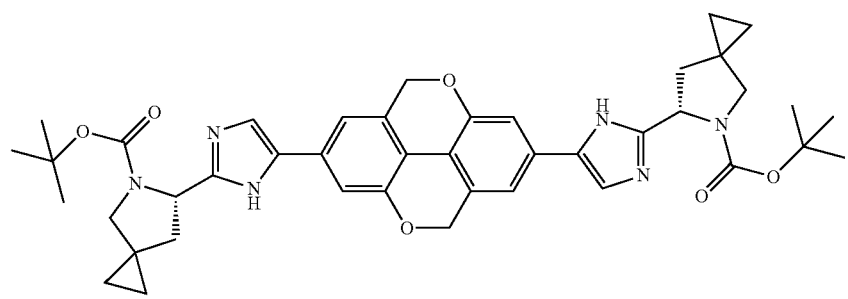

A suspension of 1,1'-(5,10-dihydrochromeno[5,4,3-cde]chromene-2,7-diyl)bis(2-bromoethan-1-one) (2.00 g, 4.42 mmol), (S)-5-(tert-butoxycarbonyl)-5-azaspiro[2.4]heptane-6-carboxylic acid (2.67 g, 11.1 mmol), and cesium carbonate (1.81 g, 5.55 mmol) in THF (25 mL) was heated at 40 deg overnight. The reaction was diluted with EtOAc (30 mL) and water (25 mL). The brown solution was partitioned and to the organic extract, was added 1N HCl (20 mL). The aqueous was back extracted with EtOAc (10 mL). The combined organics were dried over sodium sulfate and concentrated.

A suspension of the crude residue and ammonium acetate (17.34 g, 225 mmol) in toluene (50 mL) and isopropanol (6 mL) was heated at reflux for 18 hr. The reaction mixture was diluted with EtOAc and washed with NaHCO₃ solution 3×. The organic extract was dried over sodium sulfate, concentrated, and purified by normal phase SiO₂ chromatography (eluent: ethyl acetate/DCM) to provide the desired product.
ES/MS: 733.81 (M⁺).

1H NMR (400 MHz, Methanol-d4) δ 7.35 (d, J=15.9 Hz, 2H), 7.19 (d, J=13.3 Hz, 4H), 5.27 (s, 4H), 5.17-4.99 (m, 2H), 3.59 (dd, J=25.6, 10.2 Hz, 2H), 3.49-3.37 (m, 1H), 2.45 (s, 1H), 2.28 (q, J=10.9, 10.0 Hz, 1H), 1.88 (d, J=9.3 Hz, 1H), 1.48 (d, J=7.6 Hz, 6H), 1.35-1.09 (m, 17H), 0.81-0.32 (m, 7H).

Procedure 2 Example 59

Dimethyl ((2S,2'S)-((6S,6'S)-((5,10-dihydrochromeno[5,4,3-cde]chromene-2,7-diyl)bis(4-chloro-1H-imidazole-5,2-diyl))bis(5-azaspiro[2.4]heptane-6,5-diyl))bis(3-methyl-1-oxobutane-1,2-diyl))dicarbamate

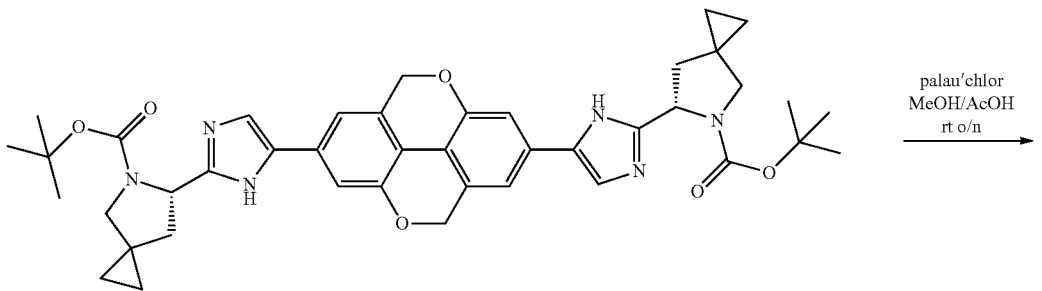

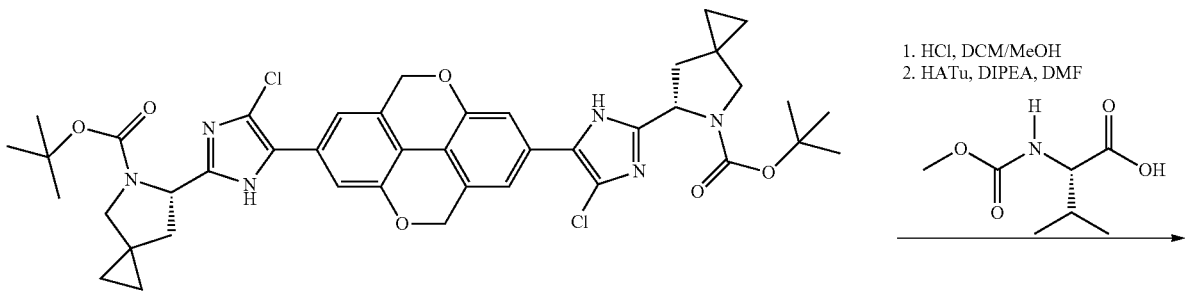

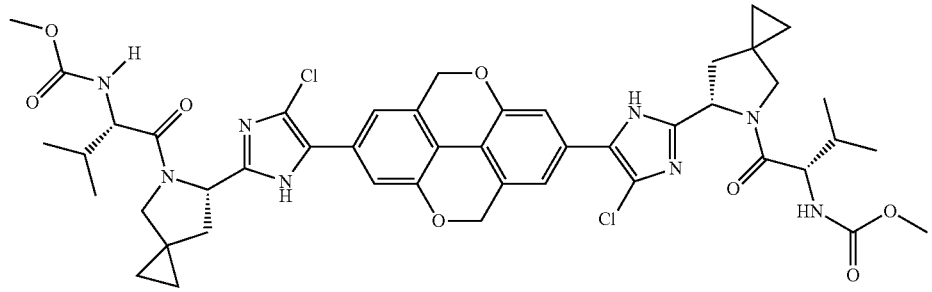

Di-tert-butyl 6,6'-((5,10-dihydrochromeno[5,4,3-cde]chromene-2,7-diyl)bis(4-chloro-1H-imidazole-5,2-diyl))(6S,6'S)-bis(5-azaspiro[2.4]heptane-5-carboxylate)

To a suspension of di-tert-butyl 6,6'-((5,10-dihydrochromeno[5,4,3-cde]chromene-2,7-diyl)bis(1H-imidazole-5,2-diyl))(6S,6'S)-bis(5-azaspiro[2.4]heptane-5-carboxylate) (662 mg, 0.903 mmol) in MeOH (15 mL), was added AcOH (20 drops) and palau'chlor (416 mg, 1.99 mmol). The tan slurry was stirred at rt overnight. The reaction was diluted with DCM and washed with sat'd NaHCO$_3$ solution and dried with sodium sulfate. Purification by normal phase SiO$_2$ chromatography (eluent: ethyl acetate/DCM) to provide the desired product.

ES/MS: 801.2 (M$^+$).

1H NMR (400 MHz, Methanol-d4) δ 7.22 (s, 4H), 5.34 (s, 5H), 5.08-4.91 (m, 3H), 3.69 (d, J=10.4 Hz, 2H), 3.50 (d, J=17.3 Hz, 1H), 2.34 (s, 1H), 2.24-2.11 (m, 3H), 1.48 (s, 8H), 1.33-1.20 (m, 22H), 0.74 (d, J=16.8 Hz, 2H), 0.64 (d, J=14.0 Hz, 9H).

Dimethyl ((2S,2'S)-((6S,6'S)-((5,10-dihydrochromeno[5,4,3-cde]chromene-2,7-diyl)bis(4-chloro-1H-imidazole-5,2-diyl))bis(5-azaspiro[2.4]heptane-6,5-diyl))bis(3-methyl-1-oxobutane-1,2-diyl))dicarbamate (example 59)

To a solution of di-tert-butyl 6,6'-((5,10-dihydrochromeno[5,4,3-cde]chromene-2,7-diyl)bis(4-chloro-1H-imidazole-5,2-diyl))(6S,6'S)-bis(5-azaspiro[2.4]heptane-5-carboxylate) (50.2 mg, 0.0626 mmol) in DCM (5 mL) and MeOH (1.5 mL), was added hydrochloric acid (4M in dioxane, 400 μl). The reaction was heated to 40 deg o/n. The reaction was concentrated to dryness.

To a solution of crude residue, Moc-L-valine (24.4 mg, 0.139 mmol), and HATU (52.3 mg, 0.138 mmol) in DMF (2 mL), was added N,N-diisopropylethylamine (130 μl, 0.746 mmol). Stirred at rt for 4 hr. The reaction was cooled to 0 deg. Added 10 drops TFA. Purified by RP-HPLC (eluent: water/MeCN*0.1% TFA) to yield product as a bis-trifluoroacetate salt.

ES/MS: 915.5 (M$^+$).

1H NMR (400 MHz, Methanol-d4) δ 7.34-7.12 (m, 4H), 5.46 (d, J=7.4 Hz, OH), 5.31 (d, J=7.8 Hz, 4H), 5.20 (td, J=8.0, 2.0 Hz, 2H), 4.14 (dd, J=7.6, 1.6 Hz, 2H), 3.99 (d, J=9.8 Hz, 2H), 3.76 (dd, J=16.5, 10.8 Hz, 2H), 3.67 (s, 4H), 3.58 (s, 1H), 2.65 (dd, J=12.7, 7.4 Hz, OH), 2.41 (dd, J=12.7, 8.3 Hz, 2H), 2.16-1.94 (m, 4H), 1.31 (d, J=3.8 Hz, OH), 1.03 (t, J=6.3 Hz, 2H), 0.95 (dd, J=14.7, 6.7 Hz, 10H), 0.84 (q, J=7.2, 6.6 Hz, 1H), 0.76 (p, J=4.9 Hz, 3H), 0.72-0.56 (m, 2H), 0.48 (s, OH).

Procedure 3 Example 23

Dimethyl ((1S,1'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(2-oxo-1-phenylethane-2,1-diyl))dicarbamate

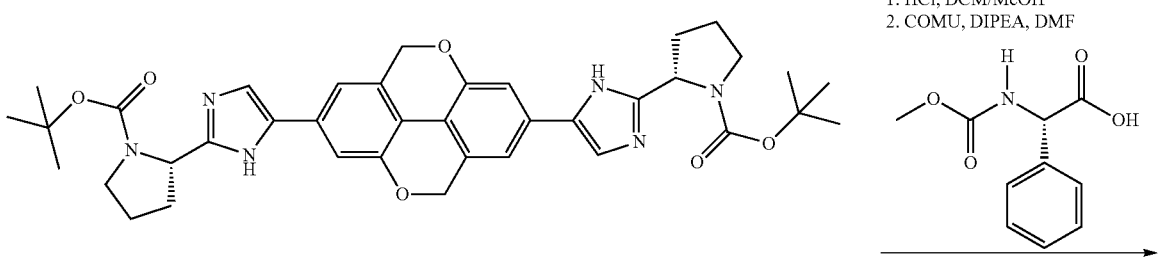

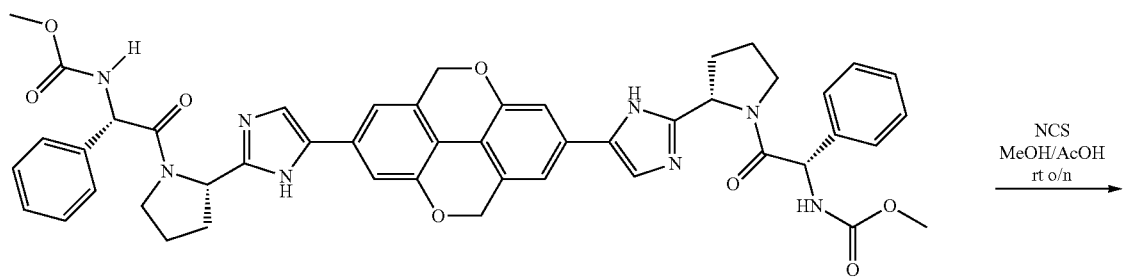

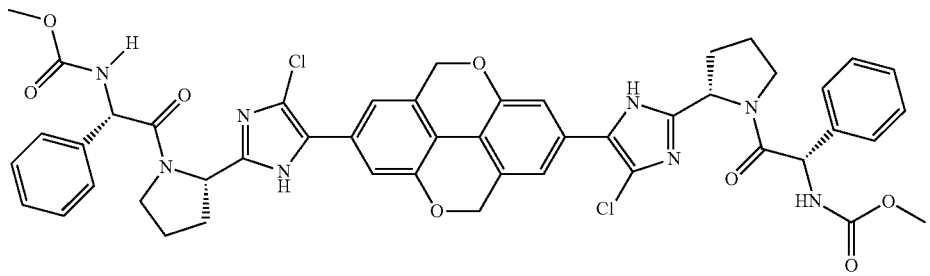

dimethyl ((1S,1'S)-((2S,2'S)-((5,10-dihydrochromeno[5,4,3-cde]chromene-2,7-diyl)bis(1H-imidazole-5,2-diyl))bis(pyrrolidine-2,1-diyl))bis(2-oxo-1-phenylethane-2,1-diyl))dicarbamate

To a solution of di-tert-butyl 2,2'-((5,10-dihydrochromeno[5,4,3-cde]chromene-2,7-diyl)bis(1H-imidazole-5,2-diyl))(2S,2'S)-bis(pyrrolidine-1-carboxylate) (150 mg, 0.220 mmol) (obtained in the manner described in Procedure 1 substituting (tert-butoxycarbonyl)-L-proline with (S)-5-(tert-butoxycarbonyl)-5-azaspiro[2.4]heptane-6-carboxylic acid), in DCM (4 mL) and MeOH (1 mL), was added 4M hydrochloric acid (4M in dioxane) (1.5 mL). The reaction was heated to 40 deg for 1 hr. The reaction was concentrated to dryness.

To a solution of crude material, (S)-2-((methoxycarbonyl)amino)-2-phenylacetic acid (98.2 mg, 0.469 mmol), and COMU (199 mg, 0.465 mmol) in DMF (3 mL), was added N,N-diisopropylethylamine (300 µl, 1.72 mmol). The purple solution was stirred at rt overnight. The reaction was diluted with EtOAc and washed with NaHCO₃ solution and brine. The organic extract was dried over sodium sulfate and purified by normal phase SiO₂ chromatography (eluent: MeOH/ethyl acetate) to provide the desired product.

ES/MS: 863.26 (M⁺).

dimethyl ((1S,1'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(2-oxo-1-phenylethane-2,1-diyl))dicarbamate (example 23)

To a suspension of dimethyl ((1S,1'S)-((2S,2'S)-((5,10-dihydrochromeno[5,4,3-cde]chromene-2,7-diyl)bis(1H-imidazole-5,2-diyl))bis(pyrrolidine-2,1-diyl))bis(2-oxo-1-phenylethane-2,1-diyl))dicarbamate (72.3 mg, 0.084 mmol) in MeOH (3 mL), was added AcOH (3 drops) and n-chlorosuccinimide (24.2 mg, 0.181 mmol). The reaction was stirred at rt for 2 hr. Added 100 uL TFA. Purification by RP-HPLC (eluent: water/MeCN*0.1% TFA) to yield product as a bis-trifluoroacetate salt.

ES/MS: 933.4 (M⁺).

1H NMR (400 MHz, Methanol-d4) δ 7.40 (s, 2H), 7.34 (d, J=1.8 Hz, 9H), 7.22-7.16 (m, 4H), 5.51 (s, 2H), 5.33 (d, J=5.9 Hz, 6H), 5.20-5.09 (m, 3H), 3.86 (s, 3H), 3.63 (d, J=7.6 Hz, 8H), 3.47-3.37 (m, 2H), 2.32 (dd, J=13.3, 6.4 Hz, 1H), 2.19 (d, J=6.4 Hz, 1H), 2.12-1.96 (m, 4H), 1.89 (s, 1H).

Procedure 4

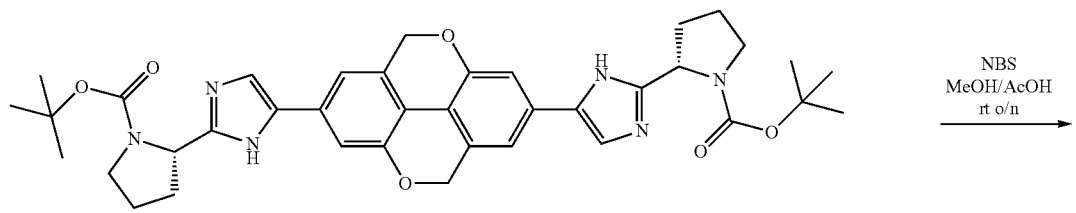

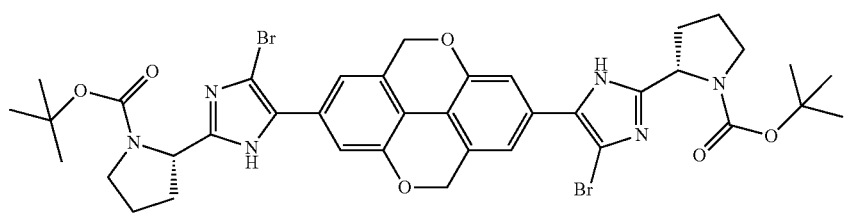

Di-tert-butyl 2,2'-((5,10-dihydrochromeno[5,4,3-cde]chromene-2,7-diyl)bis(4-bromo-1H-imidazole-5,2-diyl))(2S,2'S)-bis(pyrrolidine-1-carboxylate)

To a slurry of di-tert-butyl 2,2'-((5,10-dihydrochromeno[5,4,3-cde]chromene-2,7-diyl)bis(1H-imidazole-5,2-diyl))(2S,2'S)-bis(pyrrolidine-1-carboxylate) (500 mg, 0.734 mmol) (obtained in the manner described in Procedure 1 substituting (tert-butoxycarbonyl)-L-proline with (S)-5-(tert-butoxycarbonyl)-5-azaspiro[2.4]heptane-6-carboxylic acid), in DCM (10 mL) at 0 deg, was added N-bromosuccinimide (277 mg, 1.556 mmol). The reaction was gradually warmed to rt and stirred for 1 hr. The reaction was diluted with EtOAc and washed with sat'd NaHCO₃ solution. The organic extract was dried over sodium sulfate and purified by normal phase SiO₂ chromatography (eluent: ethyl acetate/DCM) to provide the desired product.

ES/MS: 838.9 (M⁺).

1H NMR (400 MHz, Methanol-d4) δ 7.19 (d, J=8.0 Hz, 4H), 5.31 (s, 5H), 4.77 (s, 3H), 3.67 (d, J=9.5 Hz, 4H), 3.49 (s, 3H), 2.68 (s, 38H), 2.36 (s, 3H), 2.00 (s, 24H), 1.46 (s, 10H), 1.25 (d, J=2.6 Hz, 25H).

Procedure 5 Example 17

Dimethyl ((2S,2'S)-((2S,2'S)-((5,10-dihydrochromeno[5,4,3-cde]chromene-2,7-diyl)bis(4-cyclopropyl-1H-imidazole-5,2-diyl))bis(pyrrolidine-2,1-diyl))bis(3-methyl-1-oxobutane-1,2-diyl))dicarbamate

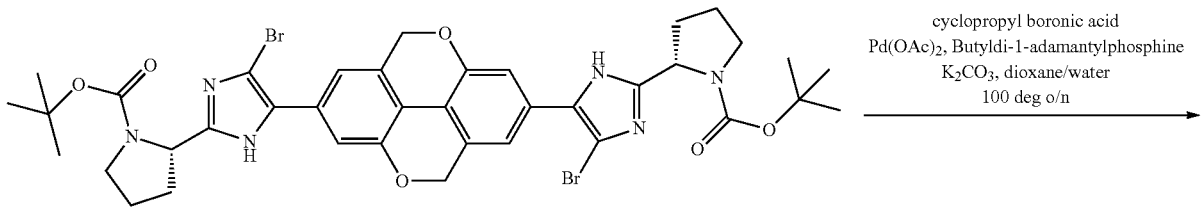

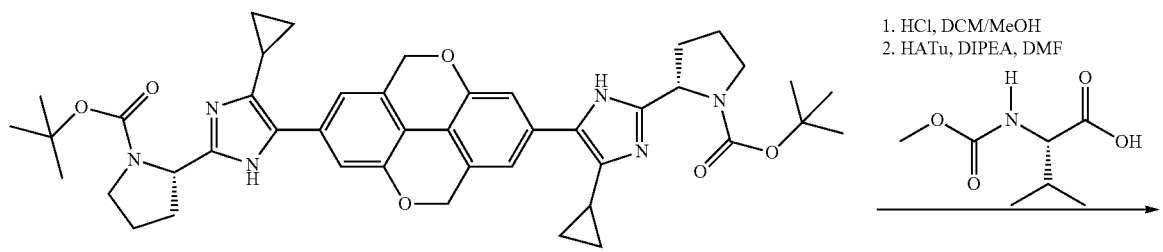

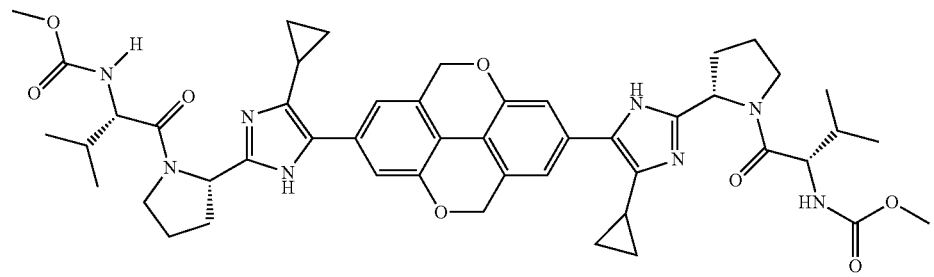

Di-tert-butyl 2,2'-((5,10-dihydrochromeno[5,4,3-cde]chromene-2,7-diyl)bis(4-cyclopropyl-1H-imidazole-5,2-diyl))(2S,2'S)-bis(pyrrolidine-1-carboxylate)

A solution of di-tert-butyl 2,2'-((5,10-dihydrochromeno[5,4,3-cde]chromene-2,7-diyl)bis(4-bromo-1H-imidazole-5,2-diyl))(2S,2'S)-bis(pyrrolidine-1-carboxylate) (199 mg, 0.237 mmol), cyclopropylboronic acid (168 mg, 1.956 mmol), Palladium acetate (6.7 mg, 0.03 mmol), butyldi-1-adamantylphosphine min. 95% (26 mg, 0.073 mmol) and potassium carbonate (310 mg, 2.243 mmol) in dioxane (6 mL) and water (3 mL) was degassed with argon for 10 min, then heated at 100 deg overnight. The reaction was diluted with EtOAc and washed with brine. The organic extract was dried over sodium sulfate and purified by normal phase $SiO_2$ chromatography (eluent: ethyl acetate/hexane) to provide the desired product.

ES/MS: 761.1 ($M^+$).

Dimethyl ((2S,2'S)-((2S,2'S)-((5,10-dihydrochromeno[5,4,3-cde]chromene-2,7-diyl)bis(4-cyclopropyl-1H-imidazole-5,2-diyl))bis(pyrrolidine-2,1-diyl))bis(3-methyl-1-oxobutane-1,2-diyl))dicarbamate Example 17

To a solution of di-tert-butyl 2,2'-((5,10-dihydrochromeno[5,4,3-cde]chromene-2,7-diyl)bis(4-cyclopropyl-1H-imidazole-5,2-diyl))(2S,2'S)-bis(pyrrolidine-1-carboxylate) (32 mg, 0.04 mmol) in DCM (2 mL) and MeOH (0.5 mL), was added 4M hydrochloric acid (4M in dioxane) (350 μl). The reaction was stirred at rt for 90 min, then heated at 40 deg for 3 hr. The reaction was concentrated to dryness.

To a solution of crude material, Moc-L-valine (19.6 mg, 0.11 mmol), and HATU (38.2 mg, 0.1 mmol) in DMF (2 mL), was added N,N-diisopropylethylamine (50 μl, 0.29 mmol). The reaction was stirred at rt overnight. Purification by RP-HPLC (eluent: water/MeCN*0.1% TFA) to yield product as a bis-trifluoroacetate salt.

ES/MS: 875.2 ($M^+$).

1H NMR (400 MHz, Methanol-d4) δ 7.85 (s, 1H), 7.24 (s, 1H), 7.21 (d, J=1.5 Hz, 2H), 7.16 (s, 1H), 5.33 (d, J=6.9 Hz, 4H), 5.21 (t, J=7.5 Hz, 1H), 5.14-5.00 (m, 1H), 4.28-4.16 (m, 2H), 3.99 (d, J=8.1 Hz, 1H), 3.84 (d, J=9.4 Hz, 2H), 3.64 (d, J=4.2 Hz, 5H), 2.56 (s, 1H), 2.44-2.21 (m, 1H), 2.13 (dt, J=13.3, 6.5 Hz, 1H), 2.03 (q, J=6.5 Hz, 1H), 1.06-0.83 (m, 12H).

Procedure 6 Example 40

Dimethyl ((2S,2'S)-((2S,2'S,5S,5'S)-((5,10-dihydrochromeno[5,4,3-cde]chromene-2,7-diyl)bis(4-isopropyl-1H-imidazole-5,2-diyl))bis(2-methylpyrrolidine-5,1-diyl))bis(3-methyl-1-oxobutane-1,2-diyl))dicarbamate

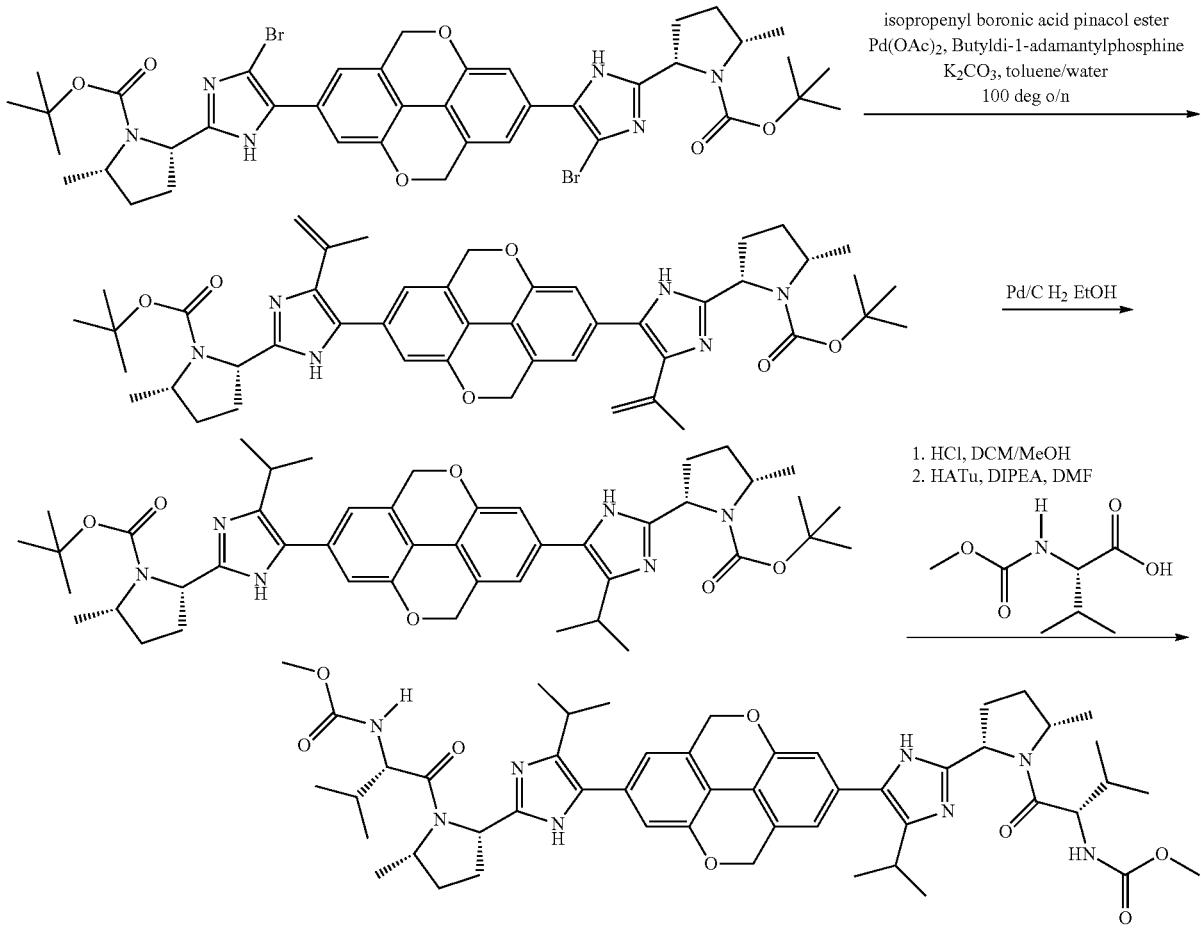

Di-tert-butyl 5,5'-((5,10-dihydrochromeno[5,4,3-cde]chromene-2,7-diyl)bis(4-(prop-1-en-2-yl)-1H-imidazole-5,2-diyl))(2S,2'S,5S,5'S)-bis(2-methylpyrrolidine-1-carboxylate)

A solution of di-tert-butyl 5,5'-((5,10-dihydrochromeno[5,4,3-cde]chromene-2,7-diyl)bis(4-bromo-1H-imidazole-5,2-diyl))(2S,2'S,5S,5'S)-bis(2-methylpyrrolidine-1-carboxylate) (371.7 mg, 0.429 mmol) (obtained in the manner described in Procedure 4), isopropenylboronic acid pinacol ester (700 µl, 3.724 mmol), Palladium acetate (10 mg, 0.045 mmol), Butyldi-1-adamantylphosphine min. 95% (32 mg, 0.208 mmol) and potassium carbonate (474 mg, 3.430 mmol) in toluene (6 mL) and water (3 mL) was degassed with argon for 10 min, then heated at 100 deg overnight. The reaction was diluted with EtOAc and washed with brine. The organic extract was dried over sodium sulfate and purified by normal phase $SiO_2$ chromatography (eluent: ethyl acetate/DCM) to provide the desired product.

ES/MS: 789.2 ($M^+$).

Di-tert-butyl 5,5'-((5,10-dihydrochromeno[5,4,3-cde]chromene-2,7-diyl)bis(4-isopropyl-1H-imidazole-5,2-diyl))(2S,2'S,5S,5'S)-bis(2-methylpyrrolidine-1-carboxylate)

A solution of di-tert-butyl 5,5'-((5,10-dihydrochromeno[5,4,3-cde]chromene-2,7-diyl)bis(4-(prop-1-en-2-yl)-1H-imidazole-5,2-diyl))(2S,2'S,5S,5'S)-bis(2-methylpyrrolidine-1-carboxylate) (163 mg, 207 µmol) in EtOH (10 mL) was degassed with Ar/Vac 3×. Added Pd/C (10%, 11 mg, 10.33 µmol) and stirred at rt with a balloon of hydrogen for 2 d. The suspension was filtered over a Celite plug and rinsed with DCM. Concentrated to give desired product, carried onto next step without purification

ES/MS: 793.2 ($M^+$).

1H NMR (400 MHz, Methanol-d4) δ 6.92 (s, 4H), 5.27 (s, 4H), 4.02 (s, 4H), 3.60 (q, J=7.0 Hz, 4H), 2.22 (s, 8H), 2.18-2.06 (m, 2H), 1.74 (s, 4H), 1.44-1.26 (m, 43H), 1.19 (s, 34H), 1.26-1.13 (m, 6H).

Dimethyl ((2S,2'S)-((2S,2'S,5S,5'S)-((5,10-dihydrochromeno[5,4,3-cde]chromene-2,7-diyl)bis(4-isopropyl-1H-imidazole-5,2-diyl))bis(2-methylpyrrolidine-5,1-diyl))bis(3-methyl-1-oxobutane-1,2-diyl)) dicarbamate (example 40)

To a solution of di-tert-butyl 5,5'-((5,10-dihydrochromeno[5,4,3-cde]chromene-2,7-diyl)bis(4-isopropyl-1H-imidazole-5,2-diyl))(2S,2'S,5S,5'S)-bis(2-methylpyrrolidine-1-carboxylate) (137.7 mg, 0.092 mmol) in DCM (8 mL) and MeOH (2 mL), was added 4M hydrochloric acid (4M in dioxane) (1200 µl). The reaction was heated to 40 deg for 3 hr. The reaction was concentrated to dryness.

To a solution of HCl salt (60 mg, 0.09 mmol), Moc-L-valine (33 mg, 0.188 mmol), and HATU (75 mg, 0.197 mmol) in DMF (2 mL), was added N,N-diisopropylethylamine (125 µl, 0.718 mmol). Stirred at rt overnight. Cooled to 0 deg, added 100 uL TFA. Purification by RP-HPLC (eluent: water/MeCN*0.1% TFA) to yield product as a bis-trifluoroacetate salt.

ES/MS: 907.4 ($M^+$).

1H NMR (400 MHz, Methanol-d4) δ 7.09 (s, 1H), 7.02 (s, 1H), 6.96 (d, J=8.5 Hz, 4H), 5.66 (d, J=7.1 Hz, 1H), 5.37 (d, J=3.6 Hz, 7H), 5.04 (dd, J=10.9, 6.7 Hz, 3H), 4.75 (s, 1H), 4.11-4.04 (m, 4H), 3.70 (s, 3H), 3.65 (s, 8H), 3.30-3.21 (m, 1H), 2.70 (s, 1H), 2.51-2.43 (m, 3H), 2.35 (s, 4H), 2.29 (s, 4H), 2.28 (d, J=24.2 Hz, 1H), 2.00 (d, J=18.3 Hz, 2H), 1.97 (s, 6H), 1.54 (d, J=6.6 Hz, 8H), 1.45-1.10 (m, 27H), 1.08 (d, J=6.7 Hz, 4H), 1.05-0.89 (m, 12H), 0.86 (d, J=6.8 Hz, 8H).

Procedure 7 Example 16

Methyl ((2S,3S)-1-((S)-6-(5-(7-(4-chloro-2-((S)-5-((methoxycarbonyl)-L-isoleucyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxopentan-2-yl)carbamate

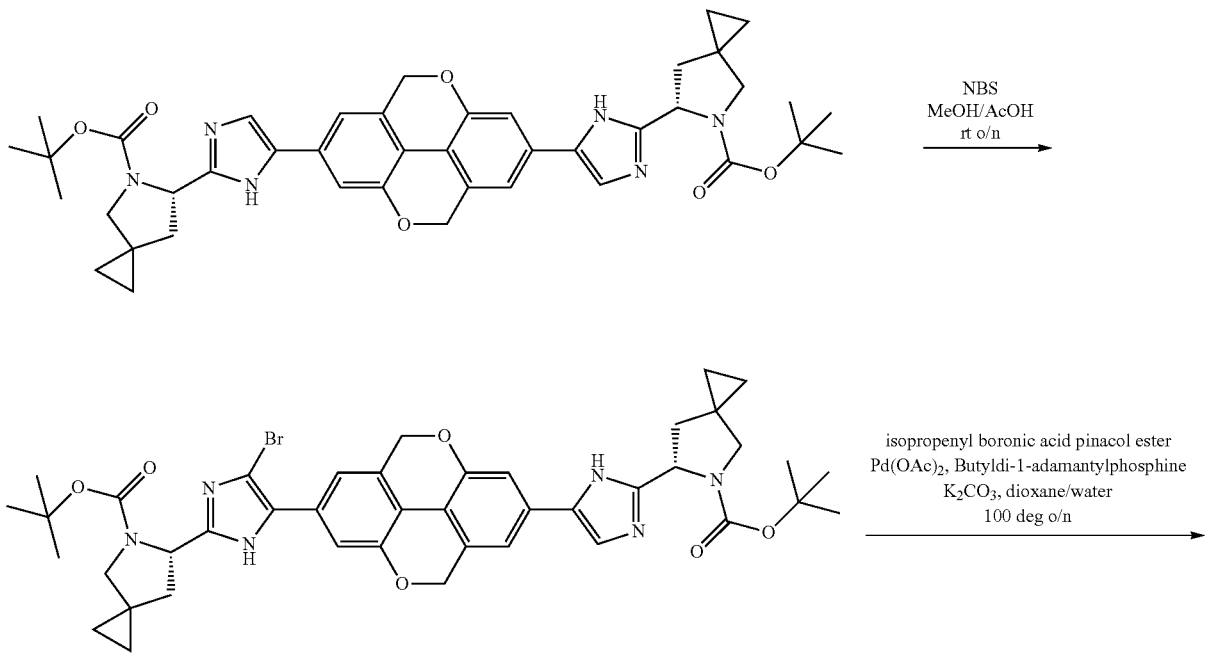

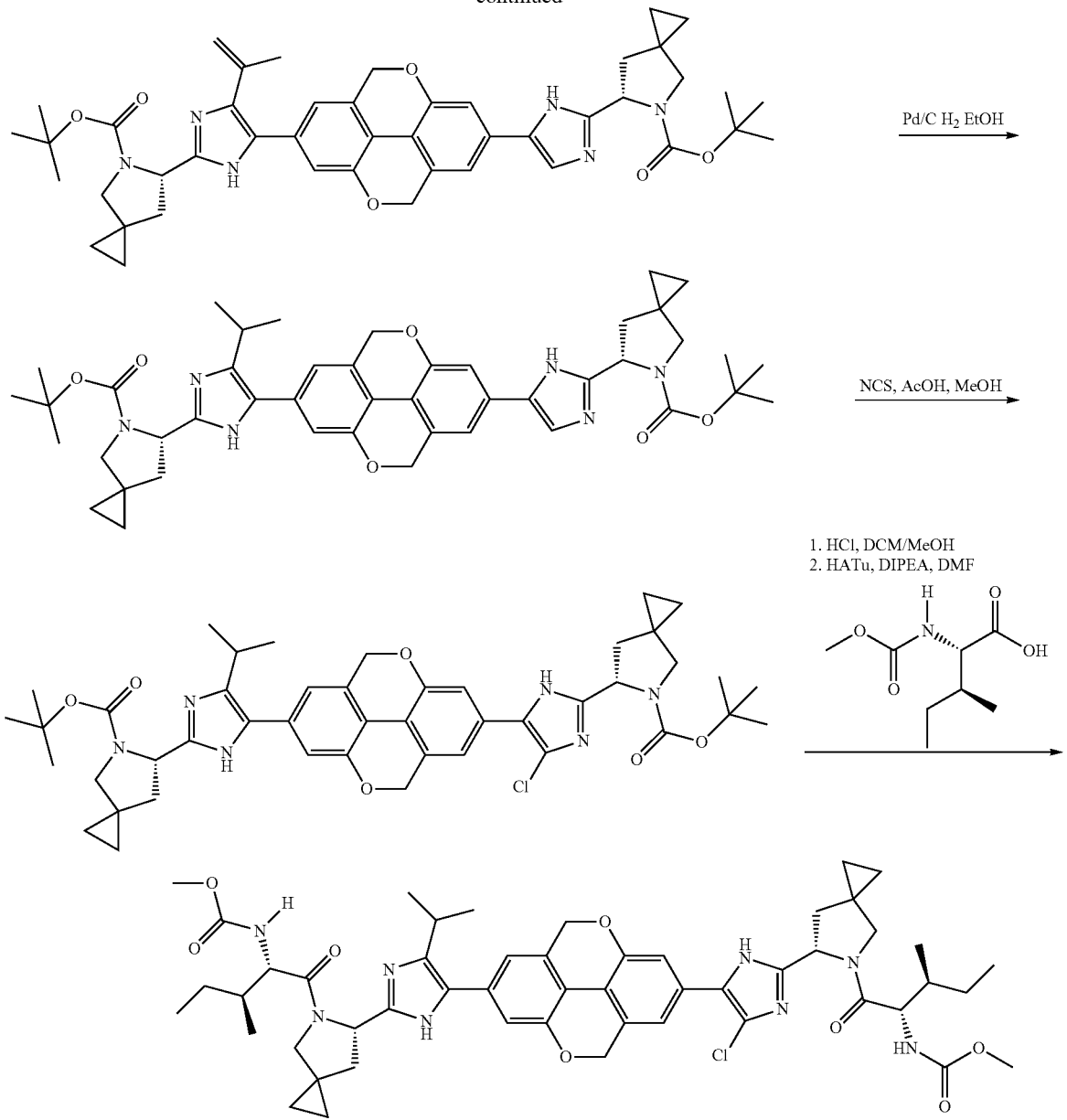

tert-butyl (S)-6-(4-bromo-5-(7-(2-((S)-5-(tert-butoxycarbonyl)-5-azaspiro[2.4]heptan-6-yl)-1H-imidazol-5-yl)-5,10-dihydrochromeno[5,4,3-cde]chromen-2-yl)-1H-imidazol-2-yl)-5-azaspiro[2.4]heptane-5-carboxylate To a slurry of di-tert-butyl 6,6'-((5,10-dihydrochromeno[5,4,3-cde]chromene-2,7-diyl)bis(1H-imidazole-5,2-diyl))(6S,6'S)-bis(5-azaspiro[2.4]heptane-5-carboxylate) (650 mg, 0.887 mmol) in DCM (10 mL) at 0 deg, was added N-bromosuccinimide (160 mg, 0.899 mmol). The reaction was gradually warmed to rt. After 30 min, the reaction was diluted with EtOAc and washed with sat'd NaHCO₃ solution. The organic extract was dried over sodium sulfate and purified by normal phase SiO₂ chromatography (eluent: ethyl acetate/DCM) to provide the desired product.
ES/MS: 813.1 (M⁺).

1H NMR (400 MHz, Methanol-d4) δ 7.38 (d, J=17.6 Hz, 1H), 7.21 (d, J=14.2 Hz, 4H), 5.30 (d, J=3.3 Hz, 4H), 3.66 (dd, J=32.4, 10.3 Hz, 1H), 2.70 (s, 5H), 2.45 (s, OH), 2.38-2.24 (m, 1H), 2.17 (d, J=7.4 Hz, 1H), 1.51-1.40 (m, 5H), 1.31-1.27 (m, 14H), 0.84-0.49 (m, 8H).

tert-butyl (S)-6-(5-(7-(2-((S)-5-(tert-butoxycarbonyl)-5-azaspiro[2.4]heptan-6-yl)-1H-imidazol-5-yl)-5,10-dihydrochromeno[5,4,3-cde]chromen-2-yl)-4-(prop-1-en-2-yl)-1H-imidazol-2-yl)-5-azaspiro[2.4]heptane-5-carboxylate A solution of tert-butyl (S)-6-(4-bromo-5-(7-(2-((S)-5-(tert-butoxycarbonyl)-5-azaspiro[2.4]heptan-6-yl)-1H-imidazol-5-yl)-5,10-dihydrochromeno[5,4,3-cde]chromen-2-yl)-1H-imidazol-2-yl)-5-azaspiro[2.4]heptane-5-carboxylate (355.4 mg, 0.438 mmol), isopropenylboronic acid pinacol ester (200 μl, 1.064 mmol), palladium acetate (11.8 mg, 0.053 mmol), butyldi-1-adamantylphosphine (34.1 mg, 0.095 mmol) and potassium carbonate (182 mg, 1.317 mmol) in dioxane (8 mL) and water (4 mL) was degassed with argon for 10 min, then heated at 100 deg overnight. The reaction was diluted with EtOAc and washed with brine. The organic extract was dried over sodium sulfate and purified by normal phase $SiO_2$ chromatography (eluent: ethyl acetate/DCM) to provide the desired product.
ES/MS: 773.4 (M⁺).
1H NMR (400 MHz, Methanol-d4) δ 7.36 (d, J=16.2 Hz, 1H), 7.20 (d, J=13.7 Hz, 2H), 7.04-6.93 (m, 2H), 5.34-5.10 (m, 6H), 5.01 (dt, J=34.5, 7.2 Hz, 1H), 4.89 (s, 11H), 3.89-3.38 (m, 3H), 2.52-2.08 (m, 3H), 1.49 (s, 5H), 1.33-1.26 (m, 13H), 1.22 (s, 16H), 0.87-0.44 (m, 9H).

tert-butyl (S)-6-(5-(7-(2-((S)-5-(tert-butoxycarbonyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptane-5-carboxylate A solution of tert-butyl (S)-6-(5-(7-(2-((S)-5-(tert-butoxycarbonyl)-5-azaspiro[2.4]heptan-6-yl)-1H-imidazol-5-yl)-5,10-dihydrochromeno[5,4,3-cde]chromen-2-yl)-4-(prop-1-en-2-yl)-1H-imidazol-2-yl)-5-azaspiro[2.4]heptane-5-carboxylate (291.2 mg, 376.74 μmol) in EtOH (15 mL) was degassed with argon and vacuum. Pd/C (10%, 25.8 mg, 24.4 μmol) was added and the mixture was stirred with a balloon of $H_2$ overnight. The reaction was filtered over a Celite plug, rinsed with DCM and the filtrate was concentrated to give tert-butyl (S)-6-(5-(7-(2-((S)-5-(tert-butoxycarbonyl)-5-azaspiro[2.4]heptan-6-yl)-4-chloro-1H-imidazol-5-yl)-5,10-dihydrochromeno[5,4,3-cde]chromen-2-yl)-4-isopropyl-1H-imidazol-2-yl)-5-azaspiro[2.4]heptane-5-carboxylate, which was carried forward without further purification assuming quantitative yield.
ES/MS: 755.6 (M⁺).
1H NMR (400 MHz, Methanol-d4) δ 7.36 (d, J=15.7 Hz, 1H), 7.21 (d, J=13.0 Hz, 2H), 6.93 (d, J=6.6 Hz, 2H), 5.29 (s, 4H), 5.14-4.89 (m, 2H), 3.77 (d, J=10.3 Hz, 1H), 3.59-3.34 (m, 1H), 2.43-1.94 (m, 3H), 1.49 (s, 4H), 1.39-1.24 (m, 17H), 1.22 (s, 12H), 0.83-0.44 (m, 8H).

tert-butyl (S)-6-(5-(7-(2-((S)-5-(tert-butoxycarbonyl)-5-azaspiro[2.4]heptan-6-yl)-4-chloro-1H-imidazol-5-yl)-5,10-dihydrochromeno[5,4,3-cde]chromen-2-yl)-4-isopropyl-1H-imidazol-2-yl)-5-azaspiro[2.4]heptane-5-carboxylate To a suspension of tert-butyl (S)-6-(5-(7-(2-((S)-5-(tert-butoxycarbonyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptane-5-carboxylate (275.4 mg, 0.355 mmol) in MeOH (7 mL), was added AcOH (50 uL) and palau'chlor (84.8 mg, 0.405 mmol). The yellow solution was stirred at rt overnight. The reaction was diluted with DCM and washed with sat'd $NaHCO_3$ solution and dried with sodium sulfate. The crude residue was purified by normal phase $SiO_2$ chromatography (eluent: ethyl acetate/DCM) to provide the desired product.
ES/MS: 809.4 (M⁺).
1H NMR (400 MHz, Methanol-d4) δ 7.23 (d, J=21.8 Hz, 2H), 6.96 (d, J=5.4 Hz, 2H), 5.32 (d, J=3.8 Hz, 4H), 3.75 (s, 17H), 2.18 (d, J=7.6 Hz, 2H), 1.48 (s, 6H), 1.32 (dq, J=18.2, 4.0, 3.5 Hz, 22H), 1.22 (s, 4H), 0.94-0.48 (m, 9H).

methyl ((2S,3S)-1-((S)-6-(5-(7-(4-chloro-2-((S)-5-((methoxycarbonyl)-L-isoleucyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxopentan-2-yl)carbamate Example 16

To a solution of tert-butyl (S)-6-(5-(7-(2-((S)-5-(tert-butoxycarbonyl)-5-azaspiro[2.4]heptan-6-yl)-4-chloro-1H-imidazol-5-yl)-5,10-dihydrochromeno[5,4,3-cde]chromen-2-yl)-4-isopropyl-1H-imidazol-2-yl)-5-azaspiro[2.4]heptane-5-carboxylate (177 mg, 0.219 mmol) in DCM (8 mL), was added hydrochloric acid (4M in dioxane) (1500 μl). The reaction was stirred for 1 hr, then concentrated to dryness.
To a suspension of the crude residue, (methoxycarbonyl)-L-isoleucine (92 mg, 0.487 mmol), and HATU (191 mg, 0.503 mmol) in DMF (3 mL), was added N,N-Diisopropylethylamine (500 μl, 2.871 mmol). The reaction was stirred at rt overnight, then diluted with EtOAc and washed with 5% LiCl, sat'd $NaHCO_3$ solution, and brine. The organic extract was dried over sodium sulfate and purified by RP-HPLC (eluent: water/MeCN*0.1% TFA) to yield methyl ((2S,3S)-1-((S)-6-(5-(7-(4-chloro-2-((S)-5-((methoxycarbonyl)-L-isoleucyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxopentan-2-yl)carbamate (Example xx) as a bis-trifluoroacetate salt.
ES/MS: 925.6 (M+H⁺).
1H NMR (400 MHz, Methanol-d4) δ 7.40-7.16 (m, 2H), 7.09-6.89 (m, 2H), 5.42-5.22 (m, 5H), 5.18 (t, J=8.0 Hz, 1H), 4.15 (t, J=8.9 Hz, 2H), 4.03 (dd, J=29.7, 9.8 Hz, 2H), 3.83 (dd, J=24.2, 9.9 Hz, 2H), 3.67 (d, J=3.8 Hz, 5H), 3.59-3.47 (m, 1H), 2.48 (ddd, J=36.0, 12.8, 9.1 Hz, 2H), 2.17 (dd, J=12.9, 7.5 Hz, 1H), 2.12-2.00 (m, 1H), 1.79 (d, J=8.5 Hz, 2H), 1.62-1.47 (m, 2H), 1.46-1.30 (m, 6H), 1.17 (qd, J=13.3, 8.1 Hz, 2H), 1.06-0.51 (m, 18H).

Procedure 8 Example 24

Dimethyl ((2S,2'S,3S,3'S)-((2S,2'S)-((5,10-dihydrochromeno[5,4,3-cde]chromene-2,7-diyl)bis(4-bromo-1H-imidazole-5,2-diyl))bis(pyrrolidine-2,1-diyl))bis(3-methyl-1-oxopentane-1,2-diyl)) dicarbamate

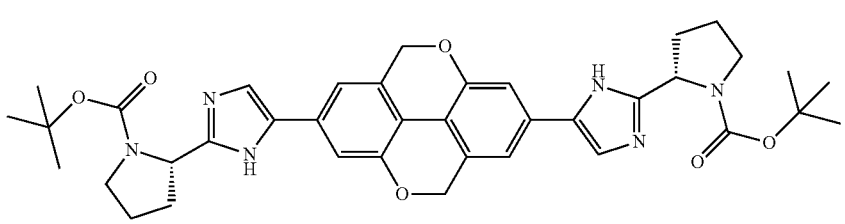
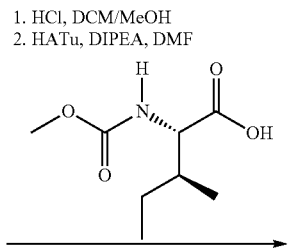

1. HCl, DCM/MeOH
2. HATu, DIPEA, DMF

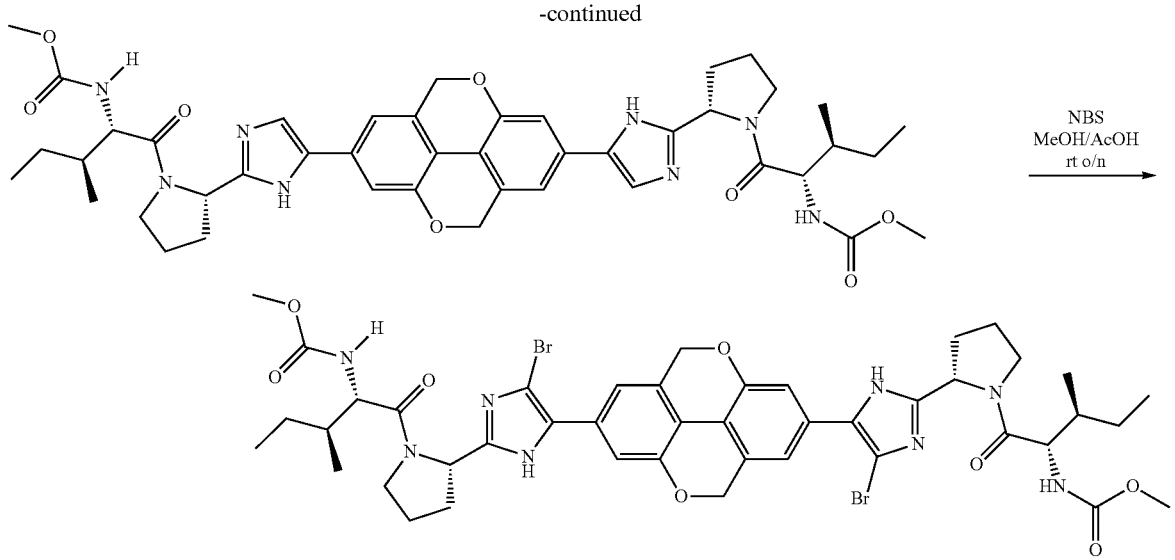

Dimethyl ((2S,2'S,3S,3'S)-((2S,2'S)-((5,10-dihydrochromeno[5,4,3-cde]chromene-2,7-diyl)bis(1H-imidazole-5,2-diyl))bis(pyrrolidine-2,1-diyl))bis(3-methyl-1-oxopentane-1,2-diyl))dicarbamate To a solution of di-tert-butyl 2,2'-((5,10-dihydrochromeno[5,4,3-cde]chromene-2,7-diyl)bis(1H-imidazole-5,2-diyl))(2S,2'S)-bis(pyrrolidine-1-carboxylate) (246 mg, 0.361 mmol) (obtained in the manner described in Procedure 1 substituting (tert-butoxycarbonyl)-L-proline with (S)-5-(tert-butoxycarbonyl)-5-azaspiro[2.4]heptane-6-carboxylic acid) in DCM (4 mL) and MeOH (1 mL), was added 4M hydrochloric acid (4M in dioxane) (2.5 mL). The reaction was heated to 40 deg for 1.5 hr. The reaction was concentrated to dryness.

To a solution of crude material, (methoxycarbonyl)-L-isoleucine (145 mg, 0.767 mmol), and HATU (289 mg, 0.761 mmol) in DMF (3 mL), was added N,N-diisopropylethylamine (500 µl, 2.87 mmol). After 2 hr, the reaction was diluted with EtOAc and washed with NaHCO₃ solution and brine. The organic extract was dried over sodium sulfate and purified by normal phase SiO₂ chromatography (eluent: MeOH/ethyl acetate) to provide the desired product.

ES/MS: 823.34 (M⁺).

1H NMR (400 MHz, Methanol-d4) δ 7.23 (d, J=52.7 Hz, 7H), 5.22 (s, 4H), 5.14 (t, J=6.4 Hz, 2H), 4.25 (d, J=8.5 Hz, 2H), 4.02 (s, 1H), 3.86 (s, 2H), 3.64 (s, 5H), 2.32 (d, J=18.0 Hz, 4H), 2.00 (s, 3H), 1.76 (s, 2H), 1.53 (s, 2H), 1.14 (s, 2H), 0.96-0.77 (m, 15H).

Dimethyl ((2S,2'S,3S,3'S)-((2S,2'S)-((5,10-dihydrochromeno[5,4,3-cde]chromene-2,7-diyl)bis(4-bromo-1H-imidazole-5,2-diyl))bis(pyrrolidine-2,1-diyl))bis(3-methyl-1-oxopentane-1,2-diyl))dicarbamate Example 24

To a suspension of dimethyl ((2S,2'S,3S,3'S)-((2S,2'S)-((5,10-dihydrochromeno[5,4,3-cde]chromene-2,7-diyl)bis(1H-imidazole-5,2-diyl))bis(pyrrolidine-2,1-diyl))bis(3-methyl-1-oxopentane-1,2-diyl))dicarbamate (50 mg, 0.061 mmol) in MeOH (3 mL) at 0 deg, was added AcOH (3 drops) and n-bromosuccinimide (24 mg, 0.135 mmol). The reaction was gradually warmed to rt and stirred for 2 hr. Added 100 uL TFA. Purified by RP-HPLC (eluent: water/MeCN*0.1% TFA) to yield product as a bis-trifluoroacetate salt.

ES/MS: 981.4 (M⁺).

1H NMR (400 MHz, Methanol-d4) δ 7.19 (d, J=11.3 Hz, 3H), 5.31 (s, 4H), 5.08 (t, J=7.1 Hz, 2H), 4.23 (d, J=8.2 Hz, 2H), 4.07 (dd, J=17.0, 8.1 Hz, 2H), 3.83 (q, J=7.5 Hz, 2H), 3.64 (s, 5H), 3.53 (s, 1H), 2.39 (dd, J=12.6, 6.6 Hz, 2H), 2.27 (dt, J=12.0, 5.7 Hz, 1H), 2.09 (ddt, J=31.2, 13.4, 7.1 Hz, 2H), 1.77 (d, J=9.3 Hz, 2H), 1.53 (d, J=11.4 Hz, 2H), 1.14 (dt, J=14.8, 7.5 Hz, 2H), 0.98-0.82 (m, 13H).

Procedure 9 Example 76

Dimethyl ((2S,2'S)-((2S,2'S)-(5,10-dihydrochromeno[5,4,3-cde]chromene-2,7-diyl)bis(4-(tert-butyl)-1H-imidazole-5,2-diyl))bis(pyrrolidine-2,1-diyl))bis(3-methyl-1-oxobutane-1,2-diyl))dicarbamate

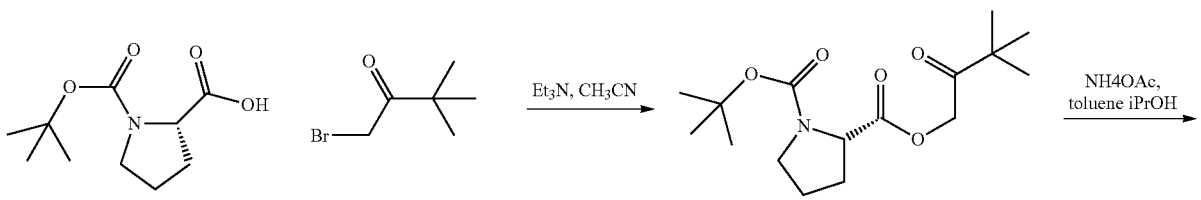

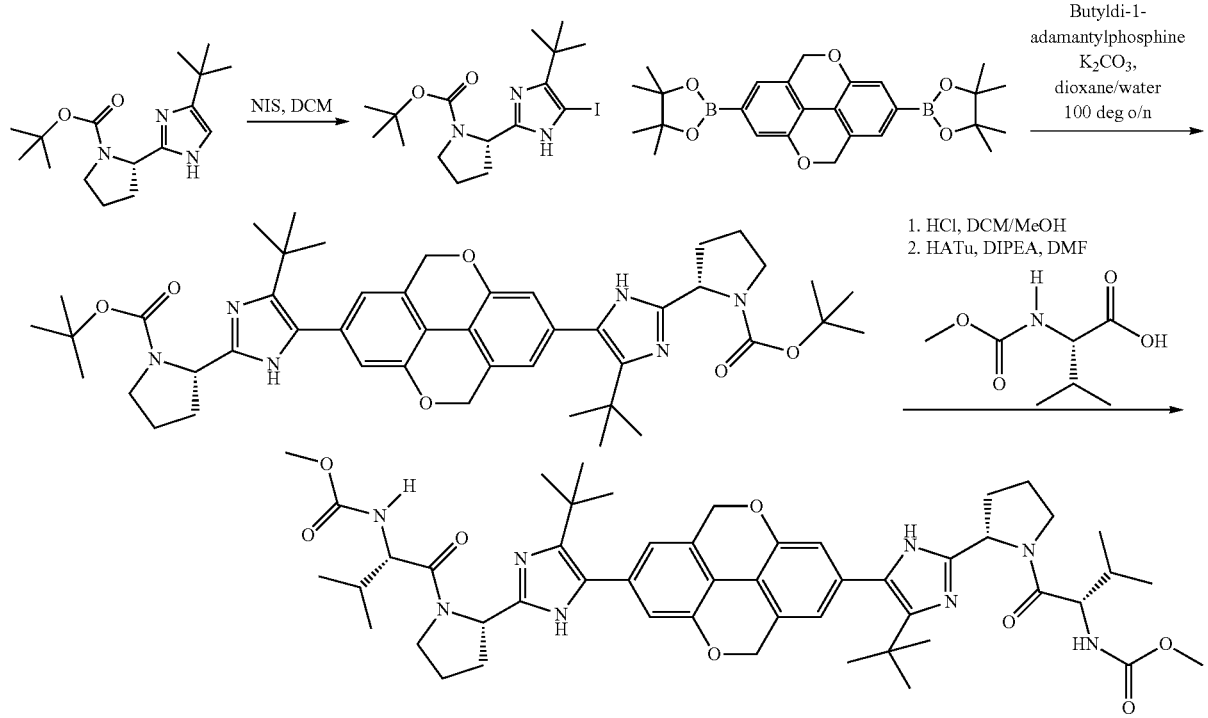

1-(Tert-butyl) 2-(3,3-dimethyl-2-oxobutyl) (S)-pyrrolidine-1,2-dicarboxylate To a solution of 1-bromo-3,3-dimethylbutan-2-one (0.750 mL, 5.58 mmol), (tert-butoxycarbonyl)-L-proline (1.2 g, 5.58 mmol) in CH$_3$CN (20 mL), was added triethylamine (1 ml, 7.17 mmol). The reaction was stirred at rt over the weekend. The reaction was diluted with DCM and washed with 1N HCl. The organic extract was dried over sodium sulfate to give desired product

Tert-butyl (S)-2-(4-(tert-butyl)-1H-imidazol-2-yl)pyrrolidine-1-carboxylate

A suspension of 1-(tert-butyl) 2-(3,3-dimethyl-2-oxobutyl) (S)-pyrrolidine-1,2-dicarboxylate (1.75 g, 5.58 mmol) and ammonium acetate (4.34 g, 56.3 mmol) in toluene (8 mL) and iso-propanol (1 mL) was heated at reflux overnight. The reaction mixture was diluted with EtOAc and washed with NaHCO$_3$ solution 3×. The organic extract was dried over sodium sulfate and purified by normal phase SiO$_2$ chromatography (eluent: MeOH/ethyl acetate) to provide the desired product.

ES/MS: 294.0 (M$^+$).

Multiplet Report 1H NMR (400 MHz, Chloroform-d) δ 6.57 (s, 1H), 4.90 (dd, J=7.7, 2.5 Hz, 1H), 3.50-3.26 (m, 2H), 2.90 (s, 1H), 2.17-2.04 (m, 3H), 1.93 (d, J=12.0 Hz, 2H), 1.47 (s, 10H), 1.26 (s, 11H).

Tert-butyl (S)-2-(4-(tert-butyl)-5-iodo-1H-imidazol-2-yl)pyrrolidine-1-carboxylate To a solution tert-butyl (S)-2-(4-(tert-butyl)-1H-imidazol-2-yl)pyrrolidine-1-carboxylate (0.458 g, 1.56 mmol) in DCM (7 mL), was added N-Iodosuccinimide (0.534 g, 2.37 mmol). Stirred at rt overnight. Concentrated and purified by normal phase SiO$_2$ chromatography (eluent: ethyl acetate/hexane) to provide the desired product.

ES/MS: 420.1 (M$^+$).

1H NMR (400 MHz, Chloroform-d) δ 10.69 (s, 1H), 5.02-4.78 (m, 1H), 3.48-3.26 (m, 2H), 2.89 (s, 1H), 2.05 (d, J=12.0 Hz, 2H), 1.90 (q, J=4.4 Hz, 1H), 1.47 (s, 9H), 1.38 (s, 9H).

Di-tert-butyl 2,2'-((5,10-dihydrochromeno[5,4,3-cde]chromene-2,7-diyl)bis(4-(tert-butyl)-1H-imidazole-5,2-diyl))(2S,2'S)-bis(pyrrolidine-1-carboxylate)

In a 40 mL reaction vial, a suspension of 2,7-bis(4,4,5,5-tetramethyl-1,3,2-dioxaborolan-2-yl)-5,10-dihydrochromeno[5,4,3-cde]chromene (100 mg, 0.216 mmol), tert-butyl (S)-2-(4-(tert-butyl)-5-iodo-1H-imidazol-2-yl)pyrrolidine-1-carboxylate (181 mg, 433 mmol), palladium acetate (2.5 mg, 0.011 mmol), butyldi-1-adamantylphosphine min. 95% (9 mg, 0.025 mmol), and potassium carbonate (134 mg, 0.970 mmol) in dioxane (4 mL) and water (2 mL) was degassed for 10 min with argon, then heated at 100 deg overnight. The reaction mixture was diluted with DCM and washed with brine 2×. Dried over sodium sulfate, concentrated, and purified by normal phase SiO$_2$ chromatography (eluent: ethyl acetate/DCM) to provide the desired product.

ES/MS: 793.3 (M$^+$).

$^1$H NMR (400 MHz, cd$_3$od) δ 6.79 (d, J=3.7 Hz, 4H), 5.25 (s, 4H), 4.76 (s, 2H), 3.63 (s, 3H), 3.47 (s, 3H), 2.41-2.18 (m, 2H), 1.89 (dd, J=11.6, 6.5 Hz, 2H), 1.29 (s, 18H), 1.26 (d, J=4.3 Hz, 18H).

Dimethyl ((2S,2'S)-((2S,2'S)-((5,10-dihydrochromeno[5,4,3-cde]chromene-2,7-diyl)bis(4-(tert-butyl)-1H-imidazole-5,2-diyl))bis(pyrrolidine-2,1-diyl))bis(3-methyl-1-oxobutane-1,2-diyl))dicarbamate Example 76

To a solution of Di-tert-butyl 2,2'-((5,10-dihydrochromeno[5,4,3-cde]chromene-2,7-diyl)bis(4-(tert-butyl)-1H-imidazole-5,2-diyl))(2S,2'S)-bis(pyrrolidine-1-carboxylate) (112 mg, 0.141 mmol) in DCM (4 mL) and MeOH (1 mL), was added 4M hydrochloric acid (4m in dioxane) (1 ml). The reaction was heated to 40 deg for 1 hr. The reaction was concentrated to dryness.

To a solution of HCl salt (94 mg, 0.141 mmol), Moc-L-valine (50.9 mg, 0.291 mmol), and HATU (115 mg, 0.302 mmol) in DMF (2 mL), was added N,N-Diisopropylethylamine (200 µl, 1.15 mmol). Stirred at rt for 2 hr. Added 10 drops TFA. Purified by RP-HPLC (eluent: water/MeCN*0.1% TFA) to yield product as a bis-trifluoroacetate salt.

ES/MS: 907.3 (M+).

1H NMR (400 MHz, Methanol-d4) δ 6.99-6.90 (m, 3H), 5.33 (d, J=3.3 Hz, 4H), 5.15 (t, J=7.7 Hz, 2H), 4.19 (d, J=7.2 Hz, 2H), 4.07 (s, 2H), 3.78 (q, J=8.2 Hz, 2H), 3.63 (d, J=9.9 Hz, 5H), 2.52 (d, J=14.6 Hz, 2H), 2.34-1.87 (m, 8H), 1.33 (d, J=13.3 Hz, 18H), 0.90 (t, J=6.3 Hz, 9H).

Procedure 10 Example 25

N,N'-((2S,2'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(3-methyl-1-oxobutane-1,2-diyl))dicyclopropanecarboxamide

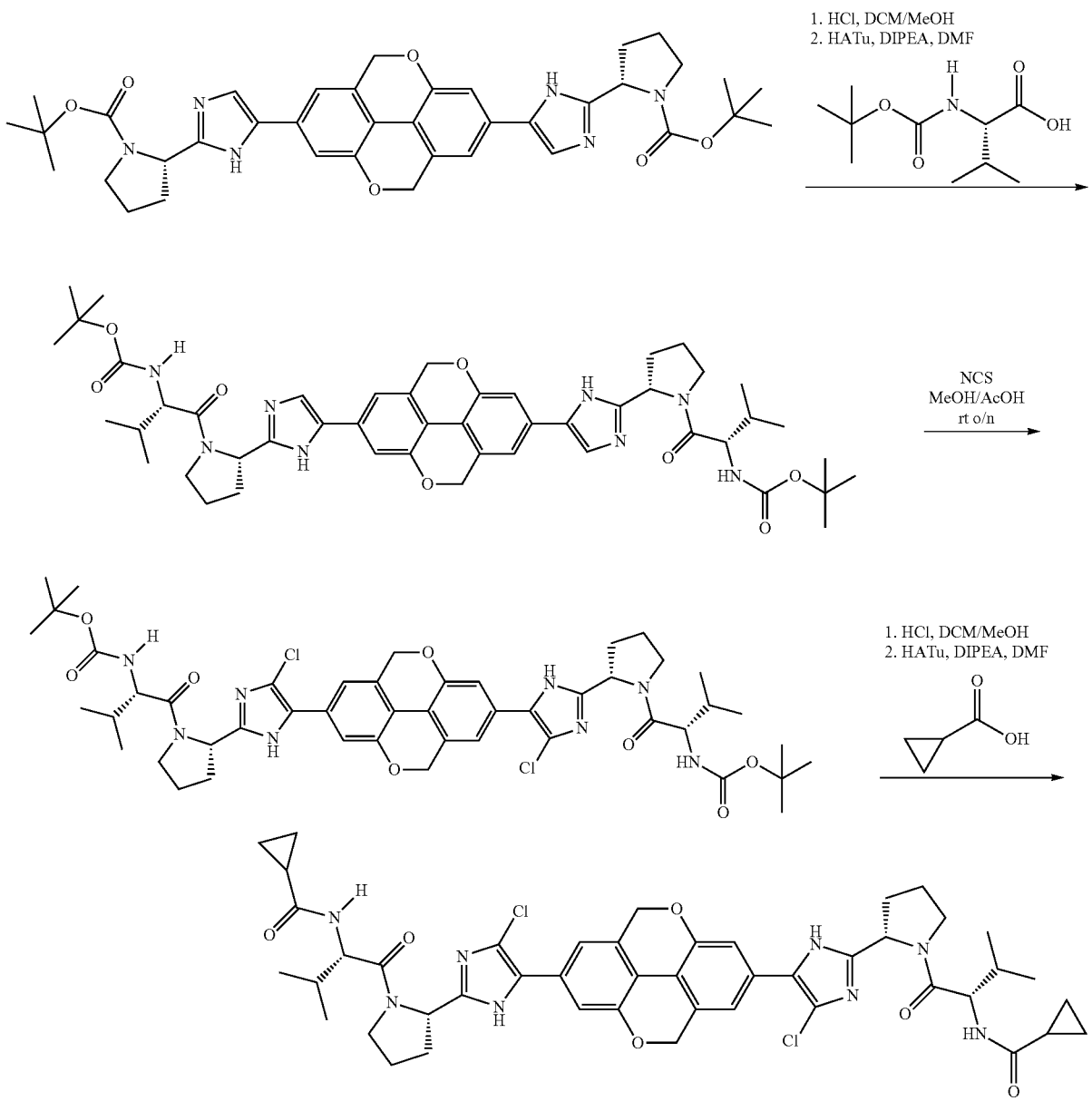

Di-tert-butyl ((2S,2'S)-((2S,2'S)-((5,10-dihydro-chromeno[5,4,3-cde]chromene-2,7-diyl)bis(1H-imidazole-5,2-diyl))bis(pyrrolidine-2,1-diyl))bis(3-methyl-1-oxobutane-1,2-diyl))dicarbamate To a solution of di-tert-butyl 2,2'-((5,10-dihydrochromeno[5,4,3-cde]chromene-2,7-diyl)bis(1H-imidazole-5,2-diyl))(2S,2'S)-bis(pyrrolidine-1-carboxylate) (447 mg, 0.657 mmol) (obtained in the manner described in Procedure 1 substituting (tert-butoxycarbonyl)-L-proline with (S)-5-(tert-butoxycarbonyl)-5-azaspiro[2.4]heptane-6-carboxylic acid) in DCM (8 mL) and MeOH (2 mL), was added 4M HYDROCHLORIC ACID (4M in dioxane) (4.5 mL). The reaction was heated to 40 deg for 1.5 hr. The reaction was concentrated to dryness.

To a solution of crude material, (tert-butoxycarbonyl)-L-valine (302 mg, 1.39 mmol), and HATU (525 mg, 1.38 mmol) in DMF (5 mL), was added N,N-Diisopropylethylamine (900 µl, 5.17 mmol). The reaction was stirred at rt overnight. The reaction was diluted with EtOAc and washed with NaHCO₃ solution and brine. The organic extract was dried over sodium sulfate and purified by normal phase $SiO_2$ chromatography (eluent: MeOH/ethyl acetate) to provide the desired product.

ES/MS: 879.3 (M⁺).

1H NMR (400 MHz, Methanol-d4) δ 7.28 (s, 4H), 7.12 (d, J=13.9 Hz, 9H), 5.23 (s, 10H), 5.15 (t, J=6.6 Hz, 4H), 4.19 (d, J=7.1 Hz, 4H), 3.93 (s, 1H), 3.86 (s, 5H), 2.40-2.11 (m, 14H), 2.00 (s, 8H), 1.44 (s, 39H), 1.33 (s, 8H), 0.95 (dd, J=14.9, 6.9 Hz, 19H), 0.87 (d, J=6.7 Hz, 13H).

Di-tert-butyl ((2S,2'S)-((2S,2'S)-((5,10-dihydro-chromeno[5,4,3-cde]chromene-2,7-diyl)bis(4-chloro-1H-imidazole-5,2-diyl))bis(pyrrolidine-2,1-diyl))bis(3-methyl-1-oxobutane-1,2-diyl))dicarbamate To a suspension of di-tert-butyl ((2S,2'S)-((2S,2'S)-((5,10-dihydrochromeno[5,4,3-cde]chromene-2,7-diyl)bis(1H-imidazole-5,2-diyl))bis(pyrrolidine-2,1-diyl))bis(3-methyl-1-oxobutane-1,2-diyl))dicarbamate (413 mg, 0.470 mmol) in MeOH (10 mL), was added AcOH (10 drops) and n-chlorosuccinimide (137 mg, 1.03 mmol). The reaction was stirred at rt for 5 hr. The reaction was diluted with DCM and washed with sat'd NaHCO₃ solution and dried with sodium sulfate. Purification by normal phase $SiO_2$ chromatography (eluent: MeOH/ethyl acetate) to provide the desired product.

ES/MS: 948.1 (M⁺).

1H NMR (400 MHz, Methanol-d4) δ 7.18 (dd, J=26.2, 13.8 Hz, 4H), 5.27 (s, 5H), 5.06 (t, J=6.8 Hz, 2H), 4.17 (d, J=7.2 Hz, 2H), 3.95 (d, J=7.9 Hz, 1H), 3.90-3.80 (m, 2H), 2.80 (s, 7H), 2.68 (s, 3H), 2.42-2.19 (m, 3H), 2.19-1.94 (m, 4H), 1.43 (s, 14H), 0.96 (dd, J=12.7, 6.8 Hz, 7H), 0.89 (d, J=6.7 Hz, 5H).

N,N'-((2S,2'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(3-methyl-1-oxobutane-1,2-diyl))dicyclopropanecarboxamide (example 25)

To a solution of di-tert-butyl ((2S,2'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(3-methyl-1-oxobutane-1,2-diyl))dicarbamate (329 mg, 0.347 mmol) in DCM (8 mL) and MeOH (2 mL), was added 4M hydrochloric acid (4M in dioxane) (2.5 ml). The reaction was heated to 40 deg for 2 hr. The reaction was concentrated to dryness.

To a solution of crude HCl salt (71.3 mg, 0.087 mmol), cyclopropanecarboxylic acid (0.014 mL, 0.179 mmol), and HATU (72.8 mg, 0.191 mmol) in DMF (1.5 mL), was added N,N-diisopropylethylamine (250 µl, 0.718 mmol). Stirred at rt overnight. Added 10 drops TFA. Purified by RP-HPLC (eluent: water/MeCN*0.1% TFA) to yield product as a bis-trifluoroacetate salt.

ES/MS: 885.0 (M⁺).

1H NMR (400 MHz, Methanol-d4) δ 7.42-7.09 (m, 3H), 5.31-5.22 (m, 4H), 5.06 (dd, J=7.8, 6.1 Hz, 2H), 4.42 (d, J=7.9 Hz, 2H), 4.11-3.96 (m, 2H), 3.91-3.76 (m, 2H), 2.47-2.32 (m, 1H), 2.24 (dd, J=11.6, 6.1 Hz, 1H), 2.07 (ddd, J=21.3, 13.8, 6.9 Hz, 6H), 1.70 (ddd, J=9.2, 7.2, 3.9 Hz, 2H), 1.03 (dd, J=15.4, 6.8 Hz, 2H), 0.96 (d, J=6.9 Hz, 9H), 0.88-0.72 (m, 6H).

Tetracyclic Zika Tables
Compound Table

The following compounds were prepared according to the Examples and Procedures described herein and indicated in Table 1 using the appropriate starting material(s) and appropriate protecting group chemistry as needed.

TABLE 1

| Example # | ES/MS m/z | procedure |
|---|---|---|
| 1 | (MH+) 893 | 2 |
| 2 | (M+) 920 | 2 |
| 3 | (MH+) 1029 | 2 |
| 4 | (MH+) 924.6 | 2 |
| 5 | (MH+) 952.8 | 2 |
| 6 | (MH+) 1060.5 | 2 |
| 7 | (MH+) 921.6 | 2 |
| 8 | (MH+) 948.5 | 2 |
| 9 | (MH+) 1057.4 | 2 |
| 10 | (MH+) 888.7 | 2 |
| 11 | (MH+) 917.5 | 2 |
| 12 | (MH+) 1025.3 | 2 |
| 13 | (MH+) 892.4 | 2 |
| 14 | (MH+) 920.4 | 2 |
| 15 | (M+) 923.7 | 7 |
| 16 | (MH+) 925.6 | 7 |
| 17 | 875.2 (M+) | 5 |
| 18 | 851.4 (M+) | 6 |
| 19 | (M+) 879.4 | 6 |
| 20 | (M + H+) 896.4 | 3 |
| 21 | (M+) 997.4 | 3 |
| 22 | (M+) 1031.3 | 3 |
| 23 | (M+) 933.4 | 3 |

TABLE 1-continued

| Example # | ES/MS m/z | procedure |
|---|---|---|
| 24 | (MH+) 981.4 | 8 |
| 25 | (MH+) 885.0 | 10 |
| 26 | (MH+) 893.1 | 2 |
| 27 | (M+) 1000.4 | 2 |
| 28 | (M+) 919.4 | 2 |
| 29 | (M+) 943.3 | 2 |
| 30 | (M+) 909.3 | 2 |
| 31 | (MH+) 919.2 | 2 |
| 32 | (M+) 891.3 | 2 |
| 33 | (M+) 919.2 | 2 |
| 34 | (M+) 1027.2 | 2 |
| 35 | (MH+) 1081.3 | 2 |
| 36 | (MH+) 973.3 | 2 |
| 37 | (M+) 971.2 | 2 |
| 38 | (MH+) 1109.3 | 2 |
| 39 | (MH+) 1001.3 | 2 |
| 40 | (M+) 907.4 | 6 |
| 41 | (M+) 935.4 | 6 |
| 42 | (M+) 1043.5 | 6 |
| 43 | (M+) 899.4 | 7 |
| 44 | (M+) 927.5 | 7 |
| 45 | (M+) 953.2 | 3 |
| 46 | (M+) 888.4 | 3 |
| 47 | (M+) 924.5 | 3 |
| 48 | (M+) 891.3 | 3 |
| 49 | (M+) 952.3 | 3 |
| 50 | (M+) 900.2 | 2 |
| 51 | (M+) 929.2 | 2 |
| 52 | (M+) 1036.4 | 2 |
| 53 | (M+) 899.5 | 2 |
| 54 | (M+) 928.6 | 2 |
| 55 | (M+) 1036.3 | 2 |
| 56 | (M+) 936.3 | 2 |
| 57 | (M+) 963.3 | 2 |
| 58 | (M+) 1073.3 | 2 |
| 59 | (M+) 915.5 | 2 |
| 60 | (M+) 945.3 | 2 |
| 61 | (M+) 1052.3 | 2 |
| 62 | (M+) 892.5 | 2 |
| 63 | (M+) 920.5 | 2 |
| 64 | (M+) 891.3 | 2 |
| 65 | (M+) 1029.3 | 2 |
| 66 | 919.4 | 2 |
| 67 | 886.63 | 2 |
| 68 | 921.04 | 2 |
| 69 | 936.98 | 7 |
| 70 | 894.32 | 2 |
| 71 | 904.37 | 6 |
| 72 | 907.78 | 6 |
| 73 | 928.74 | 2 |
| 74 | 892.23 | 2 |
| 75 | 857.49 | 2 |
| 76 | 907.3 | 9 |
| 77 | 923.7 | 7 |
| 78 | 952 | 7 |
| 79 | 879.6 | 6 |
| 80 | 900.8 | 7 |
| 81 | 924.8 | 7 |
| 82 | 953.1 | 7 |
| 83 | 951.9 | 7 |
| 84 | 900.7 | 7 |
| 85 | 1060.9 | 7 |

1HNMR

Proton NMR data is shown in Table 2.

TABLE 2

| # | 1H-NMR |
|---|---|
| 1 | 1H NMR (400 MHz, Methanol-d4) δ 7.20-7.11 (m, 4H), 5.33-5.20 (m, 6H), 5.20-5.09 (m, 1H), 4.22 (d, J = 7.5 Hz, 2H), 4.15-3.94 (m, 2H), 3.67 (s, 5H), 3.59-3.43 (m, 3H), 2.85-2.63 (m, 2H), 2.45 (d, J = 12.0 Hz, 1H), 2.31-2.13 (m, 2H), 2.13-1.91 (m, 4H), 1.15 (dd, J = 6.6, 3.4 Hz, 8H), 0.99 (d, J = 6.8 Hz, 8H), 0.95 (d, J = 6.7 Hz, 6H). |
| 2 | 1H NMR (400 MHz, Methanol-d4) δ 7.19-7.05 (m, 4H), 5.26 (d, J = 11.8 Hz, 4H), 5.19 (dd, J = 8.3, 4.5 Hz, 2H), 4.25 (dd, J = 8.6, 2.6 Hz, 2H), 4.02 (dd, J = 9.8, 6.9 Hz, 2H), 3.67 (s, 6H), 3.60 (dd, J = 9.9, 6.9 Hz, 2H), 3.53 (d, J = 2.7 Hz, 1H), 2.78 (q, J = 6.9 Hz, 2H), 2.46 (d, J = 11.5 Hz, 1H), 2.28-2.07 (m, 2H), 2.07-1.90 (m, 2H), 1.82 (d, J = 10.3 Hz, 3H), 1.70-1.41 (m, 2H), 1.15 (d, J = 6.7 Hz, 8H), 0.93 (dt, J = 12.6, 7.1 Hz, 15H). |
| 3 | 1H NMR (400 MHz, Methanol-d4) δ 7.29-7.12 (m, 4H), 5.39-5.22 (m, 4H), 5.17 (dd, J = 8.3, 4.2 Hz, 1H), 4.60 (d, J = 2.7 Hz, 1H), 4.05 (td, J = 10.8, 9.6, 7.2 Hz, 2H), 3.69 (s, 4H), 3.46 (s, 2H), 3.01 (dd, J = 11.7, 9.3 Hz, 1H), 2.79 (dd, J = 13.8, 6.9 Hz, 1H), 2.43 (s, 1H), 2.26 (ddd, J = 13.6, 6.7, 4.7 Hz, 2H), 2.15-2.06 (m, 0H), 2.06-1.90 (m, 1H), 1.27 (s, 6H), 1.21 (d, J = 4.3 Hz, 6H), 1.14 (t, J = 6.9 Hz, 6H). |

TABLE 2-continued

| # | 1H-NMR |
|---|---|
| 4 | 1H NMR (400 MHz, Methanol-d4) δ 7.38-7.13 (m, 4H), 5.54-5.24 (m, 5H), 5.15 (dd, J = 8.5, 6.5 Hz, 2H), 4.40-4.04 (m, 6H), 3.87-3.73 (m, 3H), 3.68 (s, 4H), 3.58 (s, 2H), 3.42 (s, 4H), 3.21 (s, 2H), 2.74-2.56 (m, 2H), 2.56-2.40 (m, 1H), 2.27 (dt, J = 12.9, 6.4 Hz, 1H), 2.08 (dt, J = 12.8, 6.4 Hz, 2H), 0.97 (td, J = 13.2, 11.9, 6.8 Hz, 12H). |
| 5 | 1H NMR (400 MHz, Methanol-d4) δ 7.38-7.12 (m, 4H), 5.45-5.28 (m, 5H), 5.15 (dd, J = 8.5, 6.7 Hz, 2H), 4.38-4.02 (m, 6H), 3.96-3.73 (m, 3H), 3.68 (s, 4H), 3.56 (s, 2H), 3.42 (s, 4H), 3.21 (s, 2H), 2.73-2.54 (m, 2H), 2.50 (ddd, J = 13.6, 8.5, 4.6 Hz, 1H), 2.28 (dt, J = 13.0, 6.5 Hz, 2H), 1.81 (d, J = 8.6 Hz, 3H), 1.69-1.49 (m, 1H), 1.23-1.06 (m, 2H), 1.03-0.75 (m, 12H). |
| 6 | 1H NMR (400 MHz, Methanol-d4) δ 7.20 (d, J = 16.0 Hz, 4H), 5.34 (d, J = 3.6 Hz, 5H), 5.13 (dd, J = 8.5, 6.5 Hz, 1H), 4.65 (s, 1H), 4.29 (dd, J = 10.2, 5.9 Hz, 1H), 4.20 (t, J = 5.7 Hz, 1H), 4.10 (s, 1H), 3.98 (d, J = 13.3 Hz, 1H), 3.81 (dd, J = 10.3, 5.3 Hz, 1H), 3.70 (s, 4H), 3.45 (d, J = 5.5 Hz, 6H), 3.20 (s, 3H), 2.68-2.44 (m, 2H), 2.31 (dt, J = 13.0, 6.4 Hz, 1H), 1.24 (dd, J = 19.7, 6.8 Hz, 12H). |
| 7 | 1H NMR (400 MHz, Methanol-d4) δ 7.17 (dd, J = 23.7, 1.4 Hz, 4H), 5.36-5.17 (m, 5H), 5.09 (dd, J = 10.4, 7.5 Hz, 2H), 4.19 (d, J = 7.8 Hz, 2H), 3.92 (d, J = 9.9 Hz, 2H), 3.65 (d, J = 8.8 Hz, 8H), 2.16 (d, J = 7.7 Hz, 1H), 2.12-1.90 (m, 4H), 1.27 (s, 6H), 1.13 (s, 7H), 0.94 (dd, J = 12.7, 6.7 Hz, 14H). |
| 8 | 1H NMR (400 MHz, Methanol-d4) δ 7.25-6.96 (m, 4H), 5.36-5.14 (m, 5H), 5.10 (dd, J = 10.2, 7.6 Hz, 2H), 4.24 (d, J = 8.3 Hz, 2H), 3.96 (d, J = 9.8 Hz, 2H), 3.79-3.58 (m, 9H), 2.32-2.01 (m, 4H), 1.80 (d, J = 10.2 Hz, 3H), 1.53 (q, J = 9.5, 8.9 Hz, 3H), 1.27 (s, 7H), 1.21-1.00 (m, 9H), 1.00-0.83 (m, 15H). |
| 9 | 1H NMR (400 MHz, Methanol-d4) δ 7.28-7.14 (m, 4H), 5.35-5.25 (m, 4H), 5.07 (dd, J = 10.2, 7.7 Hz, 2H), 3.94 (d, J = 9.9 Hz, 2H), 3.69 (s, 5H), 3.63 (d, J = 9.8 Hz, 2H), 3.42 (s, 1H), 2.24-2.03 (m, 3H), 1.35-1.15 (m, 17H), 1.11 (d, J = 13.6 Hz, 6H). |
| 10 | 1H NMR (400 MHz, DMSO-d6) δ 12.63 (s, 1H), 7.40-7.15 (m, 4H), 5.40-5.25 (m, 4H), 4.29 (t, J = 8.3 Hz, 1H), 3.88 (d, J = 7.2 Hz, 1H), 3.55 (s, 4H), 2.82-2.54 (m, 1H), 2.03 (ddd, J = 13.2, 10.7, 5.1 Hz, 3H), 1.77 (t, J = 7.3 Hz, 2H), 1.56 (s, 2H), 0.84 (d, J = 16.5, 6.77 Hz, 10H). |
| 11 | 1H NMR (400 MHz, Methanol-d4) δ 7.18 (dd, J = 20.2, 1.4 Hz, 4H), 5.47 (dd, J = 10.8, 3.9 Hz, 2H), 5.27 (s, 4H), 4.48 (d, J = 8.0 Hz, 2H), 3.93 (dt, J = 6.2, 3.2 Hz, 2H), 3.68 (s, 6H), 2.73 (td, J = 12.7, 6.5 Hz, 2H), 2.32 (dd, J = 13.4, 4.0 Hz, 2H), 2.01-1.81 (m, 2H), 1.51 (ddt, J = 10.3, 7.4, 3.9 Hz, 4H), 1.16 (dt, J = 14.5, 7.6 Hz, 2H), 1.02 (dt, J = 8.3, 5.7 Hz, 3H), 0.95-0.80 (m, 14H). |
| 12 | 1H NMR (400 MHz, Methanol-d4) δ 7.18 (dd, J = 8.0, 1.4 Hz, 4H), 5.44 (dd, J = 10.9, 3.9 Hz, 2H), 5.30 (s, 4H), 5.20 (s, 2H), 3.96 (d, J = 7.3 Hz, 2H), 3.70 (s, 6H), 3.51 (s, 1H), 3.02 (s, 1H), 2.88 (d, J = 0.7 Hz, 1H), 2.73 (td, J = 12.3, 11.4, 6.4 Hz, 2H), 2.36 (dd, J = 13.4, 4.0 Hz, 2H), 1.92 (q, J = 7.3, 6.7 Hz, 2H), 1.57 (s, 2H), 1.24 (d, J = 8.1 Hz, 13H), 1.12-0.96 (m, 2H). |
| 13 | 1H NMR (400 MHz, Methanol-d4) δ 7.47-7.14 (m, 4H), 5.85 (s, 1H), 5.64 (s, 2H), 5.29 (d, J = 13.8 Hz, 4H), 4.50 (d, J = 8.2 Hz, 2H), 4.03 (s, 1H), 3.78 (s, 5H), 3.68 (s, 2H), 3.59 (s, 0H), 3.02 (s, 1H), 2.88 (d, J = 0.7 Hz, 1H), 2.84 (s, 0H), 2.66 (d, J = 13.3 Hz, 2H), 2.41 (d, J = 13.6 Hz, 1H), 2.05 (dt, J = 13.4, 6.8 Hz, 2H), 1.81 (td, J = 27.9, 26.0, 12.4 Hz, 7H), 1.57-1.23 (m, 2H), 1.16-1.01 (m, 10H), 0.97 (dd, J = 15.6, 6.7 Hz, 4H). |
| 14 | 1H NMR (400 MHz, Methanol-d4) δ 7.50-7.17 (m, 4H), 5.86 (s, 1H), 5.62 (s, 2H), 5.41-5.18 (m, 5H), 4.70-4.40 (m, 5H), 4.04 (s, 1H), 3.78 (s, 4H), 3.67 (s, 2H), 3.58 (s, 1H), 2.65 (d, J = 13.4 Hz, 2H), 2.43 (t, J = 12.4 Hz, 1H), 2.25 (d, J = 13.2 Hz, 1H), 2.04 (d, J = 9.0 Hz, 1H), 1.80 (dd, J = 33.8, 19.3 Hz, 12H), 1.54-1.40 (m, 1H), 1.31 (s, 2H), 1.07 (d, J = 6.7 Hz, 5H), 0.95 (dq, J = 21.4, 7.5 Hz, 8H). |
| 15 | 1H NMR (400 MHz, Methanol-d4) δ 7.43-7.14 (m, 2H), 7.10-6.89 (m, 2H), 5.39-5.23 (m, 5H), 5.18 (t, J = 7.9 Hz, 1H), 4.13 (d, J = 7.7 Hz, 2H), 4.05 (d, J = 9.7 Hz, 1H), 3.98 (d, J = 9.7 Hz, 1H), 3.80 (dd, J = 17.3, 9.8 Hz, 2H), 3.67 (d, J = 3.1 Hz, 5H), 3.58 (d, J = 8.4 Hz, 1H), 2.49 (dd, J = 12.9, 9.7 Hz, 1H), 2.40 (dd, J = 12.7, 8.2 Hz, 1H), 2.23-1.96 (m, 4H), 1.48-1.27 (m, 6H), 1.03 (td, J = 6.2, 3.9 Hz, 2H), 0.98-0.86 (m, 10H), 0.83 (d, J = 6.6 Hz, 1H), 0.75 (q, J = 6.4, 5.5 Hz, 1H), 0.65 (d, J = 6.4 Hz, 0H). |
| 16 | 1H NMR (400 MHz, Methanol-d4) δ 7.40-7.16 (m, 2H), 7.09-6.89 (m, 2H), 5.42-5.22 (m, 5H), 5.18 (t, J = 8.0 Hz, 1H), 4.15 (t, J = 8.9 Hz, 2H), 4.03 (dd, J = 29.7, 9.8 Hz, 2H), 3.83 (dd, J = 24.2, 9.9 Hz, 2H), 3.67 (d, J = 3.8 Hz, 5H), 3.59-3.47 (m, 1H), 2.48 (ddd, J = 36.0, 12.8, 9.1 Hz, 2H), 2.17 (dd, J = 12.9, 7.5 Hz, 1H), 2.12-2.00 (m, 1H), 1.79 (d, J = 8.5 Hz, 2H), 1.62-1.47 (m, 2H), 1.46-1.30 (m, 6H), 1.17 (qd, J = 13.3, 8.1 Hz, 2H), 1.06-0.51 (m, 18H). |
| 17 | 1H NMR (400 MHz, Methanol-d4) δ 7.85 (s, 1H), 7.24 (s, 1H), 7.21 (d, J = 1.5 Hz, 2H), 7.16 (s, 1H), 5.33 (d, J = 6.9 Hz, 4H), 5.21 (t, J = 7.5 Hz, 1H), 5.14-5.00 (m, 1H), 4.28-4.16 (m, 2H), 3.99 (d, J = 8.1 Hz, 1H), 3.84 (d, J = 9.4 Hz, 2H), 3.64 (d, J = 4.2 Hz, 5H), 2.56 (s, 1H), 2.44-2.21 (m, 1H), 2.13 (dt, J = 13.3, 6.5 Hz, 1H), 2.03 (q, J = 6.5 Hz, 1H), 1.06-0.83 (m, 12H). |
| 18 | 1H NMR (400 MHz, Methanol-d4) δ 7.00 (dd, J = 9.8, 1.4 Hz, 4H), 5.36 (s, 5H), 5.15 (t, J = 7.7 Hz, 2H), 4.21 (d, J = 7.3 Hz, 2H), 4.15-4.05 (m, 1H), 3.84 (q, J = 9.0, 8.5 Hz, 2H), 3.65 (s, 6H), 2.96-2.71 (m, 5H), 2.55 (p, J = 5.4, 4.7 Hz, 2H), 2.27 (t, J = 5.2 Hz, 1H), 2.15 (q, J = 8.0 Hz, 3H), 2.09-1.98 (m, 1H), 1.29 (t, J = 7.6 Hz, 6H), 0.91 (dd, J = 11.0, 6.7 Hz, 12H). |
| 19 | 1H NMR (400 MHz, Methanol-d4) δ 6.97 (dd, J = 10.0, 1.4 Hz, 3H), 5.37 (s, 4H), 5.15 (t, J = 7.9 Hz, 2H), 4.20 (d, J = 7.3 Hz, 2H), 4.11 (d, J = 8.8 Hz, 2H), 3.83 (q, J = 8.6 Hz, 2H), 3.65 (s, 5H), 2.55 (d, J = 8.4 Hz, 2H), 2.26 (s, 2H), 2.16 (d, J = 11.4 Hz, 4H), 2.09-1.98 (m, 1H), 1.34 (dd, J = 17.0, 7.0 Hz, 11H), 0.91 (dd, J = 9.8, 6.8 Hz, 9H). |
| 20 | 1H NMR (400 MHz, Methanol-d4) δ 7.17 (dd, J = 12.1, 1.4 Hz, 4H), 5.29 (s, 4H), 4.90 (s, 2H), 3.98 (d, J = 7.2 Hz, 2H), 3.65 (s, 6H), 2.07 (q, J = 6.9 Hz, 2H), 1.02 (s, 18H), 0.90 (t, J = 6.8 Hz, 12H). |
| 21 | 1H NMR (400 MHz, Methanol-d4) δ 7.90 (d, J = 18.6 Hz, 1H), 7.40 (d, J = 24.8 Hz, 1H), 7.29-7.15 (m, 3H), 5.31 (t, J = 6.3 Hz, 4H), 5.14 (d, J = 8.9 Hz, 1H), 4.97 (d, J = 8.8 Hz, 1H), 4.74 (dt, J = 14.2, 7.0 Hz, 1H), 4.24 (d, J = 28.8 Hz, 4H), 4.10 (dd, J = 13.4, 9.4 Hz, 1H), 3.72 (d, J = 2.9 Hz, 2H), 3.64 (d, J = 5.4 Hz, 5H), 2.51 (q, J = 6.1 Hz, 1H), 2.45-2.06 (m, 4H), 2.06-1.86 (m, 1H), 1.64 (d, J = 13.1 Hz, 2H), 1.53 (t, J = 7.1 Hz, 4H), 1.43 (dd, J = 12.9, 6.4 Hz, 1H), 1.27 (dd, J = 7.0, 3.9 Hz, 3H), 1.21 (d, J = 6.8 Hz, 4H), 1.16 (d, J = 6.2 Hz, 1H), 1.14-1.10 (m, 2H), 1.05-0.96 (m, 4H), 0.91 (dd, J = 16.2, 11.8 Hz, 1H). |

TABLE 2-continued

| # | 1H-NMR |
|---|---|
| 22 | 1H NMR (400 MHz, Methanol-d4) δ 7.35 (d, J = 27.0 Hz, 1H), 7.23 (d, J = 23.1 Hz, 1H), 7.16 (dq, J = 4.9, 3.0, 2.2 Hz, 4H), 5.40 (t, J = 8.0 Hz, 1H), 5.26 (d, J = 3.8 Hz, 4H), 5.24 (s, 1H), 5.20 (d, J = 4.1 Hz, 1H), 4.97 (t, J = 9.1 Hz, 2H), 4.72 (t, J = 6.9 Hz, 1H), 4.39-4.15 (m, 5H), 4.08 (d, J = 9.4 Hz, 2H), 3.78 (d, J = 6.5 Hz, 1H), 3.72 (d. J = 8.4 Hz, 3H), 3.64 (s, 6H), 2.75 (dd, J = 13.5, 6.8 Hz, 1H), 2.54-2.06 (m, 5H), 2.06-1.93 (m, 0H), 1.89 (dd, J = 12.3, 6.2 Hz, 2H), 1.64 (d, J = 13.1 Hz, 3H), 1.52 (dd, J = 6.7, 2.2 Hz, 6H), 1.46-1.30 (m, 2H), 1.28 (t, J = 6.8 Hz, 3H), 1.20 (d, J = 6.9 Hz, 5H), 1.17-1.08 (m, 6H), 1.05 (dd, J = 6.1, 3.4 Hz, 6H), 0.89 (d, J = 12.1 Hz, 2H). |
| 23 | 1H NMR (400 MHz, Methanol-d4) δ 7.40 (s, 2H), 7.34 (d, J = 1.8 Hz, 9H), 7.22-7.16 (m, 4H), 5.51 (s, 2H), 5.33 (d, J = 5.9 Hz, 6H), 5.20-5.09 (m, 3H), 3.86 (s, 3H), 3.63 (d, J = 7.6 Hz, 8H), 3.47-3.37 (m, 2H), 2.32 (dd, J = 13.3, 6.4 Hz, 1H), 2.19 (d, J = 6.4 Hz, 1H), 2.12-1.96 (m, 4H), 1.89 (s, 1H). |
| 24 | 1H NMR (400 MHz, Methanol-d4) δ 7.19 (d, J = 11.3 Hz, 3H), 5.31 (s, 4H), 5.08 (t, J = 7.1 Hz, 2H), 4.23 (d, J = 8.2 Hz, 2H), 4.07 (dd, J = 17.0, 8.1 Hz, 2H), 3.83 (q, J = 7.5 Hz, 2H), 3.64 (s, 5H), 3.53 (s, 1H), 2.39 (dd, J = 12.6, 6.6 Hz, 2H), 2.27 (dt, J = 12.0, 5.7 Hz, 1H), 2.09 (ddt, J = 31.2, 13.4, 7.1 Hz, 2H), 1.77 (d, J = 9.3 Hz, 2H), 1.53 (d, J = 11.4 Hz, 2H), 1.14 (dt, J = 14.8, 7.5 Hz, 2H), 0.98-0.82 (m, 13H). |
| 25 | 1H NMR (400 MHz, Methanol-d4) δ 7.42-7.09 (m, 3H), 5.31-5.22 (m, 4H), 5.06 (dd, J = 7.8, 6.1 Hz, 2H), 4.42 (d, J = 7.9 Hz, 2H), 4.11-3.96 (m, 2H), 3.91-3.76 (m, 2H), 2.47-2.32 (m, 1H), 2.24 (dd, J = 11.6, 6.1 Hz, 1H), 2.07 (ddd, J = 21.3, 13.8, 6.9 Hz, 1H), 1.70 (dd, J = 9.2, 7.2, 3.9 Hz, 2H), 1.03 (dd, J = 15.4, 6.8 Hz, 2H), 0.96 (d, J = 6.9 Hz, 9H), 0.88-0.72 (m, 6H). |
| 26 | 1H NMR (400 MHz, Methanol-d4) δ 7.21-7.11 (m, 4H), 5.29 (d, J = 6.5 Hz, 4H), 5.06 (dd, J = 7.7, 6.5 Hz, 2H), 4.32 (s, 2H), 4.01 (d, J = 6.7 Hz, 0H), 3.84 (q, J = 7.6 Hz, 2H), 3.65 (s, 4H), 3.49 (s, 1H), 2.42-2.23 (m, 3H), 2.15 (dd, J = 12.7, 6.6 Hz, 1H), 2.03 (ddd, J = 19.3, 11.2, 4.3 Hz, 2H), 0.99 (d, J =12.0 Hz, 18H). |
| 27 | 1H NMR (400 MHz, Methanol-d4) δ 7.21-7.13 (m, 3H), 5.30 (d, J = 4.6 Hz, 4H), 5.05 (t, J = 6.8 Hz, 1H), 4.02 (d, J = 7.2 Hz, 1H), 3.98-3.80 (m, 1H), 3.66 (s, 4H), 3.43 (s, 1H), 2.50-2.22 (m, 2H), 2.25-1.87 (m, 4H), 1.20 (dd, J = 21.8, 4.6 Hz, 12H). |
| 28 | 1H NMR (400 MHz, Methanol-d4) δ 7.47-7.17 (m, 2H), 7.17-7.00 (m, 2H), 5.46-5.35 (m, 1H), 5.34-5.15 (m, 4H), 4.97 (ddd, J = 10.2, 7.6, 2.7 Hz, 1H), 4.76 (t, J = 7.0 Hz, 1H), 4.41-3.99 (m, 3H), 3.73 (d, J = 4.6 Hz, 3H), 3.64 (s, 3H), 2.91-2.62 (m, 1H), 2.34 (tdd, J = 29.2, 15.1, 8.6 Hz, 3H), 2.15 (td, J = 12.9, 6.6 Hz, 1H), 2.03 (dd, J = 7.7, 5.0 Hz, 0H), 1.90 (dd, J = 12.4, 6.2 Hz, 1H), 1.87-1.68 (m, 3H), 1.69-1.57 (m, 0H), 1.50 (dd, J = 6.7, 2.3 Hz, 4H), 1.46-1.08 (m, 4H), 1.07-0.68 (m, 13H). |
| 29 | 1H NMR (400 MHz, DMSO-d6) δ 12.57 (s, 2H), 7.43 (d, J = 8.4 Hz, 2H), 7.20 (d, J = 16.2 Hz, 3H), 5.31 (d, J = 8.9 Hz, 4H), 4.97 (t, J = 8.2 Hz, 2H), 4.72 (q, J = 7.8 Hz, 1H), 3.96 (t. J = 8.9 Hz, 1H), 3.58 (s, 1H), 2.83-2.62 (m, 1H), 2.43-2.27 (m, 2H), 2.15-1.98 (m, 2H), 1.81 (dtt, J = 32.9, 13.1, 6.6 Hz, 6H), 1.67-1.41 (m, 3H), 1.02-0.73 (m, 11H). |
| 30 | 1H NMR (400 MHz, Methanol-d4) δ 7.81 (d, J = 10.1 Hz, 1H), 7.15 (q, J = 9.5, 8.0 Hz, 3H), 5.37-5.26 (m, 4H), 5.14 (dd, J = 11.6, 6.8 Hz, 1H), 5.01 (dd, J = 9.8, 7.6 Hz, 1H), 4.16 (dd, J = 17.1, 8.6 Hz, 2H), 3.65 (d, J = 1.6 Hz, 5H), 3.00 (t, J = 8.6 Hz, 1H), 2.98-2.69 (m, 1H), 2.57 (dt, J = 13.7, 7.3 Hz, 1H), 2.41 (dt, J = 13.8, 7.9 Hz, 1H), 2.34-2.19 (m, 0H), 2.24-1.52 (m, 7H), 1.09-0.77 (m, 12H). |
| 31 | 1H NMR (400 MHz, Methanol-d4) δ 7.32 (d, J = 27.3 Hz, 1H), 7.23-7.04 (m, 3H), 5.45 (d, J = 6.3 Hz, 1H), 5.36-5.10 (m, 4H), 4.66-4.50 (m, 1H), 4.27-4.12 (m, 1H), 3.80-3.61 (m, 6H), 2.49-2.19 (m, 2H), 2.06 (ddt, J = 26.8, 13.4, 6.8 Hz, 1H), 1.90 (dd, J = 12.4, 6.3 Hz, 1H), 1.65 (dd, J = 13.2, 7.1 Hz, 1H), 1.51 (dd, J = 6.7, 3.1 Hz, 2H), 1.13 (s, 9H), 1.06 (d, J = 10.2 Hz, 7H), 0.95 (s, 6H). |
| 32 | 1H NMR (400 MHz, Methanol-d4) δ 7.15 (dd, J = 14.3, 1.4 Hz, 4H), 5.27 (d, J = 7.0 Hz, 5H), 5.06 (dd, J = 7.6, 5.7 Hz, 2H), 4.40 (d, J = 5.9 Hz, 2H), 4.01-3.89 (m, 2H), 3.84 (t, J = 7.8 Hz, 2H), 3.64 (s, 6H), 3.53 (s, 1H), 2.34 (dd, J = 7.8, 5.7 Hz, 2H), 2.29-2.16 (m, 1H), 2.15-1.97 (m, 4H), 1.97-1.83 (m, 2H), 1.53-1.27 (m, 2H), 1.22 (dd, J = 14.1, 7.1 Hz, 2H), 1.05-0.86 (m, 9H), 0.84 (d, J = 6.8 Hz, 7H). |
| 33 | 1H NMR (400 MHz, Methanol-d4) δ 7.42-7.24 (m, 1H), 7.24-7.11 (m, 2H), 5.26 (dd, J = 12.5, 3.8 Hz, 4H), 4.97 (t, J = 8.8 Hz, 1H), 4.68 (t, J = 6.9 Hz, 1H), 4.27 (dd, J = 11.5, 7.3 Hz, 1H), 4.19 (d, J = 8.5 Hz, 1H), 3.72 (d, J = 1.6 Hz, 2H), 3.64 (s, 2H), 2.72 (dd, J = 12.3, 6.6 Hz, 1H), 2.42 (t, J = 8.6 Hz, 1H), 2.10 (ddd, J = 24.4, 12.1, 5.4 Hz, 1H), 1.89 (d, J = 12.4, 6.4 Hz, 1H), 1.75 (s, 2H), 1.68-1.54 (m, 1H), 1.47 (dd, J = 6.7, 1.7 Hz, 3H), 1.41-1.23 (m, 1H), 1.16 (dd, J = 10.2, 6.2 Hz, 2H), 1.05 (t, J = 7.3 Hz, 3H), 0.99-0.75 (m, 8H). |
| 34 | 1H NMR (400 MHz, Methanol-d4) δ 7.54 (d, J = 9.9 Hz, 1H), 7.32-7.23 (m, 1H), 7.21-7.15 (m, 2H), 5.29 (d, J = 10.6 Hz, 4H), 4.94 (dq, J = 7.6, 4.3, 3.7 Hz, 2H), 4.78-4.56 (m, 2H), 4.20 (q, J = 6.5 Hz, 1H), 3.67 (s, 3H), 3.59 (s, 2H), 2.56-2.28 (m, 2H), 2.15 (td, J = 14.6, 13.9, 7.4 Hz, 2H), 1.91 (dd, J = 12.4, 6.3 Hz, 1H), 1.76 (dd, J = 12.5, 6.5 Hz, 1H), 1.54 (d, J = 6.6 Hz, 4H), 1.31 (d, J = 7.8 Hz, 5H), 1.25 (d, J = 4.5 Hz, 4H), 1.08 (s, 4H). |
| 35 | 1H NMR (400 MHz, Methanol-d4) δ 7.24-7.11 (m, 4H), 5.29 (d, J = 4.6 Hz, 5H), 5.07-4.94 (m, 4H), 4.65 (q, J = 7.8 Hz, 2H), 4.44 (q, J = 7.7 Hz, 1H), 3.67 (s, 6H), 3.57 (s, 1H), 2.97-2.78 (m, 2H), 2.43 (dt, J = 12.9, 7.7 Hz, 2H), 2.34-1.95 (m, 6H), 1.88 (dt, J = 13.6, 6.5 Hz, 2H), 1.82-1.62 (m, 4H), 1.27 (s, 7H), 1.12 (s, 6H). |
| 36 | 1H NMR (400 MHz, Methanol-d4) δ 7.16 (dd, J = 13.1, 1.5 Hz, 4H), 5.34-5.18 (m, 5H), 5.02 (dd, J = 10.1, 7.4 Hz, 2H), 4.61 (q, J = 1H), 4.22 (d, J = 9.5 Hz, 2H), 3.72 (d, J = 2.1 Hz, 2H), 3.64 (s, 6H), 2.97-2.64 (m, 4H), 2.43 (dt, J = 14.9, 7.7 Hz, 2H), 2.10 (dp, J = 34.2, 13.1, 11.4 Hz, 8H), 1.89 (dd, J = 12.5, 6.3 Hz, 2H), 1.74 (d, J = 12.8 Hz, 5H), 1.66-1.50 (m, 2H), 1.17 (dt, J = 14.8, 7.6 Hz, 2H), 1.01-0.81 (m, 16H). |
| 37 | 1H NMR (400 MHz, Methanol-d4) δ 7.17 (dd, J = 16.3, 1.4 Hz, 4H), 5.26 (s, 4H), 5.10-4.93 (m, 2H), 4.43 (d, J = 8.3 Hz, 2H), 3.97 (d, J = 9.5 Hz, 2H), 3.65 (s, 6H), 2.69-2.30 (m, 4H), 2.16 (dt, J = 12.5, 6.5 Hz, 2H), 2.04-1.64 (m, 11H), 1.55 (s, 5H), 1.32 (dd, J = 24.3, 8.1 Hz, 3H), 0.95 (d, J = 6.6 Hz, 6H), 0.79 (d, J = 6.7 Hz, 6H). |
| 38 | 1H NMR (400 MHz, Methanol-d4) δ 7.24-7.12 (m, 4H), 5.30 (s, 4H), 4.98 (dd, J = 10.2, 7.6 Hz, 2H), 4.32 (dd, J = 11.9, 6.1 Hz, 2H), 3.67 (s, 5H), 2.63-2.45 (m, 2H), 2.45-2.31 (m, 2H), 2.17 |

TABLE 2-continued

| # | 1H-NMR |
|---|---|
| | (dt, J = 12.6, 6.8 Hz, 2H), 2.04 (d, J = 9.9 Hz, 1H), 1.96 (d, J = 12.8 Hz, 1H), 1.90-1.68 (m, 6H), 1.54 (s, 4H), 1.35 (s, 7H), 1.28 (s, 6H), 1.02 (s, 6H). |
| 39 | 1H NMR (400 MHz, Methanol-d4) δ 7.21-7.01 (m, 4H), 5.19 (s, 4H), 5.01 (t, J = 8.8 Hz, 2H), 4.47 (d, J = 8.0 Hz, 2H), 4.07 (d, J = 9.9 Hz, 2H), 3.64 (s, 7H), 2.61-2.37 (m, 5H), 2.24-2.10 (m, 2H), 2.06-1.92 (m, 5H), 1.92-1.68 (m, 4H), 1.57 (d, J = 21.4 Hz, 6H), 1.41-1.24 (m, 2H), 1.17 (dt, J = 13.3, 7.6 Hz, 2H), 0.86 (t, J = 7.4 Hz, 8H), 0.77 (d, J = 6.8 Hz, 6H). |
| 40 | 1H NMR (400 MHz, Methanol-d4) δ 7.09 (s, 1H), 7.02 (s, 1H), 6.96 (d, J = 8.5 Hz, 4H). 5.66 (d, J = 7.1 Hz, 1H), 5.37 (d, J = 3.6 Hz, 7H), 5.04 (dd, J = 10.9, 6.7 Hz, 3H), 4.75 (s, 1H), 4.11-4.04 (m, 4H), 3.70 (s, 3H), 3.65 (s, 8H), 3.30-3.21 (m, 1H), 2.70 (s, 1H), 2.51-2.43 (m, 3H), 2.35 (s, 4H), 2.29 (s, 4H), 2.28 (d, J = 24.2 Hz, 1H), 2.00 (d, J = 18.3 Hz, 2H), 1.97 (s, 6H), 1.54 (d, J = 6.6 Hz, 8H), 1.45-1.10 (m, 27H), 1.08 (d, J = 6.7 Hz, 4H), 1.05-0.89 (m, 12H), 0.86 (d, J = 6.8 Hz, 8H). |
| 41 | 1H NMR (400 MHz, Methanol-d4) δ 7.30 (d, J = 8.2 Hz, 1H), 7.09 (s, 1H), 7.02 (s, 1H), 6.96 (d, J = 8.9 Hz, 4H), 5.63 (d, J = 6.9 Hz, 1H), 5.37 (s, 7H), 5.05 (dd, J = 10.9, 6.7 Hz, 2H), 4.20-4.08 (m, 3H), 3.67 (d, J = 19.6 Hz, 10H), 2.52-2.44 (m, 2H), 2.39-2.23 (m, 4H), 2.05-1.93 (m, 3H), 1.77 (s, 3H), 1.55 (d, J = 6.6 Hz, 7H), 1.45-1.17 (m, 24H), 1.02-0.86 (m, 13H), 0.81 (d, J = 6.8 Hz, 7H). |
| 42 | 1H NMR (400 MHz, Methanol-d4) δ 7.59 (d, J = 9.9 Hz, 2H), 7.04-6.91 (m, 4H), 5.38 (s, 4H), 5.04 (dd, J = 11.3, 6.8 Hz, 2H), 4.88 (d, J = 9.9 Hz, 2H), 4.62-4.52 (m, 2H), 3.68 (s, 6H), 3.66 (s, 0H), 3.60 (s, 1H), 3.30-3.21 (m, 1H), 2.47 (dt, J = 12.5, 6.6 Hz, 2H), 2.43-2.30 (m, 1H), 2.23 (dt, J = 13.6, 7.1 Hz, 2H), 2.05-1.92 (m, 2H), 1.70 (s, 1H), 1.58 (d, J = 6.6 Hz, 6H), 1.43-1.31 (m, 13H), 1.26 (s, 8H), 1.22 (d, J = 15.4 Hz, 1H), 1.12 (s, 6H). |
| 43 | 1H NMR (400 MHz, Methanol-d4) δ 7.45 (d, J = 24.6 Hz, 1H), 7.26 (d, J = 7.7 Hz, 1H), 7.10-6.90 (m, 2H), 5.49-5.27 (m, 5H), 5.14-4.96 (m, 1H), 4.77 (d, J = 7.1 Hz, 0H), 4.23 (t, J = 9.3 Hz, 1H), 4.09 (t, J = 10.2 Hz, 2H), 3.74 (s, 1H), 3.68 (d, J = 2.5 Hz, 4H), 2.79 (dd, J = 12.4, 6.9 Hz, 0H), 2.59-2.23 (m, 3H), 2.19-1.91 (m, 5H), 1.57 (d. J = 6.6 Hz, 2H), 1.52 (d, J = 6.7 Hz, 3H), 1.45 (d, J = 6.0 Hz, 1H), 1.38 (dd, J = 12.4, 7.1 Hz, 4H), 1.27 (d, J = 6.3 Hz, 1H), 1.19 (d, J = 6.3 Hz, 2H), 1.10 (d, J = 6.4 Hz, 2H), 1.01 (q, J = 7.6 Hz, 5H), 0.88 (dd, J = 10.3, 6.9 Hz, 4H). |
| 44 | 1H NMR (400 MHz, Methanol-d4) δ 7.45 (d, J = 24.6 Hz, 1H), 7.27 (d, J = 7.1 Hz, 1H), 7.11-6.90 (m, 2H), 5.35 (d, J = 12.6 Hz, 5H), 5.04 (dt, J = 33.2, 8.3 Hz, 2H), 4.83-4.68 (m, 0H), 4.21 (dd, J = 30.3, 9.2 Hz, 2H), 3.75 (d, J = 12.3 Hz, 2H), 3.67 (d, J = 2.6 Hz, 4H), 2.78 (t, J = 10.3 Hz, 1H), 2.65-2.26 (m, 4H), 2.24-1.88 (m, 1H), 1.79 (s, 2H), 1.74-1.50 (m, 5H), 1.48-1.12 (m, 9H), 0.95 (ddd, J = 23.3, 13.5, 7.1 Hz, 6H), 0.83 (t, J = 7.0 Hz, 4H). |
| 45 | 1H NMR (400 MHz, Methanol-d4) δ 7.32-7.17 (m, 4H), 5.33 (s, 4H), 5.03 (dd, J = 9.9, 7.5 Hz, 2H), 4.28 (t, J = 8.7 Hz, 2H), 4.21 (d, J = 7.4 Hz, 2H), 3.66 (s, 5H), 3.60-3.53 (m, 5H), 3.40 (s, 5H), 2.67 (s, 2H), 2.50 (dt, J = 13.5, 7.0 Hz, 2H), 2.09-1.91 (m, 4H), 1.31 (s, 1H), 0.92 (dd, J = 19.7, 6.7 Hz, 14H). |
| 46 | 1H NMR (400 MHz, Methanol-d4) δ 7.42-7.11 (m, 4H), 5.32 (s, 4H), 5.03 (dd, J = 8.2, 6.2 Hz, 2H), 4.57 (d, J = 6.8 Hz, 2H), 3.77-3.60 (m, 8H), 2.54-2.37 (m, 3H), 2.17 (q, J = 6.8 Hz, 1H), 2.03 (t, J = 9.2 Hz, 2H), 1.17-1.07 (m, 1H), 0.99 (dd, J = 31.4,6.8 Hz, 11H), 0.80 (s, 2H). |
| 47 | 1H NMR (400 MHz, Methanol-d4) δ 7.34-7.16 (m, 4H), 5.33 (s, 4H), 5.03 (dd, J = 10.2, 7.3 Hz, 2H), 4.42 (d, J = 4.8 Hz, 2H), 4.22-4.14 (m, 2H), 3.67 (s, 6H), 3.67-3.61 (m, 2H), 3.43-3.35 (m, 3H), 3.28 (s, 6H), 2.53 (dt, J = 12.9, 6.7 Hz, 2H), 2.41 (dq, J = 12.3, 6.1 Hz, 2H), 1.88 (q, J = 11.6 Hz, 2H), 1.31 (s, 1H), 1.21 (d, J = 6.4 Hz, 6H), 1.16 (d, J = 6.3 Hz, 6H). |
| 48 | 1H NMR (400 MHz, Methanol-d4) δ 7.21 (dd, J = 10.6, 1.4 Hz, 4H), 5.32 (s, 4H), 5.00 (dd, J = 10.4, 7.2 Hz, 2H), 4.24 (dd, J = 20.0, 8.0 Hz, 4H), 3.66 (s, 6H), 3.40 (d, J = 10.5 Hz, 2H), 2.52 (dt, J = 12.7, 6.7 Hz, 2H), 2.40 (dt, J = 11.9, 6.1 Hz, 1H), 2.02 (q, J = 6.9 Hz, 2H), 1.86 (q, J = 11.7 Hz, 2H), 1.31 (d, J = 3.1 Hz, 1H), 1.21 (d, J = 6.4 Hz, 6H), 0.94 (d, J = 6.7 Hz, 7H), 0.90 (d, J = 6.7 Hz, 6H). |
| 49 | 1H NMR (400 MHz, Methanol-d4) δ 7.33 (d, J = 15.0 Hz, 2H), 7.18 (s, 2H), 5.43-5.28 (m, 5H), 5.10 (s, 0H), 4.27 (s, 1H), 4.12 (d, J = 7.9 Hz, 1H), 3.89-3.77 (m, 1H), 3.73 (d, J = 6.2 Hz, 2H), 3.66 (d, J = 6.6 Hz, 5H), 3.59-3.49 (m, 1H), 3.47 (s, 2H), 2.50 (d, J = 12.6 Hz, 1H), 2.43-2.27 (m, 2H), 2.27-1.90 (m, 4H), 1.10-0.91 (m, 11H), 0.85 (d, J = 6.7 Hz, 2H). |
| 50 | 1H NMR (400 MHz, Methanol-d4) δ 7.35-7.12 (m, 4H), 5.53 (d, J = 7.0 Hz, 1H), 5.48-5.34 (m, 2H), 5.32 (d, J = 3.7 Hz, 5H), 4.29-3.83 (m, 6H), 3.69 (s, 3H), 3.57 (s, 2H), 2.92-2.59 (m, 2H), 2.52 (t, J = 16.9 Hz, 1H), 2.18 (h, J = 6.8 Hz, 1H), 2.07 (h, J = 6.8 Hz, 1H), 1.08-0.85 (m, 13H). |
| 51 | 1H NMR (400 MHz, Methanol-d4) δ 7.32-7.12 (m, 4H), 5.55-5.42 (m, 2H), 5.42-5.28 (m, 6H), 4.36-3.82 (m, 6H), 3.68 (s, 3H), 3.55 (s, 2H), 2.85-2.45 (m, 4H), 1.85 (dq, J = 26.0, 8.1, 7.7 Hz, 2H), 1.71-1.54 (m, 2H), 1.19 (ddd, J = 17.1, 12.1, 7.6 Hz, 2H), 1.03-0.85 (m, 12H). |
| 52 | 1H NMR (400 MHz, Methanol-d4) δ 7.33-7.10 (m, 4H), 536-5.36 (m, 2H), 5.36-5.27 (m, 5H), 4.73-4.59 (m, 1H), 4.36-4.08 (m, 2H), 3.89-3.57 (m, 1H), 3.69 (s, 2H), 3.46 (s, 3H), 3.29 (s, 1H), 2.86-2.46 (m, 3H), 1.42-1.08 (m, 12H). |
| 53 | 1H NMR (400 MHz, Methanol-d4) δ 7.32-7.17 (m, 4H), 5.52 (s, 1H), 5.39 (s, 1H), 5.32 (s, 5H), 5.19 (dd, J = 10.0, 7.5 Hz, 2H), 4.45-4.32 (m, 2H), 4.19 (d, J = 7.7 Hz, 2H), 4.11 (d, J = 10.0 Hz, 1H), 4.01 (d, J = 12.2 Hz, 1H), 3.67 (s, 5H), 3.55-3.47 (m, 1H), 2.72 (td, J = 16.0, 7.4 Hz, 2H), 2.59-2.34 (m, 2H), 2.08-1.91 (m, 2H), 1.04-0.86 (m, 12H). |
| 54 | 1H NMR (400 MHz, Methanol-d4) δ 7.31-7.07 (m, 4H), 5.53 (d, J = 3.5 Hz, 1H), 5.39 (s, 1H), 5.30 (d, J = 11.4 Hz, 4H), 5.20 (dd, J = 10.0, 7.5 Hz, 2H), 4.49-4.34 (m, 2H), 4.22 (d, J = 8.3 Hz, 2H), 4.18-3.95 (m, 2H), 3.67 (s, 5H), 3.51 (s, 1H), 2.72 (td, J = 15.6, 6.9 Hz, 2H), 2.59-2.35 (m, 2H), 1.78 (d, J = 8.8 Hz, 2H), 1.66-1.44 (m, 2H), 1.24-1.05 (m, 2H), 0.90 (t, J = 7.5 Hz, 13H). |
| 55 | 1H NMR (400 MHz, Methanol-d4) δ 7.27-7.18 (m, 4H), 5.52 (s, 1H), 5.34 (s, 6H), 5.22-5.12 (m, 2H), 4.39 (dd, J = 20.9, 12.4 Hz, 1H), 4.14-3.96 (m, 2H), 3.69 (s, 5H), 3.44 (s, 1H), 2.92-2.62 (m, 2H), 2.62-2.22 (m, 2H), 2.05 (s, 0H), 1.23 (d, J = 8.1 Hz, 7H), 1.15 (s, 5H). |
| 56 | 1H NMR (400 MHz, Methanol-d4) δ 7.34-7.16 (m, 4H), 5.32 (s, 4H), 5.26 (t, J = 8.5 Hz, 2H), 4.60-4.49 (m, 1H), 4.23 (ddt, J = 23.8, 12.4, 7.0 Hz, 2H), 4.08 (d, J = 7.9 Hz, 2H), 3.67 (s, 5H), 3.58 (s, 1H), 3.08-2.85 (m, 2H), 2.85-2.67 (m, 1H), 2.10-1.92 (m, 2H), 1.02 (dd, J = 6.8, 3.2 Hz, 2H), 0.92 (dd, J = 6.8, 3.1 Hz, 10H). |

TABLE 2-continued

| # | 1H-NMR |
|---|---|
| 57 | 1H NMR (400 MHz, Methanol-d4) δ 7.35-7.16 (m, 4H), 5.32 (s, 4H), 5.26 (t, J = 8.5 Hz, 2H), 4.64-4.52 (m, 1H), 4.31-4.17 (m, 2H), 4.12 (d, J = 8.4 Hz, 2H), 3.67 (s, 5H), 3.56 (s, 1H), 3.07-2.67 (m, 4H), 2.06 (s, 0H), 1.77 (d, J = 7.8 Hz, 2H), 1.60-1.45 (m, 2H), 1.14 (dq, J = 14.7, 7.1 Hz, 2H), 1.03-0.79 (m, 12H). |
| 58 | 1H NMR (400 MHz, Methanol-d4) δ 7.27-7.19 (m, 4H), 5.34 (d, J = 2.6 Hz, 4H), 5.28 (dt, J = 16.9, 7.8 Hz, 2H), 4.72 (d, J = 9.5 Hz, 2H), 4.65 (s, 0H), 4.52 (t, J = 13.7 Hz, 1H), 4.39 (dt, J = 19.3, 10.5 Hz, 0H), 4.31-4.16 (m, 2H), 4.16-3.97 (m, 1H), 3.68 (d, J = 17.9 Hz, 5H), 3.46 (s, 1H), 3.13-2.61 (m, 3H), 2.05 (s, 0H), 1.37 (s, 0H), 1.35-1.20 (m, 9H), 1.16 (s, 3H). |
| 59 | 1H NMR (400 MHz, Methanol-d4) δ 7.34-7.12 (m, 4H), 5.46 (d, J = 7.4 Hz, 0H), 5.31 (d, J = 7.8 Hz, 4H), 5.20 (td, J = 8.0, 2.0 Hz, 2H), 4.14 (dd, J = 7.6, 1.6 Hz, 2H), 3.99 (d, J = 9.8 Hz, 2H), 3.76 (dd, J = 16.5, 10.8 Hz, 2H), 3.67 (s, 4H), 3.58 (s, 1H), 2.65 (dd, J = 12.7, 7.4 Hz, 0H), 2.41 (dd, J = 12.7, 8.3 Hz, 2H), 2.16-1.94 (m, 4H), 1.31 (d, J = 3.8 Hz, 0H), 1.03 (t, J = 6.3 Hz, 2H), 0.95 (dd, J = 14.7, 6.7 Hz, 10H), 0.84 (q, J = 7.2, 6.6 Hz, 1H), 0.76 (p, J = 4.9 Hz, 3H), 0.72-0.56 (m, 2H), 0.48 (s, 0H). |
| 60 | 1H NMR (400 MHz, Methanol-d4) δ 7.33-7.18 (m, 4H), 5.33 (d, J = 4.4 Hz, 4H), 5.20 (t, J = 8.0 Hz, 2H), 4.16 (d, J = 8.4 Hz, 2H), 3.99 (d, J = 9.7 Hz, 2H), 3.80 (d, J = 9.7 Hz, 2H), 3.66 (s, 4H), 3.57 (s, 1H), 2.64 (dd, J = 12.7, 7.6 Hz, 1H), 2.44 (dd, J = 12.7, 8.3 Hz, 2H), 2.09 (dd, J = 12.8, 7.7 Hz, 2H), 1.79 (d, J = 9.1 Hz, 2H), 1.60-1.45 (m, 1H), 1.24-1.06 (m, 2H), 1.00 (d, J = 6.8 Hz, 1H), 0.96-0.79 (m, 12H), 0.79-0.71 (m, 3H), 0.65 (dd, J = 10.8, 6.8 Hz, 2H), 0.47 (s, 1H). |
| 61 | 1H NMR (400 MHz, Methanol-d4) δ 7.23 (td, J = 6.6, 1.4 Hz, 4H), 5.44-5.37 (m, 1H), 5.35 (d, J = 3.0 Hz, 4H), 5.19 (t, J = 8.1 Hz, 1H), 4.81 (s, 1H), 4.67 (s, 1H), 4.01 (d, J = 9.7 Hz, 1H), 3.79 (d, J = 9.7 Hz, 1H), 3.69 (s, 4H), 3.67-3.57 (m, 1H), 3.48 (s, 2H), 2.68 (dd, J = 12.7, 7.8 Hz, 1H), 2.47 (dd, J = 12.8, 8.4 Hz, 1H), 2.11 (dd, J = 12.8, 7.8 Hz, 1H), 1.90 (d, J = 13.2 Hz, 1H), 1.35-1.15 (m, 12H), 0.87 (dt, J = 10.1, 5.4 Hz, 1H), 0.78 (dt, J = 10.1, 5.2 Hz, 1H), 0.75-0.60 (m, 2H), 0.46-0.38 (m, 1H). |
| 62 | 1H NMR (400 MHz, Methanol-d4) δ 7.27-7.17 (m, 4H), 5.32 (dd, J = 8.5, 4.3 Hz, 4H), 5.16 (d, J = 8.9 Hz, 1H), 4.64-4.54 (m, 1H), 4.44 (dd, J = 13.5, 6.5 Hz, 2H), 3.96 (d, J = 7.8 Hz, 1H), 3.67 (s, 3H), 3.47 (s, 2H), 2.66 (dd, J = 12.9, 6.8 Hz, 1H), 2.58-2.43 (m, 1H), 2.14 (ddd, J = 18.9, 13.0, 6.6 Hz, 2H), 2.08-1.96 (m, 2H), 1.84 (dd, J = 12.2, 6.3 Hz, 1H), 1.69 (dd, J = 12.0, 6.3 Hz, 1H), 1.44 (d, J = 6.4 Hz, 3H), 1.29 (d, J = 6.5 Hz, 3H), 1.01 (dd, J = 6.8, 1.9 Hz, 6H), 0.95 (d, J = 6.8 Hz, 3H), 0.87 (dd, J = 6.9, 1.4 Hz, 3H). |
| 63 | 1H NMR (400 MHz, Methanol-d4) δ 7.27-7.16 (m, 4H), 5.35-5.28 (m, 5H), 5.16 (d, J = 9.0 Hz, 1H), 4.65-4.54 (m, 1H), 4.44 (t, J = 6.8 Hz, 2H), 4.00 (d, J = 8.5 Hz, 1H), 3.66 (s, 2H), 3.45 (s, 2H), 3.28 (s, 1H), 2.69 (dp, J = 20.4, 7.5, 6.8 Hz, 1H), 2.57-2.40 (m, 1H), 2.24-1.96 (m, 3H), 1.92-1.74 (m, 2H), 1.69 (dd, J = 12.0, 6.2 Hz, 1H), 1.62-1.51 (m, 1H), 1.44 (d, J = 6.4 Hz, 3H), 1.29 (d, J = 6.4 Hz, 3H), 1.11 (ddd, J = 17.0, 12.1, 7.7 Hz, 2H), 0.98 (td, J = 4.7, 2.3 Hz, 6H), 0.95-0.86 (m, 6H). |
| 64 | 1H NMR (400 MHz, Methanol-d4) δ 7.22-7.18 (m, 4H), 5.34 (s, 4H), 4.18 (d, J = 7.4 Hz, 2H), 4.09 (d, J = 8.0 Hz, 1H), 3.90 (q, J = 9.2, 8.6 Hz, 2H), 3.68 (s, 6H), 2.43 (q, J = 9.7 Hz, 2H), 2.26-1.96 (m, 8H), 1.86 (s, 6H), 0.98 (d, J = 6.7 Hz, 6H), 0.92 (d, J = 6.7 Hz, 6H). |
| 65 | 1H NMR (400 MHz, Methanol-d4) δ 7.73 (d, J = 10.2 Hz, 0H), 7.55 (d, J = 9.7 Hz, 0H), 7.27-7.16 (m, 3H), 6.86 (d, J = 9.4 Hz, 0H), 5.49 (d, J = 8.1 Hz, 1H), 5.34 (t, J = 6.4 Hz, 3H), 5.29 (d, J = 8.0 Hz, 0H), 5.17-4.96 (m, 1H), 4.67 (t, J = 5.3 Hz, 1H), 4.60 (t, J = 7.1 Hz, 0H), 4.55-4.40 (m, 1H), 3.76-3.64 (m, 3H), 3.43 (s, 1H), 2.54 (dddt, J = 48.9, 20.5, 13.7, 7.1 Hz, 2H), 2.23-1.91 (m, 2H), 1.82 (td, J = 13.3, 12.4, 6.0 Hz, 1H), 1.66 (dt, J = 14.6, 7.3 Hz, 1H), 1.46 (d, J = 6.4 Hz, 1H), 1.42-1.29 (m, 4H), 1.29-1.02 (m, 9H), 0.86 (s, 2H). |
| 66 | 1H NMR (400 MHz, Methanol-d4) δ 7.23-7.19 (m, 4H), 5.34 (s, 4H), 4.20 (d, J = 8.3 Hz, 2H), 4.17-4.07 (m, 1H), 3.89 (q, J = 8.6 Hz, 2H), 3.68 (s, 6H), 2.46 (q, J = 9.4 Hz, 2H), 2.24-2.08 (m, 6H), 1.86 (s, 8H), 1.55 (ddd, J = 13.5, 7.6, 3.1 Hz, 1H), 1.14 (ddt, J = 16.4, 14.2, 7.4 Hz, 2H), 1.01-0.82 (m, 13H). |
| 67 | 1H NMR (400 MHz, Methanol-d4) δ 7.84 (s, 1H), 7.27-7.09 (m, 4H), 5.31 (d, J = 6.9 Hz, 4H), 4.46-4.12 (m, 4H), 3.64 (d, J = 5.1 Hz, 8H), 2.77-2.30 (m, 2H), 1.95-1.62 (m, 3H), 1.60-1.31 (m, 3H), 1.18 (ddd, J = 25.5, 16.6, 7.4 Hz, 12H), 1.00-0.74 (m, 16H). |
| 68 | 1H NMR (400 MHz, Methanol-d4) δ 7.14 (d, J = 15.6 Hz, 4H), 5.26 (s, 4H), 4.99 (dd, J = 10.4, 7.2 Hz, 2H), 4.25 (dd, J = 22.7, 8.4 Hz, 2H), 3.64 (s, 6H), 3.37 (d, J = 10.5 Hz, 2H), 2.63-2.28 (m, 4H), 1.99-1.66 (m 4H), 1.29-1.01 (m, 10H), 0.98-0.78 (m, 18H). |
| 69 | 1H NMR (400 MHz, Methanol-d4) δ 7.11 (ddd, J = 17.0, 7.6, 1.4 Hz, 4H), 5.24 (s, 4H), 5.00 (ddd, J = 16.0, 10.5, 7.2 Hz, 2H), 4.35-4.09 (m, 4H), 3.64 (s, 6H), 3.38 (td, J = 10.4, 3.8 Hz, 2H), 2.45 (dtd, J = 38.9, 12.2, 6.2 Hz, 4H), 2.13-1.97 (m, 2H), 1.83 (q, J = 11.7 Hz, 2H), 1.19 (dd, J = 6.3, 2.7 Hz, 7H), 1.04-0.81 (m, 14H). |
| 70 | 1H NMR (400 MHz, Methanol-d4) δ 7.86 (s, 1H), 7.23 (dd, J = 13.3, 1.5 Hz, 2H), 7.04-6.91 (m, 2H), 5.35 (d, J = 3.5 Hz, 4H), 5.16 (ddd, J = 17.7, 11.0, 7.0 Hz, 2H), 4.44-4.29 (m, 2H), 4.20 (dd, J = 8.2, 4.9 Hz, 2H), 3.65 (s, 6H), 3.51-3.37 (m, 2H), 2.63 (dq, J = 13.1, 6.8 Hz, 2H), 2.50 (tt, J = 11.9, 5.9 Hz, 2H), 1.96-1.64 (m, 5H), 1.48 (dtd, J = 14.1, 7.5, 3.7 Hz, 1H), 1.35 (dd, J = 15.6, 7.0 Hz, 6H), 1.28-1.06 (m, 9H), 0.95-0.70 (m, 13H). |
| 71 | 1H NMR (400 MHz, Methanol-d4) δ 7.01 (dd, J = 9.8, 1.4 Hz, 4H), 5.43 (dt, J = 13.0, 1.2 Hz, 4H), 5.33 (s, 4H), 5.13 (dd, J = 11.0, 6.9 Hz, 2H), 4.40-4.14 (m, 4H), 3.65 (s, 6H), 3.38 (t, J = 10.4 Hz, 2H), 2.57 (ddt, J = 49.7, 11.9, 6.3 Hz, 4H), 2.01 (t, J = 1.2 Hz, 8H), 1.84 (q, J = 12.0 Hz, 2H), 1.21 (d, J = 6.4 Hz, 7H), 0.90 (dd, J = 11.1, 6.7 Hz, 12H) |
| 72 | 1H NMR (400 MHz, Methanol-d4) δ 6.97 (dd, J = 9.2, 1.4 Hz, 4H), 5.37 (s, 4H), 5.13 (dd, J = 11.1, 6.9 Hz, 2H), 4.39-4.10 (m, 4H), 3.65 (s, 6H), 3.48-3.34 (m, 2H), 2.75-2.43 (m, 1H), 2.15-1.76 (m, 4H), 1.35 (dd, J = 18.9, 7.0 Hz, 13H), 1.22 (d, J = 6.3 Hz, 6H), 0.90 (dd, J = 10.3, 6.7 Hz, 11H). |
| 73 | 1H NMR (400 MHz, Methanol-d4) δ 7.23-7.12 (m, 2H), 7.02-6.85 (m, 2H), 5.31 (d, J = 2.2 Hz, 4H), 5.14 (dd, J = 11.1, 7.0 Hz, 1H), 4.97 (dd, J = 10.3, 7.3 Hz, 1H), 4.43-4.03 (m, 4H), 3.81-3.60 (m, 6H), 3.51-3.37 (m, 1H), 3.27-3.18 (m, 1H), 2.74-2.31 (m, 4H), 1.98-1.70 (m, 4H), 1.59-1.04 (m, 19H), 0.98-0.76 (m, 11H). |

TABLE 2-continued

| # | 1H-NMR |
|---|---|
| 74 | 1H NMR (400 MHz, Methanol-d4) δ 7.40 (d, J = 1.4 Hz, 1H), 7.33 (d, J = 2.1 Hz, 2H), 7.26 (s, 1H), 7.23-7.09 (m, 4H), 5.39 (s, 2H), 5.32-5.17 (m, 9H), 4.97 (t, J = 8.8 Hz, 2H), 4.72 (t, J = 6.9 Hz, 2H), 4.22 (dd, J = 19.1, 8.4 Hz, 5H), 4.06 (d, J = 9.3 Hz, 2H), 3.74 (d, J = 1.9 Hz, 6H), 3.64 (s, 7H), 2.75 (s, 2H), 2.34 (dddd, J = 37.6, 31.2, 12.3, 7.2 Hz, 6H), 2.20-1.83 (m, 12H), 1.60 (q, J = 10.0, 8.1 Hz, 2H), 1.49 (dd, J = 6.7, 1.8 Hz, 7H), 1.12 (ddd, J = 18.8, 12.8, 6.5 Hz, 12H), 1.06-0.90 (m, 14H), 0.84 (dd, J = 6.7, 1.7 Hz, 7H). |
| 75 | 1H NMR (400 MHz, Methanol-d4) δ 7.89 (d, J = 37.6 Hz, 1H), 7.41 (d, J = 26.2 Hz, 1H), 7.32-7.12 (m, 3H), 5.70 (d, J = 6.7 Hz, 0H), 5.46-5.23 (m, 5H), 5.12 (t, J = 8.6 Hz, 1H), 5.05-4.91 (m, 1H), 4.75 (dt, J = 22.2, 6.9 Hz, 1H), 4.32-3.96 (m, 3H), 3.81-3.57 (m, 6H), 3.47 (dd, J = 3.3, 1.6 Hz, 0H), 3.13 (d, J = 1.6 Hz, 0H), 2.83-2.61 (m, 1H), 2.58-2.21 (m, 3H), 2.18-1.77 (m, 5H), 1.51 (dd, J = 16.9, 6.6 Hz, 4H), 1.36-1.21 (m, 1H), 1.16 (d, J = 6.2 Hz, 2H), 1.11-0.91 (m, 10H), 0.85 (t, J = 7.2 Hz, 4H). |
| 76 | 1H NMR (400 MHz, Methanol-d4) δ 6.99-6.90 (m, 3H), 5.33 (d, J = 3.3 Hz, 4H), 5.15 (t, J = 7.7 Hz, 2H), 4.19 (d, J = 7.2 Hz, 2H), 4.07 (s, 2H), 3.78 (q, J = 8.2 Hz, 2H), 3.63 (d, J = 9.9 Hz, 5H), 2.52 (d, J = 14.6 Hz, 2H), 2.34-1.87 (m, 8H), 1.33 (d, J = 13.3 Hz, 18H), 0.90 (t, J = 6.3 Hz, 9H). |
| 77 | 1H NMR (400 MHz, Methanol-d4) δ 5.68 (d, J = 5.6 Hz, 1H), 5.36 (d, J = 4.5 Hz, 5H), 7.25 (d, J = 7.3 Hz, 2H), 6.96 (d, J = 9.8 Hz, 2H), 5.17 (t, J = 7.8 Hz, 1H), 5.11-5.01 (m, 1H), 4.23 (d, J = 7.6 Hz, 4H), 4.16 (s, 2H), 3.87 (d, J = 9.2 Hz, 3H), 3.67 (d, J = 4.0 Hz, 9H), 3.63-3.46 (m, 2H), 2.71-1.80 (m, 22H), 1.47-1.12 (m, 10H), 1.09-0.81 (m, 19H). |
| 78 | $^1$H NMR (400 MHz, MeOD) δ 7.30 (d, J = 4.9 Hz, 2H), 7.01 (d, J = 14.6 Hz, 2H), 5.67 (d, J = 8.4 Hz, 1H), 5.44 (dd, J = 7.9, 4.3 Hz, 2H), 5.34 (q, J = 8.9, 8.0 Hz, 6H), 4.26-4.08 (m, 3H), 3.97 (d, J = 10.1 Hz, 2H), 3.96-3.75 (m, 5H), 3.74-3.47 (m, 11H), 2.71-2.46 (m, 2H), 2.16-2.03 (m, 1H), 1.94 (d, J = 12.0 Hz, 1H), 1.82 (s, 3H), 1.77-1.60 (m, 3H), 1.40 (dt, J = 26.6, 7.6 Hz, 10H), 1.32-1.21 (m, 3H), 1.10-0.89 (m, 23H), 0.90-0.62 (m, 6H), 0.59 (s, 1H), 0.44 (s, 1H), 0.12 (d, J = 4.4 Hz, 1H). |
| 79 | 1H NMR (400 MHz, Methanol-d4) δ 7.08-6.97 (m, 4H), 5.39 (s, 4H), 5.17 (t, J = 7.5 Hz, 2H), 4.23 (d, J = 6.3 Hz, 4H), 4.14 (s, 4H), 3.85 (d, J = 8.2 Hz, 4H), 3.67 (d, J = 8.4 Hz, 12H), 2.82 (t, J = 8.1 Hz, 8H), 2.57 (s, 3H), 2.29 (s, 3H), 2.20-1.90 (m, 1H), 1.84-1.56 (m, 8H), 0.96 (dt, J = 14.4, 7.4 Hz, 28H). |
| 80 | 1H NMR (400 MHz, Methanol-d4) δ 7.23 (dd, J = 8.9, 1.4 Hz, 2H), 7.05-6.91 (m, 2H), 5.35 (s, 4H), 5.16 (dd, J = 11.0, 7.0 Hz, 1H), 4.99 (dd, J = 10.3, 7.2 Hz, 1H), 4.33 (t, J = 8.6 Hz, 1H), 4.24 (dd, J = 19.5, 8.0 Hz, 3H), 3.67 (d, J = 4.4 Hz, 7H), 3.45-3.36 (m, 2H), 2.66 (dt, J = 12.7, 6.5 Hz, 1H), 2.52 (tt, J = 12.8, 6.4 Hz, 2H), 2.40 (dd, J = 12.0, 6.0 Hz, 1H), 2.03 (dt, J = 14.1, 7.0 Hz, 2H), 1.95-1.77 (m, 2H), 1.37 (dd, J = 17.7, 7.0 Hz, 7H), 1.23 (dd, J = 16.3, 6.3 Hz, 7H), 1.05-0.83 (m, 14H). |
| 81 | 1H NMR (400 MHz, Methanol-d4) δ 7.30 (d, J = 3.7 Hz, 2H), 7.01 (d, J = 15.4 Hz, 2H), 5.44 (dd, J = 7.9, 4.3 Hz, 2H), 5.35 (q, J = 9.3, 8.0 Hz, 6H), 4.10 (dd, J = 13.7, 8.0 Hz, 3H), 3.96 (d, J = 10.1 Hz, 1H), 3.86 (q, J = 10.0 Hz, 5H), 3.76-3.47 (m, 9H), 2.65-2.48 (m, 3H), 2.05 (p, J = 7.3, 6.7 Hz, 4H), 1.94 (d, J = 12.0 Hz, 1H), 1.40 (dt, J = 25.6, 7.7 Hz, 10H), 1.05 (d, J = 6.7 Hz, 21H), 0.91-0.48 (m, 11H), 0.43 (d, J = 10.0 Hz, 2H). |
| 82 | 1H NMR (400 MHz, Methanol-d4) δ 7.26 (d, J = 5.3 Hz, 2H), 6.97 (d, J = 7.4 Hz, 2H), 5.79-5.57 (m, 1H), 5.37 (d, J = 4.0 Hz, 4H), 5.19 (t, J = 8.0 Hz, 1H), 4.39-4.12 (m, 3H), 4.04 (dd, J = 35.4, 9.8 Hz, 3H), 3.77 (dd, J = 18.5, 9.7 Hz, 2H), 3.60-3.47 (m, 3H), 2.63-2.37 (m, 2H), 2.11 (ddd, J = 38.2, 12.9, 8.0 Hz, 2H), 1.58-1.25 (m, 6H), 1.16-0.91 (m, 30H), 0.95-0.55 (m, 6H). |
| 83 | 1H NMR (400 MHz, Methanol-d4) δ 7.26 (d, J = 5.3 Hz, 2H), 6.97 (d, J = 7.4 Hz, 2H), 5.79-5.57 (m, 1H), 5.37 (d, J = 4.0 Hz, 4H), 5.19 (t, J = 8.0 Hz, 1H), 4.39-4.12 (m, 3H), 4.04 (dd, J = 35.4, 9.8 Hz, 3H), 3.77 (dd, J = 18.5, 9.7 Hz, 2H), 3.60-3.47 (m, 3H), 2.63-2.37 (m, 2H), 2.11 (ddd, J = 38.2, 12.9, 8.0 Hz, 2H), 1.58-1.25 (m, 6H), 1.16-0.91 (m, 30H), 0.95-0.55 (m, 6H). |
| 84 | 1H NMR (400 MHz, Methanol-d4) δ 7.25 (d, J = 6.0 Hz, 3H), 6.97 (d, J = 8.7 Hz, 3H), 5.34 (dd, J = 18.1, 6.5 Hz, 10H), 5.18 (t, J = 7.8 Hz, 2H), 4.33 (d, J = 6.6 Hz, 5H), 4.00 (dd, J = 23.6, 9.6 Hz, 4H), 3.85-3.70 (m, 4H), 3.58 (d, J = 6.6 Hz, 2H), 3.54-3.47 (m, 1H), 2.54-2.42 (m, 2H), 2.38 (dd, J = 12.5, 8.0 Hz, 2H), 2.26-2.17 (m, 2H), 2.13-2.05 (m, 2H), 1.86 (d, J = 6.5 Hz, 2H), 1.38 (dd, J = 17.4, 7.0 Hz, 11H), 1.24 (dt, J = 13.6, 7.1 Hz, 3H), 0.96 (q, J = 7.3, 6.9 Hz, 20H), 0.86 (dt, J = 9.6, 4.7 Hz, 16H), 0.74 (d, J = 6.8 Hz, 4H). |
| 85 | 1H NMR (400 MHz, Methanol-d4) δ 7.27-7.20 (m, 2H), 6.96 (dd, J = 10.1, 1.3 Hz, 2H), 5.36 (d, J = 3.9 Hz, 4H), 5.30 (dd, J = 8.3, 6.6 Hz, 1H), 5.17 (dd, J = 8.2, 4.1 Hz, 1H), 4.21 (dd, J = 7.5, 3.3 Hz, 3H), 4.09-3.89 (m, 2H), 3.68 (t, J = 3.0 Hz, 9H), 3.60-3.42 (m, 2H), 2.75 (dq, J = 23.8, 6.8 Hz, 2H), 2.25 (ddt, J = 28.2, 13.9, 7.4 Hz, 2H), 2.11-1.92 (m, 3H), 1.56-1.20 (m, 9H), 1.20-1.06 (m, 9H), 1.06-0.83 (m, 18H). |

The IUPAC names for the compounds, as provided by ChemBioDraw Ultra

TABLE 3

IUPAC Chemical Names:

| # | Name |
|---|---|
| 1 | dimethyl ((2S,2'S)-((3R,3'R,5S,5'S)-((5,10-dihydrochromeno[5,4,3-cde]chromene-2,7-diyl)bis(4-chloro-1H-imidazole-5,2-diyl))bis(3-methylpyrrolidine-5,1-diyl))bis(3-methyl-1-oxobutane-1,2-diyl))dicarbamate |
| 2 | dimethyl ((2S,2'S,3S,3'S)-((3R,3'R,5S,5'S)-((5,10-dihydrochromeno[5,4,3-cde]chromene-2,7-diyl)bis(4-chloro-1H-imidazole-5,2-diyl))bis(3-methylpyrrolidine-5,1-diyl))bis(3-methyl-1-oxopentane-1,2-diyl))dicarbamate |

TABLE 3-continued

IUPAC Chemical Names:

| # | Name |
|---|------|
| 3 | dimethyl ((2S,2'S)-((3R,3'R,5S,5'S)-((5,10-dihydrochromeno[5,4,3-cde]chromene-2,7-diyl)bis(4-chloro-1H-imidazole-5,2-diyl))bis(3-methylpyrrolidine-5,1-diyl))bis(4,4,4-trifluoro-3,3-dimethyl-1-oxobutane-1,2-diyl))dicarbamate |
| 4 | dimethyl ((2S,2'S)-((3S,3'S,5S,5'S)-((5,10-dihydrochromeno[5,4,3-cde]chromene-2,7-diyl)bis(4-chloro-1H-imidazole-5,2-diyl))bis(3-methoxypyrrolidine-5,1-diyl))bis(3-methyl-1-oxobutane-1,2-diyl))dicarbamate |
| 5 | dimethyl ((2S,2'S,3S,3'S)-((3S,3'S,5S,5'S)-((5,10-dihydrochromeno[5,4,3-cde]chromene-2,7-diyl)bis(4-chloro-1H-imidazole-5,2-diyl))bis(3-methoxypyrrolidine-5,1-diyl))bis(3-methyl-1-oxopentane-1,2-diyl))dicarbamate |
| 6 | dimethyl ((2S,2'S)-((3S,3'S,5S,5'S)-((5,10-dihydrochromeno[5,4,3-cde]chromene-2,7-diyl)bis(4-chloro-1H-imidazole-5,2-diyl))bis(3-methoxypyrrolidine-5,1-diyl))bis(4,4,4-trifluoro-3,3-dimethyl-1-oxobutane-1,2-diyl))dicarbamate |
| 7 | dimethyl ((2S,2'S)-((5S,5'S)-((5,10-dihydrochromeno[5,4,3-cde]chromene-2,7-diyl)bis(4-chloro-1H-imidazole-5,2-diyl))bis(3,3-dimethylpyrrolidine-5,1-diyl))bis(3-methyl-1-oxobutane-1,2-diyl))dicarbamate |
| 8 | dimethyl ((2S,2'S,3S,3'S)-((5S,5'S)-((5,10-dihydrochromeno[5,4,3-cde]chromene-2,7-diyl)bis(4-chloro-1H-imidazole-5,2-diyl))bis(3,3-dimethylpyrrolidine-5,1-diyl))bis(3-methyl-1-oxopentane-1,2-diyl))dicarbamate |
| 9 | dimethyl ((2S,2'S)-((5S,5'S)-((5,10-dihydrochromeno[5,4,3-cde]chromene-2,7-diyl)bis(4-chloro-1H-imidazole-5,2-diyl))bis(3,3-dimethylpyrrolidine-5,1-diyl))bis(4,4,4-trifluoro-3,3-dimethyl-1-oxobutane-1,2-diyl))dicarbamate |
| 10 | dimethyl ((2S,2'S)-((1S,1'S,3S,3'S,5S,5'S)-((5,10-dihydrochromeno[5,4,3-cde]chromene-2,7-diyl)bis(4-chloro-1H-imidazole-5,2-diyl))bis(2-azabicyclo[3.1.0]hexane-3,2-diyl))bis(3-methyl-1-oxobutane-1,2-diyl))dicarbamate |
| 11 | dimethyl ((2S,2'S)-((1S,1'S,3S,3'S,5S,5'S)-((5,10-dihydrochromeno[5,4,3-cde]chromene-2,7-diyl)bis(4-chloro-1H-imidazole-5,2-diyl))bis(2-azabicyclo[3.1.0]hexane-3,2-diyl))bis(3-methyl-1-oxobutane-1,2-diyl))dicarbamate |
| 12 | dimethyl ((2S,2'S)-((1S,1'S,3S,3'S,5S,5'S)-((5,10-dihydrochromeno[5,4,3-cde]chromene-2,7-diyl)bis(4-chloro-1H-imidazole-5,2-diyl))bis(2-azabicyclo[3.1.0]hexane-3,2-diyl))bis(4,4,4-trifluoro-3,3-dimethyl-1-oxobutane-1,2-diyl))dicarbamate |
| 13 | dimethyl ((2S,2'S)-((2S,2'S)-((5,10-dihydrochromeno[5,4,3-cde]chromene-2,7-diyl)bis(4-chloro-1H-imidazole-5,2-diyl))bis(piperidine-2,1-diyl))bis(3-methyl-1-oxobutane-1,2-diyl))dicarbamate |
| 14 | dimethyl ((2S,2'S,3S,3'S)-((2S,2'S)-((5,10-dihydrochromeno[5,4,3-cde]chromene-2,7-diyl)bis(4-chloro-1H-imidazole-5,2-diyl))bis(piperidine-2,1-diyl))bis(3-methyl-1-oxopentane-1,2-diyl))dicarbamate |
| 15 | methyl ((S)-1-((S)-6-(5-(7-(4-chloro-2-((S)-5-((methoxycarbonyl)-L-valyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxobutan-2-yl)carbamate |
| 16 | methyl ((2S,3S)-1-((S)-6-(5-(7-(4-chloro-2-((S)-5-((methoxycarbonyl)-L-isoleucyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxopentan-2-yl)carbamate |
| 17 | dimethyl ((2S,2'S)-((2S,2'S)-((5,10-dihydrochromeno[5,4,3-cde]chromene-2,7-diyl)bis(4-cyclopropyl-1H-imidazole-5,2-diyl))bis(pyrrolidine-2,1-diyl))bis(3-methyl-1-oxobutane-1,2-diyl))dicarbamate |
| 18 | dimethyl ((2S,2'S)-((2S,2'S)-((5,10-dihydrochromeno[5,4,3-cde]chromene-2,7-diyl)bis(4-ethyl-1H-imidazole-5,2-diyl))bis(pyrrolidine-2,1-diyl))bis(3-methyl-1-oxobutane-1,2-diyl))dicarbamate |
| 19 | dimethyl ((2S,2'S)-((2S,2'S)-((5,10-dihydrochromeno[5,4,3-cde]chromene-2,7-diyl)bis(4-isopropyl-1H-imidazole-5,2-diyl))bis(pyrrolidine-2,1-diyl))bis(3-methyl-1-oxobutane-1,2-diyl))dicarbamate |
| 20 | dimethyl ((2S,2'S)-(((1S,1'S)-((5,10-dihydrochromeno[5,4,3-cde]chromene-2,7-diyl)bis(4-chloro-1H-imidazole-5,2-diyl))bis(2,2-dimethylpropane-1,1-diyl))bis(azanediyl))bis(3-methyl-1-oxobutane-1,2-diyl))dicarbamate |
| 21 | dimethyl ((1S,1'S)-((2S,2'S,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(1-((2R,6R)-2,6-dimethyltetrahydro-2H-pyran-4-yl)-2-oxoethane-2,1-diyl))dicarbamate |
| 22 | methyl ((2S,3S)-1-((S)-2-(5-(7-(4-chloro-2-((S)-1-((methoxycarbonyl)-L-isoleucyl)pyrrolidin-2-yl)-1H-imidazol-5-yl)-5,10-dihydrochromeno[5,4,3-cde]chromen-2-yl)-1H-imidazol-2-yl)pyrrolidin-1-yl)-3-methyl-1-oxopentan-2-yl)carbamate |
| 23 | dimethyl ((1S,1'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(2-oxo-1-phenylethane-2,1-diyl))dicarbamate |
| 24 | dimethyl ((2S,2'S,3S,3'S)-((2S,2'S)-((5,10-dihydrochromeno[5,4,3-cde]chromene-2,7-diyl)bis(4-bromo-1H-imidazole-5,2-diyl))bis(pyrrolidine-2,1-diyl))bis(3-methyl-1-oxopentane-1,2-diyl))dicarbamate |
| 25 | N,N'-((2S,2'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(3-methyl-1-oxobutane-1,2-diyl))dicyclopropanecarboxamide |
| 26 | dimethyl ((2S,2'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(3,3-dimethyl-1-oxobutane-1,2-diyl))dicarbamate |

TABLE 3-continued

IUPAC Chemical Names:

| # | Name |
|---|------|
| 27 | dimethyl ((2S,2'S)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(4,4,4-trifluoro-3,3-dimethyl-1-oxobutane-1,2-diyl))dicarbamate |
| 28 | dimethyl ((2S,2'S,3S,3'S)-((2S,2'S,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(3-methyl-1-oxopentane-1,2-diyl))dicarbamate |
| 29 | dimethyl ((2S,2'S)-((2S,2'S,3aS,3a'S,6aS,6a'S)-((5,10-dihydrochromeno[5,4,3-cde]chromene-2,7-diyl)bis(4-chloro-1H-imidazole-5,2-diyl))bis(hexahydrocyclopenta[b]pyrrole-2,1(2H)-diyl))bis(3-methyl-1-oxobutane-1,2-diyl))dicarbamate |
| 30 | methyl ((S)-1-((2S,3aS,6aS)-2-(4-chloro-5-(7-(2-((2S,3aS,6aS)-1-((methoxycarbonyl)-L-valyl)octahydrocyclopenta[b]pyrrol-2-yl)-1H-imidazol-5-yl)-5,10-dihydrochromeno[5,4,3-cde]chromen-2-yl)-1H-imidazol-2-yl)hexahydrocyclopenta[b]pyrrol-1(2H)-yl)-3-methyl-1-oxobutan-2-yl)carbamate |
| 31 | dimethyl ((2S,2'S)-((2S,2'S,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(3,3-dimethyl-1-oxobutane-1,2-diyl))dicarbamate |
| 32 | dimethyl ((2S,2'S,3R,3'R)-((2S,2'S)-((5,10-dihydrochromeno[5,4,3-cde]chromene-2,7-diyl)bis(4-chloro-1H-imidazole-5,2-diyl))bis(pyrrolidine-2,1-diyl))bis(3-methyl-1-oxopentane-1,2-diyl))dicarbamate |
| 33 | dimethyl ((2S,2'S,3R,3'R)-((2S,2'S,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(3-methyl-1-oxopentane-1,2-diyl))dicarbamate |
| 34 | dimethyl ((2S,2'S)-((2S,2'S,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(4,4,4-trifluoro-3,3-dimethyl-1-oxobutane-1,2-diyl))dicarbamate |
| 35 | dimethyl ((2S,2'S)-((2S,2'S,3aS,3a'S,6aS,6a'S)-((5,10-dihydrochromeno[5,4,3-cde]chromene-2,7-diyl)bis(4-chloro-1H-imidazole-5,2-diyl))bis(hexahydrocyclopenta[b]pyrrole-2,1(2H)-diyl))bis(4,4,4-trifluoro-3,3-dimethyl-1-oxobutane-1,2-diyl))dicarbamate |
| 36 | dimethyl ((2S,2'S,3S,3'S)-((2S,2'S,3aS,3a'S,6aS,6a'S)-((5,10-dihydrochromeno[5,4,3-cde]chromene-2,7-diyl)bis(4-chloro-1H-imidazole-5,2-diyl))bis(hexahydrocyclopenta[b]pyrrole-2,1(2H)-diyl))bis(3-methyl-1-oxopentane-1,2-diyl))dicarbamate |
| 37 | dimethyl ((2S,2'S)-((2S,2'S,3aS,3a'S,7aS,7a'S)-((5,10-dihydrochromeno[5,4,3-cde]chromene-2,7-diyl)bis(4-chloro-1H-imidazole-5,2-diyl))bis(octahydro-1H-indole-2,1-diyl))bis(3-methyl-1-oxobutane-1,2-diyl))dicarbamate |
| 38 | dimethyl ((2S,2'S)-((2S,2'S,3aS,3a'S,7aS,7a'S)-((5,10-dihydrochromeno[5,4,3-cde]chromene-2,7-diyl)bis(4-chloro-1H-imidazole-5,2-diyl))bis(octahydro-1H-indole-2,1-diyl))bis(4,4,4-trifluoro-3,3-dimethyl-1-oxobutane-1,2-diyl))dicarbamate |
| 39 | dimethyl ((2S,2'S,3S,3'S)-((2S,2'S,3aS,3a'S,7aS,7a'S)-((5,10-dihydrochromeno[5,4,3-cde]chromene-2,7-diyl)bis(4-chloro-1H-imidazole-5,2-diyl))bis(octahydro-1H-indole-2,1-diyl))bis(3-methyl-1-oxopentane-1,2-diyl))dicarbamate |
| 40 | dimethyl ((2S,2'S)-((2S,2'S,5S,5'S)-((5,10-dihydrochromeno[5,4,3-cde]chromene-2,7-diyl)bis(4-isopropyl-1H-imidazole-5,2-diyl))bis(2-methylpyrrolidine-5,1-diyl))bis(3-methyl-1-oxobutane-1,2-diyl))dicarbamate |
| 41 | dimethyl ((2S,2'S,3S,3'S)-((2S,2'S,5S,5'S)-((5,10-dihydrochromeno[5,4,3-cde]chromene-2,7-diyl)bis(4-isopropyl-1H-imidazole-5,2-diyl))bis(2-methylpyrrolidine-5,1-diyl))bis(3-methyl-1-oxopentane-1,2-diyl))dicarbamate |
| 42 | dimethyl ((2S,2'S)-((2S,2'S,5S,5'S)-((5,10-dihydrochromeno[5,4,3-cde]chromene-2,7-diyl)bis(4-isopropyl-1H-imidazole-5,2-diyl))bis(2-methylpyrrolidine-5,1-diyl))bis(4,4,4-trifluoro-3,3-dimethyl-1-oxobutane-1,2-diyl))dicarbamate |
| 43 | methyl ((S)-1-((2S,5S)-2-(5-(7-(4-chloro-2-((2S,5S)-1-((methoxycarbonyl)-L-valyl)-5-methylpyrrolidin-2-yl)-1H-imidazol-5-yl)-5,10-dihydrochromeno[5,4,3-cde]chromen-2-yl)-4-isopropyl-1H-imidazol-2-yl)-5-methylpyrrolidin-1-yl)-3-methyl-1-oxobutan-2-yl)carbamate |
| 44 | methyl ((2S,3S)-1-((2S,5S)-2-(5-(7-(4-chloro-2-((2S,5S)-1-((methoxycarbonyl)-L-isoleucyl)-5-methylpyrrolidin-2-yl)-1H-imidazol-5-yl)-5,10-dihydrochromeno[5,4,3-cde]chromen-2-yl)-4-isopropyl-1H-imidazol-2-yl)-5-methylpyrrolidin-1-yl)-3-methyl-1-oxopentan-2-yl)carbamate |
| 45 | dimethyl ((2S,2'S)-((3S,3'S,5S,5'S)-((5,10-dihydrochromeno[5,4,3-cde]chromene-2,7-diyl)bis(4-chloro-1H-imidazole-5,2-diyl))bis(3-(methoxymethyl)pyrrolidine-5,1-diyl))bis(3-methyl-1-oxobutane-1,2-diyl))dicarbamate |
| 46 | dimethyl ((2S,2'S)-((1R,1'R,3S,3'S,5R,5'R)-((5,10-dihydrochromeno[5,4,3-cde]chromene-2,7-diyl)bis(4-chloro-1H-imidazole-5,2-diyl))bis(2-azabicyclo[3.1.0]hexane-3,2-diyl))bis(3-methyl-1-oxobutane-1,2-diyl))dicarbamate |
| 47 | dimethyl ((2S,2'S,3R,3'R)-((3S,3'S,5S,5'S)-((5,10-dihydrochromeno[5,4,3-cde]chromene-2,7-diyl)bis(4-chloro-1H-imidazole-5,2-diyl))bis(3-methylpyrrolidine-5,1-diyl))bis(3-methoxy-1-oxobutane-1,2-diyl))dicarbamate |
| 48 | dimethyl ((2S,2'S)-((3S,3'S,5S,5'S)-((5,10-dihydrochromeno[5,4,3-cde]chromene-2,7-diyl)bis(4-chloro-1H-imidazole-5,2-diyl))bis(3-methylpyrrolidine-5,1-diyl))bis(3-methyl-1-oxobutane-1,2-diyl))dicarbamate |
| 49 | dimethyl ((2S,2'S)-((2R,2'R,5S,5'S)-((5,10-dihydrochromeno[5,4,3-cde]chromene-2,7-diyl)bis(4-chloro-1H-imidazole-5,2-diyl))bis(2-(methoxymethyl)pyrrolidine-5,1-diyl))bis(3-methyl-1-oxobutane-1,2-diyl))dicarbamate |

TABLE 3-continued

| IUPAC Chemical Names: |

Name 50 dimethyl ((2S,2'S)-((3S,3'S,5S,5'S)-((5,10-dihydrochromeno[5,4,3-cde]chromene-2,7-diyl)bis(4-chloro-1H-imidazole-5,2-diyl))bis(3-fluoropyrrolidine-5,1-diyl))bis(3-methyl-1-oxobutane-1,2-diyl))dicarbamate
51 dimethyl ((2S,2'S,3S,3'S)-((3S,3'S,5S,5'S)-((5,10-dihydrochromeno[5,4,3-cde]chromene-2,7-diyl)bis(4-chloro-1H-imidazole-5,2-diyl))bis(3-fluoropyrrolidine-5,1-diyl))bis(3-methyl-1-oxopentane-1,2-diyl))dicarbamate
52 dimethyl ((2S,2'S)-((3S,3'S,5S,5'S)-((5,10-dihydrochromeno[5,4,3-cde]chromene-2,7-diyl)bis(4-chloro-1H-imidazole-5,2-diyl))bis(3-fluoropyrrolidine-5,1-diyl))bis(4,4,4-trifluoro-3,3-dimethyl-1-oxobutane-1,2-diyl))dicarbamate
53 dimethyl ((2S,2'S)-((3R,3'R,5S,5'S)-((5,10-dihydrochromeno[5,4,3-cde]chromene-2,7-diyl)bis(4-chloro-1H-imidazole-5,2-diyl))bis(3-fluoropyrrolidine-5,1-diyl))bis(3-methyl-1-oxobutane-1,2-diyl))dicarbamate
54 dimethyl ((2S,2'S,3S,3'S)-((3R,3'R,5S,5'S)-((5,10-dihydrochromeno[5,4,3-cde]chromene-2,7-diyl)bis(4-chloro-1H-imidazole-5,2-diyl))bis(3-fluoropyrrolidine-5,1-diyl))bis(3-methyl-1-oxopentane-1,2-diyl))dicarbamate
55 dimethyl ((2S,2'S)-((3R,3'R,5S,5'S)-((5,10-dihydrochromeno[5,4,3-cde]chromene-2,7-diyl)bis(4-chloro-1H-imidazole-5,2-diyl))bis(3-fluoropyrrolidine-5,1-diyl))bis(4,4,4-trifluoro-3,3-dimethyl-1-oxobutane-1,2-diyl))dicarbamate
56 dimethyl ((2S,2'S)-((5S,5'S)-((5,10-dihydrochromeno[5,4,3-cde]chromene-2,7-diyl)bis(4-chloro-1H-imidazole-5,2-diyl))bis(3,3-difluoropyrrolidine-5,1-diyl))bis(3-methyl-1-oxobutane-1,2-diyl))dicarbamate
57 dimethyl ((2S,2'S,3S,3'S)-((5S,5'S)-((5,10-dihydrochromeno[5,4,3-cde]chromene-2,7-diyl)bis(4-chloro-1H-imidazole-5,2-diyl))bis(3,3-difluoropyrrolidine-5,1-diyl))bis(3-methyl-1-oxopentane-1,2-diyl))dicarbamate
58 dimethyl ((2S,2'S)-((5S,5'S)-((5,10-dihydrochromeno[5,4,3-cde]chromene-2,7-diyl)bis(4-chloro-1H-imidazole-5,2-diyl))bis(3,3-difluoropyrrolidine-5,1-diyl))bis(4,4,4-trifluoro-3,3-dimethyl-1-oxobutane-1,2-diyl))dicarbamate
59 dimethyl ((2S,2'S)-((6S,6'S)-((5,10-dihydrochromeno[5,4,3-cde]chromene-2,7-diyl)bis(4-chloro-1H-imidazole-5,2-diyl))bis(5-azaspiro[2.4]heptane-6,5-diyl))bis(3-methyl-1-oxobutane-1,2-diyl))dicarbamate
60 dimethyl ((2S,2'S,3S,3'S)-((6S,6'S)-((5,10-dihydrochromeno[5,4,3-cde]chromene-2,7-diyl)bis(4-chloro-1H-imidazole-5,2-diyl))bis(5-azaspiro[2.4]heptane-6,5-diyl))bis(3-methyl-1-oxopentane-1,2-diyl))dicarbamate
61 dimethyl ((2S,2'S)-((6S,6'S)-((5,10-dihydrochromeno[5,4,3-cde]chromene-2,7-diyl)bis(4-chloro-1H-imidazole-5,2-diyl))bis(5-azaspiro[2.4]heptane-6,5-diyl))bis(4,4,4-trifluoro-3,3-dimethyl-1-oxobutane-1,2-diyl))dicarbamate
62 dimethyl ((2S,2'S)-((2R,2'R,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(3-methyl-1-oxobutane-1,2-diyl))dicarbamate
63 dimethyl ((2S,2'S,3S,3'S)-((2R,2'R,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(3-methyl-1-oxopentane-1,2-diyl))dicarbamate
64 dimethyl ((2S,2'S)-((2S,2'S)-((5,10-dihydrochromeno[5,4,3-cde]chromene-2,7-diyl)bis(4-chloro-1H-imidazole-5,2-diyl))bis(2-methylpyrrolidine-2,1-diyl))bis(3-methyl-1-oxobutane-1,2-diyl))dicarbamate
65 dimethyl ((2S,2'S)-((2R,2'R,5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(4,4,4-trifluoro-3,3-dimethyl-1-oxobutane-1,2-diyl))dicarbamate
66 dimethyl ((2S,2'S,3S,3'S)-((2S,2'S)-((5,10-dihydrochromeno[5,4,3-cde]chromene-2,7-diyl)bis(4-chloro-1H-imidazole-5,2-diyl))bis(2-methylpyrrolidine-2,1-diyl))bis(3-methyl-1-oxopentane-1,2-diyl))dicarbamate
67 methyl ((2S,3S)-1-((2S,4S)-2-(4-chloro-5-(7-(2-((2S,4S)-1-((methoxycarbonyl)-L-isoleucyl)-4-methylpyrrolidin-2-yl)-1H-imidazol-5-yl)-5,10-dihydrochromeno[5,4,3-cde]chromen-2-yl)-1H-imidazol-2-yl)-4-methylpyrrolidin-1-yl)-3-methyl-1-oxopentan-2-yl)carbamate
68 dimethyl ((2S,2'S,3S,3'S)-((3S,3'S,5S,5'S)-((5,10-dihydrochromeno[5,4,3-cde]chromene-2,7-diyl)bis(4-chloro-1H-imidazole-5,2-diyl))bis(3-methylpyrrolidine-5,1-diyl))bis(3-methyl-1-oxopentane-1,2-diyl))dicarbamate
69 methyl ((S)-1-((2S,4S)-2-(4-bromo-5-(7-(4-chloro-2-((2S,4S)-1-((methoxycarbonyl)-L-valyl)-4-methylpyrrolidin-2-yl)-1H-imidazol-5-yl)-5,10-dihydrochromeno[5,4,3-cde]chromen-2-yl)-1H-imidazol-2-yl)-4-methylpyrrolidin-1-yl)-3-methyl-1-oxobutan-2-yl)carbamate
70 methyl ((2S,3S)-1-((2S,4S)-2-(4-isopropyl-5-(7-(2-((2S,4S)-1-((methoxycarbonyl)-L-isoleucyl)-4-methylpyrrolidin-2-yl)-1H-imidazol-5-yl)-5,10-dihydrochromeno[5,4,3-cde]chromen-2-yl)-1H-imidazol-2-yl)-4-methylpyrrolidin-1-yl)-3-methyl-1-oxopentan-2-yl)carbamate
71 dimethyl ((2S,2'S)-((3S,3'S,5S,5'S)-((5,10-dihydrochromeno[5,4,3-cde]chromene-2,7-diyl)bis(4-(prop-1-en-2-yl)-1H-imidazole-5,2-diyl))bis(3-methylpyrrolidine-5,1-diyl))bis(3-methyl-1-oxobutane-1,2-diyl))dicarbamate
72 dimethyl ((2S,2'S)-((3S,3'S,5S,5'S)-((5,10-dihydrochromeno[5,4,3-cde]chromene-2,7-diyl)bis(4-isopropyl-1H-imidazole-5,2-diyl))bis(3-methylpyrrolidine-5,1-diyl))bis(3-methyl-1-oxobutane-1,2-diyl))dicarbamate
73 methyl ((2S,3S)-1-((2S,4S)-2-(5-(7-(4-chloro-2-((2S,4S)-1-((methoxycarbonyl)-1-isoleucyl)-4-methylpyrrolidin-2-yl)-1H-imidazol-5-yl)-5,10-dihydrochromeno[5,4,3-cde]chromen-2-yl)-4-isopropyl-1H-imidazol-2-yl)-4-methylpyrrolidin-1-yl)-3-methyl-1-oxopentan-2-yl)carbamate TABLE 3-continued IUPAC Chemical Names:

| # | Name |
|---|------|
| 74 | dimethyl ((2S,2'S)-((2S,2'S, 5S,5'S)-((5,10-dihydrochromeno[5,4,3-cde]chromene-2,7-diyl)bis(4-chloro-1H-imidazole-5,2-diyl))bis(2-methylpyrrolidine-5,1-diyl))bis(3-methyl-1-oxobutane-1,2-diyl))dicarbamate |
| 75 | methyl ((S)-1-((2S,5S)-2-(4-chloro-5-(7-(2-((2S,5S)-1-((methoxycarbonyl)-L-valyl)-5-methylpyrrolidin-2-yl)-1H-imidazol-5-yl)-5,10-dihydrochromeno[5,4,3-cde]chromen-2-yl)-1H-imidazol-2-yl)-5-methylpyrrolidin-1-yl)-3-methyl-1-oxobutan-2-yl)carbamate |
| 76 | Dimethyl ((2S,2'S)-((2S,2'S)-((5,10-dihydrochromeno[5,4,3-cde]chromene-2,7-diyl)bis(4-(tert-butyl)-1H-imidazole-5,2-diyl))bis(pyrrolidine-2,1-diyl))bis(3-methyl-1-oxobutane-1,2-diyl))dicarbamate |
| 77 | methyl ((S)-1-((S)-2-(5-(7-(4-chloro-2-((S)-1-((methoxycarbonyl)-L-valyl)pyrrolidin-2-yl)-1H-imidazol-5-yl)-5,10-dihydrochromeno[5,4,3-cde]chromen-2-yl)-4-isopropyl-1H-imidazol-2-yl)pyrrolidin-1-yl)-3-methyl-1-oxobutan-2-yl)carbamate |
| 78 | methyl ((2S,3S)-1-((R)-6-(5-(7-(4-chloro-2-((R)-5-((methoxycarbonyl)-L-isoleucyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxopentan-2-yl)carbamate |
| 79 | dimethyl ((2S,2'S)-((2S,2'S)-((5,10-dihydrochromeno[5,4,3-cde]chromene-2,7-diyl)bis(4-propyl-1H-imidazole-5,2-diyl))bis(pyrrolidine-2,1-diyl))bis(3-methyl-1-oxobutane-1,2-diyl))dicarbamate |
| 80 | methyl ((S)-1-((2S,4S)-2-(5-(7-(4-chloro-2-((2S,4S)-1-((methoxycarbonyl)-L-valyl)-4-methylpyrrolidin-2-yl)-1H-imidazol-5-yl)-5,10-dihydrochromeno[5,4,3-cde]chromen-2-yl)-4-isopropyl-1H-imidazol-2-yl)-4-methylpyrrolidin-1-yl)-3-methyl-1-oxobutan-2-yl)carbamate |
| 81 | methyl ((R)-1-((S)-6-(5-(7-(4-chloro-2-((S)-5-((methoxycarbonyl)-D-valyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxobutan-2-yl)carbamate |
| 82 | methyl ((S)-1-((S)-6-(5-(7-(4-chloro-2-((S)-5-((S)-2-((methoxycarbonyl)amino)-3,3-dimethylbutanoyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3,3-dimethyl-1-oxobutan-2-yl)carbamate |
| 83 | methyl ((2S,3R)-1-((S)-6-(5-(7-(4-chloro-2-((S)-5-((methoxycarbonyl)-L-alloisoleucyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-3-methyl-1-oxopentan-2-yl)carbamate |
| 84 | methyl ((S)-1-((2S,4R)-2-(5-(7-(4-chloro-2-((2S,4R)-1-((methoxycarbonyl)-L-valyl)-4-methylpyrrolidin-2-yl)-1H-imidazol-5-yl)-5,10-dihydrochromeno[5,4,3-cde]chromen-2-yl)-4-isopropyl-1H-imidazol-2-yl)-4-methylpyrrolidin-1-yl)-3-methyl-1-oxobutan-2-yl)carbamate |
| 85 | methyl ((S)-1-((S)-6-(5-(7-(4-chloro-2-((S)-5-((S)-4,4,4-trifluoro-2-((methoxycarbonyl)amino)-3,3-dimethylbutanoyl)-5-azaspiro[2.4]heptan-6-yl)-1H-imidazol-5-yl)-5,10-dihydrochromeno[5,4,3-cde]chromen-2-yl)-4-isopropyl-1H-imidazol-2-yl)-5-azaspiro[2.4]heptan-5-yl)-4,4,4-trifluoro-3,3-dimethyl-1-oxobutan-2-yl)carbamate |

Biological Assays

Protocol for ZIKV reporter virus-based antiviral screening on Huh7 cells:

1. Cells

Human hepatocyte-derived carcinoma cell line (Huh7)

2. Reagents

ViviRen™ Live Cell Substrate (Promega, Cat #E6492) or Nano Glo assay system (Promega: N1130)

White opaque 96-well TC-treated microplates (Corning, Cat #3916)

96-well Clear V-Bottom TC-treated Microplate (Corning, Cat #3894)

Complete cell culture media: DMEM (Gibco, Cat #10569) supplemented with 10% FBS (HyClone, Cat #SH30071.03IH25-40)+1% MEM Non-Essential Amino Acids Solution 100×(Gibco, Cat #11140050)+1% Penicillin-Streptomycin (10,000 U/mL) (Gibco, Cat #15140122).

Assay media: DMEM media (Gibco, Cat #31053028) supplemented with 2% FBS, 2% GlutaMAX™ Supplement (Gibco Cat #35050061), 1% Sodium Pyruvate solution (Gibco, Cat #11360070), 1% MEM Non-Essential Amino Acids Solution 100× and 1% Penicillin-Streptomycin (10,000 U/mL).

Trypsin-EDTA solution (Gibco, Cat #25200056)

3. Virus

Recombinant ZIKV strain with *Renilla* luciferase gene (strain FSS-Rlu) or Nano luciferase gene (Strain PRV-Nano, Dakar-Nano)

4. Instruments

BioTek Cytation 5 or other plate-readers for chemiluminescence detection model.

Eppendorf plate centrifuge

Plate shaker

Eppendorf multichannel pipettes

Procedures

Day 1: Preparation of Cells

Human hepatocyte-derived carcinoma cell line (Huh7) cells were detached from a T-175 flask by using a Trypsin-EDTA solution. The detached cells were suspended in complete culture media in a sterile 50-ml conical tube.

The 50-ml conical tube was centrifuged at 1200×rpm for 3 min at room temperature.

The cells were resuspended in assay media. The cell numbers were counted, and the cells diluted to a density of $3 \times 10^5$ cells/ml.

The cells were plated at 50 μl cells per well in White opaque 96-well plates (assay plates). Gently shake the plates to ensure cells to attach to the plate evenly.

The plated cells were incubated in a humidified incubator (37° C. with 5% $CO_2$).

Day 2: Infection
1) Nine serial (2-fold or 3-fold) concentrated compounds were prepared using 90% DMSO solution and DMSO controls in a clear V-bottom 96-well plate (compound plate).
For example:

| Final concentration | 10 µM | 5 µM | 2.5 µM | 1.25 µM | 0.625 µM | 0.313 µM | 0.156 µM | 0.078 µM | 0.0391 µM | 0.225% DMSO |
|---|---|---|---|---|---|---|---|---|---|---|
| 400× concentrated | 4 mM | 2 mM | 1 mM | 0.5 mM | 0.25 mM | 0.125 mM | 0.0625 mM | 0.0313 mM | 0.0156 mM | 90% DMSO |

2) The reporter virus stock was diluted to a concentration of $3 \times 10^4$ FFU (FFU: focus-forming unit)/ml using the assay media. 200 µl diluted virus per well was aliquoted into a clear V-bottom 96-well plate (mixing plate).
3) 1 µl above 400×concentrated compound dilutions was added from the compound plate to each well of the mixing plate. The plates were shaken on a plate shaker for 5 min.
4) 50 µl compound-virus mixture was added into each well of the assay plates (the MOI is about 0.1). The plates were shaken gently by mixing the virus evenly.
An example of the format for assay plate:

| Dose 1 | Dose 2 | Dose 3 | Dose 4 | Dose 5 | Dose 6 | Dose 7 | Dose 8 | Dose 9 | DMSO control |
|---|---|---|---|---|---|---|---|---|---|
| Cpd 1, Replicate 1 | | | | | | | | | CC |
| Cpd 1, Replicate 2 | | | | | | | | | CC |
| Cpd 2, Replicate 1 | | | | | | | | | CC |
| Cpd 2, Replicate 2 | | | | | | | | | CC |
| Cpd 3, Replicate 1 | | | | | | | | | CC |
| Cpd 3, Replicate 2 | | | | | | | | | CC |

Note:
CC for cell control.

5) The plates were centrifuged at 1000 rpm for 15 s.
6) The plates were incubated at 37° C. with 5% $CO_2$ in a humidified incubator for 48 hrs.

Day 4: Read Luciferase Signals
7) The ViviRen™ Live Cell Substrate was diluted in assay media for 3000× folds. 25 µl of diluted substrates was added into each well of the assay plates.
For Nano-Glo assay system, 50 µl diluted substrates (50×fold diluted from the stock in assay buffer) were added.
8) The plates were incubated at room temperature for 5 min.
9) Optimally, cell viability is measured using the Promega Cell-titer Glo kit (only used when ZIKV-Rlu was used for infection).
10) Luciferase signals were read using the Cytation 5 with gain value of 120-150.

Data Analysis a. The luciferase signals from DMSO-treated groups (un-treated controls) were set as 100%. The relative luciferase signals were obtained by normalizing the luciferase signals from each dilution-treated group to that of the controls.

b. The relative luciferase signals (Y axis) was plotted to the log 10 values of compound concentration (X axis) in the software GraphPad Prism 8 and the curves were fit using the nonlinear regression model (log(inhibitor) vs. response–Variable slope (four parameters), with constrains of bottom to 0 and top to 100).

c. The $EC_{50}$s values are reported below.

Biological assays were conducted to measure activity against ZIKV. As summarized in Table 4, the test compounds are inhibitors of ZIKV.

TABLE 4

| Compound # | EC50 (nM) |
|---|---|
| 1 | 4.2 |
| 2 | 6.5 |
| 3 | 5.2 |
| 4 | 19.2 |
| 5 | 12.4 |
| 6 | 4.9 |
| 7 | 4.2 |
| 8 | 4.4 |
| 9 | 4.6 |
| 10 | 7.0 |
| 11 | 9.3 |
| 12 | 11.9 |
| 13 | 4.5 |
| 14 | 4.6 |
| 15 | 3.7 |
| 16 | 2.3 |
| 17 | 74.5 |
| 18 | 255.1 |
| 19 | 15.8 |
| 20 | >367.65 |
| 21 | 9.3 |
| 22 | 14.1 |
| 23 | 52.4 |
| 24 | 2.2 |
| 25 | 21.9 |
| 26 | 1.6 |
| 27 | 2.6 |
| 28 | 1.6 |
| 29 | 1.8 |
| 30 | 8.0 |
| 31 | 1.1 |
| 32 | 1.1 |
| 33 | 0.9 |
| 34 | 2.6 |
| 35 | 4.5 |
| 36 | 4.3 |
| 37 | 5.7 |
| 38 | 25.6 |
| 39 | 10.9 |
| 40 | 5.6 |
| 41 | 2.8 |
| 42 | 1.9 |
| 43 | 1.6 |
| 44 | 1.9 |
| 45 | 19.3 |
| 46 | 5.0 |
| 47 | 16.9 |
| 48 | 4.6 |
| 49 | 1.9 |
| 50 | 239.6 |
| 51 | 98.8 |
| 52 | 102.9 |
| 53 | 7.3 |
| 54 | 8.0 |
| 55 | 4.7 |
| 56 | 3.8 |
| 57 | 4.6 |
| 58 | 11.0 |
| 59 | 1.5 |

TABLE 4-continued

| Compound # | EC50 (nM) |
|---|---|
| 60 | 1.7 |
| 61 | 2.8 |
| 62 | 17.7 |
| 63 | 16.4 |
| 64 | 234.3 |
| 65 | 71.7 |
| 66 | 44.0 |
| 67 | 23.9 |
| 68 | 9.9 |
| 69 | 11.6 |
| 70 | 17.4 |
| 71 | 36.4 |
| 72 | 11.8 |
| 73 | 3.2 |
| 74 | 2.0 |
| 75 | 9.6 |
| 76 | 495.8 |
| 77 | 13.6 |
| 78 | >1000 |
| 79 | 199.8 |
| 80 | 5.7 |
| 81 | >1000 |
| 82 | 2.6 |
| 83 | 2.4 |
| 84 | 3.3 |
| 85 | 1.4 |

The foregoing description of the specific embodiments will so fully reveal the general nature of the invention that others can, by applying knowledge within the skill of the art, readily modify and/or adapt for various applications such specific embodiments, without undue experimentation, without departing from the general concept of this disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A compound of formula:

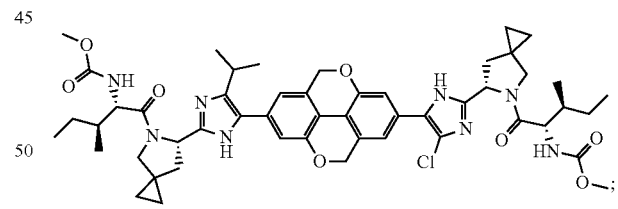

or a pharmaceutically acceptable salt or solvate thereof.